United States Patent
Oh et al.

(10) Patent No.: US 12,244,023 B2
(45) Date of Patent: Mar. 4, 2025

(54) POUCH-TYPE BATTERY CASE AND POUCH TYPE SECONDARY BATTERY

(71) Applicant: LG Energy Solution, Ltd., Seoul (KR)

(72) Inventors: Se Young Oh, Daejeon (KR); Jeong Min Ha, Daejeon (KR); Geun Hee Kim, Daejeon (KR); Hyun Beom Kim, Daejeon (KR); Hyung Ho Kwon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/021,490

(22) PCT Filed: Aug. 19, 2021

(86) PCT No.: PCT/KR2021/011062
§ 371 (c)(1),
(2) Date: Feb. 15, 2023

(87) PCT Pub. No.: WO2022/039536
PCT Pub. Date: Feb. 24, 2022

(65) Prior Publication Data
US 2024/0021925 A1    Jan. 18, 2024

(30) Foreign Application Priority Data

Aug. 19, 2020  (KR) .................... 10-2020-0104228
Jun. 8, 2021  (KR) .................... 10-2021-0074472

(51) Int. Cl.
| H01M 50/105 | (2021.01) |
| H01M 50/342 | (2021.01) |
| H01M 50/466 | (2021.01) |

(52) U.S. Cl.
CPC ....... *H01M 50/105* (2021.01); *H01M 50/342* (2021.01); *H01M 50/466* (2021.01)

(58) Field of Classification Search
CPC . H01M 50/105; H01M 50/342; H01M 50/366
See application file for complete search history.

(56) References Cited

U.S. PATENT DOCUMENTS

2004/0166406 A1   8/2004  Higuchi et al.
2006/0216591 A1   9/2006  Lee
(Continued)

FOREIGN PATENT DOCUMENTS

CN   104228210 A   12/2014
CN   204585379 U    8/2015
(Continued)

OTHER PUBLICATIONS

WO 2019172524 translation (Year: 2019).*
(Continued)

*Primary Examiner* — Jimmy Vo
(74) *Attorney, Agent, or Firm* — Lerner David LLP

(57) ABSTRACT

A pouch-type battery case according to an embodiment of the present invention can include a cup part configured to accommodate an electrode assembly of stacked electrodes and separators. The cup part comprises a plurality of outer walls forming a periphery of the cup part, and a plurality of die edges connecting the plurality of outer walls to a side or degassing part. At least one of the die edges can be rounded to define a curvature radius of 1 mm or less. The cup part can have a depth of 6.5 mm or less.

39 Claims, 28 Drawing Sheets

(56) References Cited

U.S. PATENT DOCUMENTS

| | | | |
|---|---|---|---|
| 2007/0154790 A1 | 7/2007 | Jeung et al. | |
| 2009/0023058 A1 | 1/2009 | Kim | |
| 2009/0130407 A1 | 5/2009 | Hata | |
| 2009/0311592 A1 | 12/2009 | You et al. | |
| 2011/0091764 A1 | 4/2011 | Kim | |
| 2012/0064319 A1 | 3/2012 | Hata | |
| 2012/0219851 A1 | 8/2012 | Kim | |
| 2012/0321935 A1 | 12/2012 | Kim et al. | |
| 2013/0084484 A1 | 4/2013 | Shinyashiki et al. | |
| 2013/0101894 A1 | 4/2013 | Baba et al. | |
| 2013/0244095 A1 | 9/2013 | Min et al. | |
| 2013/0298388 A1 | 11/2013 | Kim et al. | |
| 2013/0323580 A1* | 12/2013 | Kim | H01M 50/548 |
| | | | 429/179 |
| 2014/0099535 A1 | 4/2014 | Chu | |
| 2014/0315074 A1 | 10/2014 | Kong | |
| 2014/0356655 A1 | 12/2014 | Yoshino | |
| 2014/0370368 A1 | 12/2014 | Kaibin et al. | |
| 2015/0147635 A1 | 5/2015 | Ahn et al. | |
| 2015/0171461 A1 | 6/2015 | Akutsu et al. | |
| 2016/0093838 A1 | 3/2016 | Kwon et al. | |
| 2016/0226048 A1 | 8/2016 | Mano et al. | |
| 2016/0285065 A1 | 9/2016 | Sakaguchi et al. | |
| 2017/0025647 A1 | 1/2017 | Taniguchi | |
| 2017/0040578 A1 | 2/2017 | Taniguchi et al. | |
| 2017/0117572 A1 | 4/2017 | Ichikawa | |
| 2017/0133707 A1 | 5/2017 | Han et al. | |
| 2017/0271714 A1 | 9/2017 | Iwasaki et al. | |
| 2017/0352844 A1 | 12/2017 | Yu et al. | |
| 2018/0019449 A1 | 1/2018 | Maeda | |
| 2018/0219245 A1 | 8/2018 | Choi et al. | |
| 2018/0312943 A1 | 11/2018 | Amano et al. | |
| 2019/0027714 A1 | 1/2019 | Jung et al. | |
| 2019/0148682 A1 | 5/2019 | Ojiri et al. | |
| 2019/0173061 A1 | 6/2019 | Yamazaki et al. | |
| 2019/0229301 A1 | 7/2019 | Li et al. | |
| 2019/0237832 A1 | 8/2019 | Ju et al. | |
| 2019/0305260 A1 | 10/2019 | Kim et al. | |
| 2019/0305261 A1 | 10/2019 | Kim et al. | |
| 2019/0312237 A1 | 10/2019 | Moon et al. | |
| 2019/0386330 A1 | 12/2019 | Choi et al. | |
| 2019/0393452 A1 | 12/2019 | Kim et al. | |
| 2019/0393455 A1 | 12/2019 | Seo et al. | |
| 2020/0006800 A1 | 1/2020 | Ichikawa | |
| 2020/0067029 A1 | 2/2020 | Park et al. | |
| 2020/0112001 A1 | 4/2020 | Jung et al. | |
| 2020/0280044 A1 | 9/2020 | Park et al. | |
| 2020/0282627 A1 | 9/2020 | Kim et al. | |
| 2020/0331187 A1 | 10/2020 | Suh et al. | |
| 2020/0358044 A1 | 11/2020 | Jang | |
| 2020/0365836 A1 | 11/2020 | Jung et al. | |
| 2021/0066676 A1 | 3/2021 | Jung et al. | |
| 2021/0288360 A1 | 9/2021 | Kim et al. | |
| 2022/0013843 A1 | 1/2022 | Fukuda | |
| 2022/0102786 A1 | 3/2022 | Kim et al. | |
| 2022/0102790 A1 | 3/2022 | Jung et al. | |
| 2022/0109203 A1 | 4/2022 | Oh et al. | |
| 2022/0109218 A1 | 4/2022 | Park et al. | |
| 2022/0115687 A1 | 4/2022 | Choi et al. | |
| 2022/0158272 A1 | 5/2022 | Ju et al. | |
| 2022/0320634 A1 | 10/2022 | Oh et al. | |
| 2022/0344789 A1* | 10/2022 | Kim | H01M 50/105 |
| 2023/0318093 A1 | 10/2023 | Oh et al. | |
| 2023/0411671 A1 | 12/2023 | Park et al. | |
| 2024/0021925 A1 | 1/2024 | Oh et al. | |
| 2024/0039088 A1 | 2/2024 | Oh et al. | |

FOREIGN PATENT DOCUMENTS

| | | | |
|---|---|---|---|
| CN | 208173634 U | | 11/2018 |
| CN | 110870090 A | | 3/2020 |
| EP | 1264355 A1 | | 12/2002 |
| EP | 3561898 A1 | | 10/2019 |
| EP | 3561899 A1 | | 10/2019 |
| EP | 3567649 A1 | | 11/2019 |
| EP | 3670154 A1 | | 6/2020 |
| JP | 2001291497 A | | 10/2001 |
| JP | 2001301090 A | | 10/2001 |
| JP | 2001325925 A | | 11/2001 |
| JP | 2002050326 A | | 2/2002 |
| JP | 2002324524 A | | 11/2002 |
| JP | 2004071301 A | | 3/2004 |
| JP | 2005285506 A | | 10/2005 |
| JP | 2005294212 A | | 10/2005 |
| JP | 2006066113 A | | 3/2006 |
| JP | 2006156161 A | | 6/2006 |
| JP | 2006310039 A | | 11/2006 |
| JP | 2006344457 A | | 12/2006 |
| JP | 2007200589 A | | 8/2007 |
| JP | 2009533834 A | | 9/2009 |
| JP | 4951812 B2 | | 6/2012 |
| JP | 2013077447 A | | 4/2013 |
| JP | 5321853 B2 | | 10/2013 |
| JP | 2013254751 A | | 12/2013 |
| JP | 5519895 B2 | | 6/2014 |
| JP | 2014179220 A | | 9/2014 |
| JP | 2015116706 A | | 6/2015 |
| JP | 2015230777 A | | 12/2015 |
| JP | 2016139494 A | | 8/2016 |
| JP | 6016368 B2 | | 10/2016 |
| JP | 6022956 B2 | | 11/2016 |
| JP | WO2015151580 A1 | | 4/2017 |
| JP | 2017084786 A | | 5/2017 |
| JP | 2018085190 A | | 5/2018 |
| JP | 2018527719 A | | 9/2018 |
| JP | 6426895 B2 | | 11/2018 |
| JP | 6446283 B2 | | 12/2018 |
| JP | 2019500734 A | | 1/2019 |
| JP | 2019102333 A | | 6/2019 |
| JP | 2020004712 A | | 1/2020 |
| JP | 2020506516 A | | 2/2020 |
| JP | 2020119710 A | | 8/2020 |
| JP | 2021144864 A | | 9/2021 |
| KR | 20030014351 A | | 2/2003 |
| KR | 20070073169 A | * | 7/2007 |
| KR | 100850865 B1 | | 8/2008 |
| KR | 100876254 B1 | | 12/2008 |
| KR | 20120051424 A | * | 5/2012 |
| KR | 20120138848 A | | 12/2012 |
| KR | 20140005614 A | | 1/2014 |
| KR | 101366217 B1 | | 2/2014 |
| KR | 20150045623 A | | 4/2015 |
| KR | 20160100602 A | | 8/2016 |
| KR | 20170054071 A | | 5/2017 |
| KR | 20170058021 A | | 5/2017 |
| KR | 101743839 B1 | | 6/2017 |
| KR | 20170069981 A | | 6/2017 |
| KR | 20170091938 A | | 8/2017 |
| KR | 101861888 B1 | | 5/2018 |
| KR | 20180055427 A | * | 5/2018 |
| KR | 20180057926 A | | 5/2018 |
| KR | 20180071983 A | | 6/2018 |
| KR | 20180102927 A | | 9/2018 |
| KR | 20180113378 A | | 10/2018 |
| KR | 20190032609 A | | 3/2019 |
| KR | 20190038094 A | | 4/2019 |
| KR | 20190054735 A | | 5/2019 |
| KR | 20190075593 A | | 7/2019 |
| KR | 20190096619 A | | 8/2019 |
| KR | 20190106473 A | | 9/2019 |
| KR | 102018256 B1 | | 10/2019 |
| KR | 20190114645 A | | 10/2019 |
| KR | 20190115746 A | | 10/2019 |
| KR | 20200071208 A | | 6/2020 |
| KR | 102143366 B1 | | 8/2020 |
| WO | 0157941 A1 | | 8/2001 |
| WO | 2015151580 A1 | | 10/2015 |
| WO | 2015156327 A1 | | 10/2015 |
| WO | 2015163371 A1 | | 10/2015 |
| WO | 2016158997 A1 | | 10/2016 |
| WO | 2017179712 A1 | | 10/2017 |
| WO | 2018048133 A1 | | 3/2018 |
| WO | 2018124225 A1 | | 7/2018 |

(56) References Cited

FOREIGN PATENT DOCUMENTS

| WO | 2019107814 | A1 | 6/2019 | |
|---|---|---|---|---|
| WO | WO-2019172524 | A1 * | 9/2019 | ........... B29C 51/266 |
| WO | 2020080039 | A1 | 4/2020 | |

OTHER PUBLICATIONS

KR 20180055427 Translation (Year: 2018).*
KR 20070073169 translation (Year: 2007).*
KR 20120051424 (Year: 2012).*
International Search Report for Application No. PCT/KR2021/011062 mailed Dec. 3, 2021, 2 pages.
International Search Report for Application No. PCT/KR2021/011054 mailed Nov. 30, 2021, pp. 1-4.
International Search Report for PCT/KR2021/011056 mailed Nov. 26, 2021. 4 pages.
International Search Report for PCT/KR2021/011060 mailed Nov. 26, 2021. 4 pages.
Search report from International Application No. PCT/KR2021/011055, mailed Nov. 30, 2021.
Search report from International Application No. PCT/KR2021/011058, mailed Nov. 26, 2021.
Extended European Search Report including Written Opinion for Application No. 21858621.2 dated Jul. 4, 2024, pp. 1-10.
Extended European Search Report including Written Opinion for Application No. 21858617.0 dated Jul. 24, 2024, pp. 1-13.
Extended European Search Report including Written Opinion for Application No. 21858616.2 dated Aug. 1, 2024, pp. 1-7.
Partial Supplementary European Search Report including Written Opinion for Application No. 21858620.4 dated Aug. 6, 2024, pp. 1-11.
Partial Supplementary European Search Report including Written Opinion for Application No. 21858623.8 dated Sep. 12, 2024, pp. 1-14.
Extended European Search Report including Written Opinion for Application No. 21858618.8 dated Nov. 22, 2024, pp. 1-9.
Extended European Search Report including Written Opinion for Application No. 21858620.4 dated Dec. 10, 2024, pp. 1-13.
Extended European Search Report including Written Opinion for Application No. 21858623.8 dated Jan. 13, 2025, pp. 1-17.

* cited by examiner

POUCH-TYPE BATTERY CASE AND POUCH TYPE SECONDARY BATTERY

CROSS-REFERENCE TO RELATED APPLICATION

The present application is a national phase entry under 35 U.S.C. § 371 of International Application No. PCT/KR2021/011062 filed on Aug. 19, 2021, which claims the benefit of the priority of Korean Patent Application Nos. 10-2020-0104228, filed on Aug. 19, 2020, and 10-2021-0074472, filed on Jun. 8, 2021, all of which are hereby incorporated by reference in their entirety.

TECHNICAL FIELD

The present invention relates to a pouch-type battery case and a pouch-type secondary battery, and more particularly, to a pouch-type battery case which is capable of increasing in energy density relative to a volume, having an elegant outer appearance, and improving marketability, and a pouch type secondary battery.

BACKGROUND ART

In general, secondary batteries include nickel-cadmium batteries, nickel-hydrogen batteries, lithium ion batteries, and lithium ion polymer batteries. Such a secondary battery is being applied to be used in small-sized products such as digital cameras, P-DVDs, MP3Ps, mobile phones, PDAs, portable game devices, power tools, E-bikes, and the like as well as large-sized products requiring high power such as electric vehicles and hybrid vehicles, power storage devices for storing surplus power or renewable energy, and backup power storage devices.

In general, in order to manufacture the secondary battery, first, electrode active material slurry is applied to a positive electrode collector and a negative electrode collector to manufacture a positive electrode and a negative electrode. Then, the electrodes are stacked on both sides of a separator to form an electrode assembly. Also, the electrode assembly is accommodated in a battery case, and then the battery case is sealed after an electrolyte is injected therein.

Such a secondary battery is classified into a pouch type secondary battery and a can type secondary battery according to a material of a case accommodating the electrode assembly. In the pouch type secondary battery, an electrode assembly is accommodated in a pouch made of a flexible polymer material. Also, in the can type secondary battery, an electrode assembly is accommodated in a case made of a metal or plastic material.

A pouch, which is a case of the pouch type secondary battery, is manufactured by forming a cup part by performing press processing on a pouch film having flexibility. In addition, when the cup part is formed, an electrode assembly is accommodated in an accommodation space of the cup part, and then, a side of the cup part is sealed to manufacture a secondary battery.

In the press processing, drawing molding is performed by inserting a pouch film into a molding device such as a press equipment and applying a pressure to the pouch film by using a punch to draw the pouch film. Therefore, when molding the cup part on the pouch film, there is a limit to improving the curvature radius and clearance of the edge of the cup part. In addition, the volume ratio of the electrode assembly to the volume of the cup part is small, and there is a limit in reducing the size of the bat ear, so that the energy density compared to the volume relative of the secondary battery is also reduced. Furthermore, there was a limitation in manufacturing a sharp shape as a whole, and thus, the outer appearance of the secondary battery is not elegant, and thus, there has been a problem in that the marketability is also lowered.

Japanese Patent Registration No. 6022956 exists as a prior art document.

DISCLOSURE OF THE INVENTION

Technical Problem

An object to be achieved by the present invention is to provide a pouch-type battery case, which is capable of increasing in energy density relative to a volume, having an elegant outer appearance, and improving marketability, and a pouch type secondary battery.

The objects of the present invention are not limited to the aforementioned object, but other objects not described herein will be clearly understood by those skilled in the art from descriptions below.

Technical Solution

A pouch-type battery case according to an embodiment of the present invention for achieving the above object includes a cup part configured to accommodate an electrode assembly formed by stacking electrodes and separators, wherein the cup part comprises: a plurality of die edge configured to connect a plurality of outer walls configured to surround a periphery thereof to a side or degassing part, and at least one of the die edges is rounded at a curvature radius of 1 mm or less, and wherein the cup part has a depth of 6.5 mm or less.

In addition, at least one of the die edges may have a curvature radius of 0.7 mm or less.

In addition, the die edge may have a curvature radius that corresponds to $1/20$ to $1/6$ of a depth of the cup part.

In addition, the cup part may further include: a plurality of punch edges which connect the outer wall to the bottom part and of which at least one is rounded at a curvature radius of 1 mm or less; and a thickness edge configured to connect two outer walls adjacent to each other.

In addition, a vertical distance between a die edge vertical line, which passes a boundary point of the die edge and the die edge-side outer wall and is perpendicular to the bottom part, and an edge vertical line, which passes a boundary point of the die edge-side punch edge and the die edge-side outer wall and is perpendicular to the bottom part, may be 0.5 mm or less.

In addition, the thickness edge may be connected to the two punch edges adjacent to each other to form a corner, and at least one of the corner may be rounded at a curvature radius of 2 mm to 5 mm, wherein the curvature radius is greater than that of the thickness edge.

In addition, the corner may have a variable curvature radius therein.

In addition, a curvature radius of a central portion of the corner may be greater than that of a peripheral portion of the corner.

In addition, at least one of the punch edges may have a curvature radius of 0.7 mm or less.

In addition, the punch edge may have a curvature radius that corresponds to $1/20$ to $1/6$ of a depth of the cup part.

In addition, the pouch-type battery case may further include: a first case and a second case in which cup parts are formed, respectively; and a bridge formed between the two cup parts, wherein the bridge may have a thickness of 2 mm or less.

In addition, the bridge may have a thickness of 1.4 mm or less.

In addition, the bridge may have a thickness that corresponds to $1/200$ to $1/30$ of a width of the electrode assembly.

In addition, the bridge may be rounded at a curvature radius of 1 mm or less.

In addition, the bridge may be rounded at a curvature radius of 0.7 mm or less.

In addition, the bridge may have a thickness corresponding to a distance between two bridge vertical lines, which pass through a boundary point of the bridge and a bridge-side outer wall, respectively, and are perpendicular to a bottom part.

In addition, an outer wall may be inclined at an inclination angle of 90° to 95° from a bottom part.

A pouch-type secondary battery according to an embodiment of the present invention for achieving the above object includes: an electrode assembly in which electrodes and separators are stacked; a pouch-type battery case comprising a cup part configured to accommodate the electrode assembly therein, wherein the battery case includes: a first case and a second case, of which at least one comprises a cup part; and a folding part configured to integrally connect the first case to the second case, wherein the folding part has a width of 1 mm to 3.2 mm, and the cup part has a depth of 6.5 mm or less.

In addition, the electrode assembly may have a surface area of 15,000 mm² to 100,000 mm².

In addition, the folding part may have a width of 1 mm to 1.6 mm.

In addition, the folding part may include a groove that is recessed inward.

In addition, the battery case may include a pair of protrusions protruding outward with the groove therebetween, and a distance between the innermost portion of the groove and the outermost portion of the protrusion may be 0.8 mm or less.

In addition, a difference in width of the cup part and the electrode assembly may be 2.5 mm or less.

In addition, a difference in width of the cup part and the electrode assembly may be 1.7 mm or less.

In addition, the width of the cup part may be a distance between both ends of both outer walls of the cup part.

In addition, the cup part may include: a plurality of punch edges which connect a plurality of outer walls configured to surround a periphery thereof to a bottom part and of which at least one is rounded at a curvature radius of 1 mm or less; a plurality of die edges which connect the outer walls to a side or a degassing part and of which at least one is rounded at a curvature radius of 1 mm or less; and a thickness edge configured to connect the two outer walls adjacent to each other.

In addition, a vertical distance between a die edge vertical line, which passes a boundary point of the die edge and the die edge-side outer wall and is perpendicular to the bottom part, and an edge vertical line, which passes a boundary point of the die edge-side punch edge and the die edge-side outer wall and is perpendicular to the bottom part, may be 0.5 mm or less.

In addition, in the electrode assembly, one end of at least one of the electrodes may be disposed so that a vertical distance from the edge vertical line is 0.75 mm or less.

In addition, in the electrode assembly, one end of at least one of the electrodes may be disposed so that a vertical distance from the edge vertical line is 0.5 mm or less.

In addition, in the separator, a peripheral portion protruding outward from the electrode may be folded in an opposite direction of the bottom part with respect to one end of the electrode.

In addition, in the electrode assembly, each of the electrode and the separator may be provided in plurality, in the separator accommodated in the cup part of the first case, the peripheral portion may be folded toward the second case, and in the separator accommodated in the cup part of the second case, the peripheral portion may be folded toward the first case.

In addition, the peripheral portion of at least one separator may be aligned with the peripheral portion of an adjacent separator and be folded.

In addition, at least one of the punch edges may have a curvature radius of 0.7 mm or less.

In addition, the punch edge may have a curvature radius that corresponds to $1/20$ to $1/6$ of a depth of the cup part.

In addition, at least one of the die edges may have a curvature radius of 0.7 mm or less.

In addition, the die edge may have a curvature radius that corresponds to $1/20$ to $1/6$ of a depth of the cup part.

In addition, an outer wall may be inclined at an inclination angle of 90° to 95° from the bottom part.

In addition, the thickness edge may be connected to the two punch edges adjacent to each other to form a corner, and at least one of the corner may be rounded at a curvature radius of 2 mm to 5 mm, wherein the curvature radius is greater than that of the thickness edge.

In addition, the corner may have a variable curvature radius therein.

In addition, a curvature radius of a central portion of the corner may be greater than that of a peripheral portion of the corner.

In addition, the pouch-type secondary battery may further include a bat ear protruding outward by a length of 1.5 mm from a portion of both ends of the folding part.

In addition, an angle between the folding par and an inner edge of the bat ear may be greater than 151 degrees.

Other particularities of the embodiments are included in the detailed description and drawings.

Advantageous Effects

According to the embodiments of the present invention, there are at least the following effects.

The curvature radius of and clearance of the edge of the cup part of the pouch-type battery case and the pouch-type secondary battery may be formed to be smaller, and the thickness of the bridge may be formed to be thinner, and thus, the width of the folding part may be reduced, the volume of the electrode assembly may increase, the size of the bat ear may be reduced, and the edge high phenomenon may be prevented from occurring, and therefore, the energy density relative to volume may increase.

In addition, since each of the pouch type battery case 13 and the pouch type secondary battery has the sharp shape on the whole, the outer appearance of the secondary battery may be elegant, and the marketability may be improved.

The effects of the prevent invention are not limited by the aforementioned description, and thus, more varied effects are involved in this specification.

MODE FOR CARRYING OUT THE INVENTION

Figure 1:
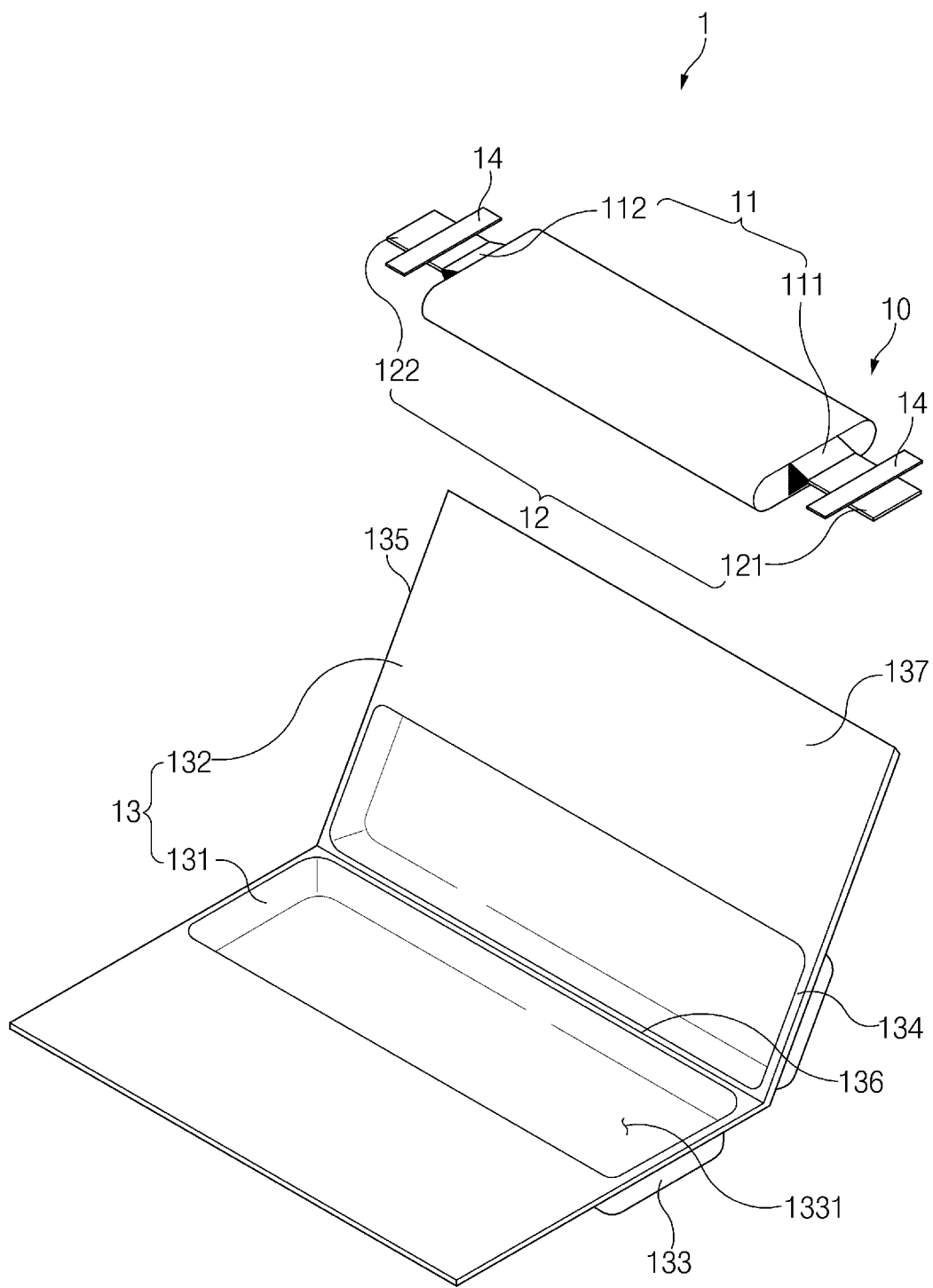
FIG. 1 is an assembled view of a secondary battery according to an embodiment of the present invention.

Advantages and features of the present invention, and implementation methods thereof will be clarified through following embodiments described with reference to the accompanying drawings. The present invention may, however be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Unless terms used in the present invention are defined differently, all terms (including technical and scientific terms) used herein have the same meaning as generally understood by those skilled in the art. Also, unless defined clearly and apparently in the description, the terms as defined in a commonly used dictionary are not ideally or excessively construed as having formal meaning.

In the following description, the technical terms are used only for explaining a specific exemplary embodiment while not limiting the present invention. In this specification, the terms of a singular form may include plural forms unless specifically mentioned. The meaning of "includes (comprises)" and/or "including (comprising)" does not exclude other components besides a mentioned component.

Hereinafter, preferred embodiments will be described in detail with reference to the accompanying drawings.

FIG. 1 is an assembled view of a secondary battery 1 according to an embodiment of the present invention;

According to an embodiment of the present invention, the curvature radius of and clearance of the edge of the cup part of the pouch-type battery case and the pouch-type secondary battery may be formed to be smaller, and the thickness of the bridge may be formed to be thinner, and thus, the width of the folding part may be reduced, the volume of the electrode assembly may increase, the size of the bat ear may be reduced, and the edge high phenomenon may be prevented from occurring, and therefore, the energy density relative to volume may increase. In addition, since each of the pouch type battery case 13 and the pouch type secondary battery has the sharp shape on the whole, the outer appearance of the secondary battery may be elegant, and the marketability may be improved.

For this, a pouch-type battery case according to an embodiment of the present invention includes a cup part accommodating an electrode assembly, in which electrodes and separators are stacked, wherein the cup part includes: a plurality of punch edges which connect a plurality of outer walls surrounding a periphery thereof to a bottom part, and of which at least one is rounded at a curvature radius of 1 mm or less, a plurality of die edges which connect the outer walls to a side or a degassing part and of which at least one is rounded at a curvature radius of 1 mm or less, and a thickness edge configured to connect two adjacent outer walls to each other, wherein a vertical distance between a die edge vertical line passing through a boundary point of the die edge and the die edge-side outer wall and perpendicular to the bottom part and an edge vertical line passing through a boundary point of the die edge-side punch edge and die edge-side outer wall and perpendicular to the bottom part is 0.5 mm or less, the thickness edge is connected to the two punch edges adjacent to each other to form a corner, wherein at least one of the corner is rounded at a curvature radius of 2 mm to 5 mm, wherein the curvature radius is greater than that of the thickness edge, and the cup part has a depth of 6.5 mm or less.

In addition, a pouch-type secondary battery according to an embodiment of the present invention includes: an electrode assembly, in which electrodes and separators are stacked; and a pouch-type battery case including a cup part configured to accommodate the electrode assembly therein, wherein the battery case includes: a first case and a second case, of which at least one includes the cup part; a folding part configured to integrally connect the first case to the second case; and a bat ear protruding outward from each of both ends of the folding part, wherein the cup part includes: a plurality of punch edges which connect a plurality of outer walls surrounding a periphery thereof to a bottom part, and of which at least one is rounded at a curvature radius of 1 mm or less, a plurality of die edges which connect the outer walls to a side or a degassing part and of which at least one is rounded at a curvature radius of 1 mm or less, and a thickness edge configured to connect two adjacent outer walls to each other, wherein a vertical distance between a die edge vertical line passing through a boundary point of the die edge and the die edge-side outer wall and perpendicular to the bottom part and an edge vertical line passing through the die edge-side punch edge and die edge-side outer wall and perpendicular to the bottom part is 0.5 mm or less, the thickness edge is connected to the two punch edges adjacent to each other to form a corner, wherein at least one of the corner is rounded at a curvature radius of 2 mm to 5 mm, wherein the curvature radius is greater than that of the thickness edge, the folding part has a width of 1 mm to 3.2 mm, the bat ear has a length of 1 mm or less, a difference in width of the cup part and width of the electrode assembly is 2.5 mm or less, and the cup part has a depth of 6.5 mm or less.

Figure 5:
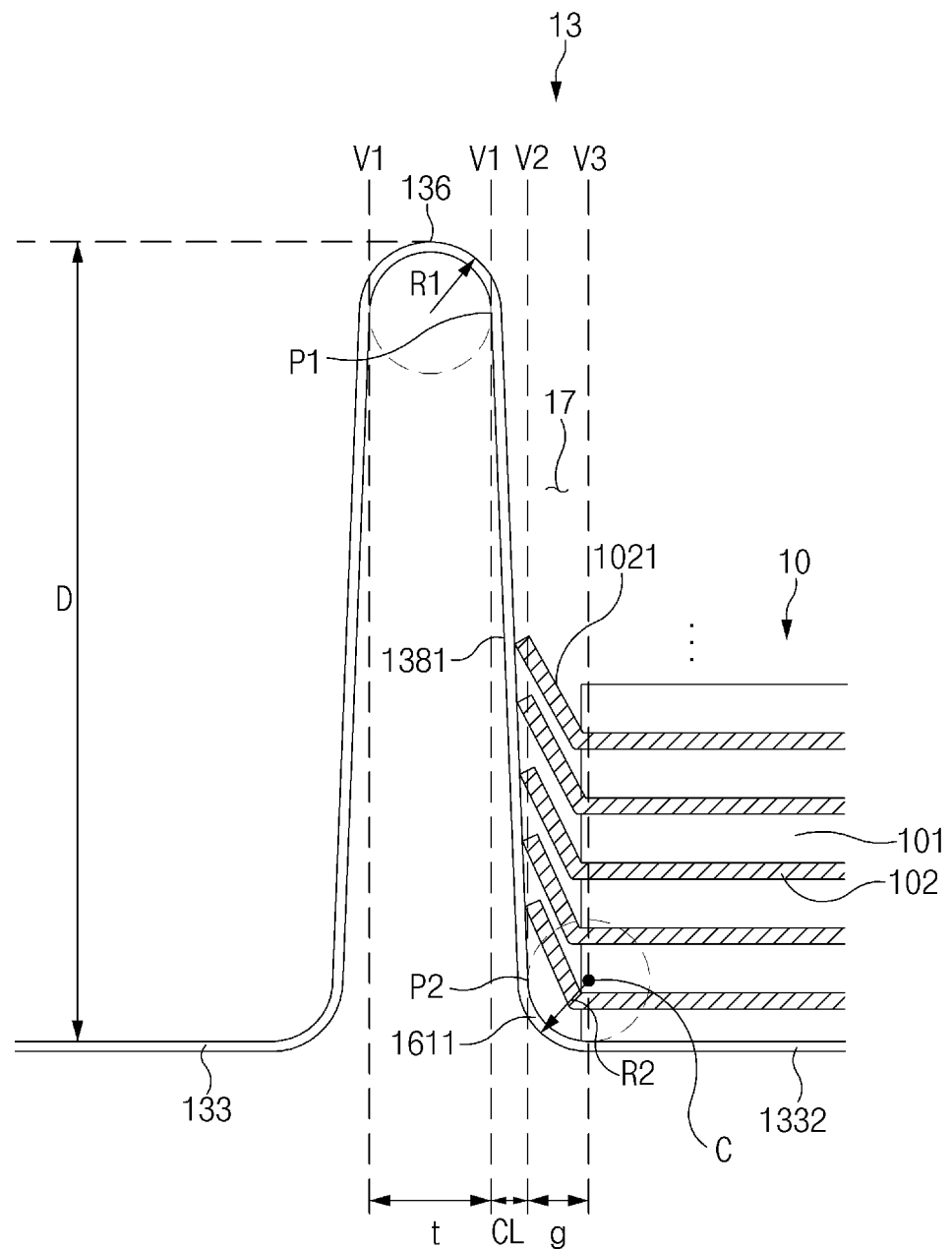
FIG. 5 is an enlarged schematic view of a cup part and a bridge according to an embodiment of the present invention.

The electrode assembly 10 is formed by alternately stacking electrodes 101 (see FIG. 5) and separators 102 (see FIG. 5). First, slurry in which an electrode active material, a binder, and a plasticizer are mixed with each other is applied to a positive electrode collector and a negative electrode collector to manufacture the electrodes 101 such as a positive electrode and a negative electrode. Then, respective separators 102 are stacked between the electrodes 101 to form the electrode assembly 10, the electrode assembly 10 is inserted into the battery case 13, and an electrolyte is injected to seal the battery case 13.

The electrode assembly 10 may have a surface area of 15,000 mm$^2$ to 100,000 mm$^2$, which is obtained by multiplying a full length by a full width. In particular, the full width of the electrode assembly 10 may be 60 mm or more. Also, the electrode assembly 10 may have a thickness of 6 mm or more in a stacked direction. Therefore, the electrode assembly 10 according to an embodiment of the present invention may provide a large battery capacity when compared to a general small-sized battery.

Specifically, the electrode assembly 10 includes two types of electrodes 101 such as a positive electrode and a negative electrode, and a separator 102 interposed between the electrodes 101 to insulate the electrodes 101 from each other.

The electrode assembly 10 may be a stack type, a jelly roll type, a stacked and folding type, or the like. Each of the two types of electrodes 101, i.e., the positive electrode and the negative electrode has a structure in which active material slurry is applied to the electrode collector having a metal foil or metal mesh shape. The active material slurry may be usually formed by agitating a granular active material, a conductor, and the like in a state of adding a solvent. The solvent may be removed in the subsequent process.

As illustrated in FIG. 1, the electrode assembly 10 includes electrode tabs 11. The electrode tabs 11 are respectively connected to a positive electrode and a negative electrode of the electrode assembly 10 to protrude outward from the electrode assembly 10, thereby providing a path, through which electrons are moved, between the inside and outside of the electrode assembly 10. An electrode collector of the electrode assembly 10 is constituted by a portion coated with an electrode active material and a distal end, on which the electrode active material is not applied, i.e., a non-coating part. Also, each of an electrode tabs 11 may be formed by cutting the non-coating part or by connecting a separate conductive member to the non-coating part through ultrasonic welding. As illustrated in FIG. 1, the electrode tabs 11 may protrude in each of different directions of the electrode assembly 10, but is not limited thereto. For example, the electrode tabs may protrude in various directions, for example, protrude in parallel to each other from one side in the same direction.

In the electrode assembly 10, an electrode lead 12 that supplies electricity to the outside of the secondary battery 1 is connected to the electrode tab 11 through spot welding. Also, a portion of the electrode lead 12 is surrounded by an insulating part 14. The insulating part 14 may be disposed to be limited to a side 134, at which a first case 131 and a second case 132 of the battery case 13 are thermally fused, so that the electrode lead 12 is bonded to the battery case 13. Also, electricity generated from the electrode assembly 10 may be prevented from flowing to the battery case 13 through the electrode lead 12, and the sealing of the battery case 13 may be maintained. Thus, the insulating part 14 may be made of a nonconductor having non-conductivity, which is not electrically conductive. In general, although an insulation tape which is easily attached to the electrode lead 12 and has a relatively thin thickness is mainly used as the insulating part 14, the present invention is not limited thereto. For example, various members may be used as the insulating part 14 as long as the members are capable of insulating the electrode lead 12.

One end of the electrode lead 12 is connected to the electrode tab 11, and the other end of the electrode lead 12 protrudes to the outside of the battery case 13. That is, the electrode lead 12 includes a cathode lead 121 having one end connected to a cathode tab 111 to extend in a direction in which the cathode tab 111 protrudes and an anode lead 122 having one end connected to an anode tab 112 to extend in a direction in which the anode tab 112 protrudes. On the other hand, as illustrated in FIG. 1, all of the other ends of the positive electrode lead 121 and the negative electrode lead 122 protrude to the outside of the battery case 13. As a result, electricity generated in the electrode assembly 10 may be supplied to the outside. Also, since each of the positive electrode tab 111 and the negative electrode tab 112 is formed to protrude in various directions, each of the positive electrode lead 121 and the negative electrode lead 122 may extend in various directions.

The positive electrode lead 121 and the negative electrode lead 122 may be made of materials different from each other.

That is, the cathode lead 121 may be made of the same material as the cathode collector, i.e., an aluminum (Al) material, and the anode lead 122 may be made of the same material as the anode collector, i.e., a copper (Cu) material or a copper material coated with nickel (Ni). Also, a portion of the electrode lead 12, which protrudes to the outside of the battery case 13, may be provided as a terminal part and electrically connected to an external terminal.

The battery case 13 is a pouch, which is manufactured by molding a flexible material and accommodates the electrode assembly 10 therein. Hereinafter, the case in which the battery case 13 is the pouch will be described. When a pouch film 135 having flexibility is drawing-molded by using a punch 22 (see FIG. 6) or the like, a portion of the pouch film 135 is drawn to form the cup part 133 including a pocket-shaped accommodation space 1331, thereby manufacturing the battery case 13.

The battery case 13 accommodates the electrode assembly 10 so that a portion of the electrode lead 12 is exposed and then is sealed. As illustrated in FIG. 1, the battery case 13 includes the first case 131 and the second case 132. The accommodation space 1331 in which the cup part 133 is formed to accommodate the electrode assembly 10 may be provided in the first case 131, and the second case 132 may cover an upper side of the accommodation space 1331 so that the electrode assembly 10 is not separated to the outside of the battery case 13. As illustrated in FIG. 1, one side of the first case 131 and one side of the second case 132 may be connected to each other. However, the present invention is not limited thereto. For example, the first case 131 and the second case 132 may be separately manufactured to be separated from each other.

When the cup part 133 is molded in the pouch film 135, only one cup part 133 may be formed in one pouch film 135, but the present invention is not limited thereto. For example, two cup parts may be drawing-molded to be adjacent to each other in one pouch film 135. Then, as illustrated in FIG. 1, the cup parts 133 are formed in the first case 131 and the second case 132, respectively. Here, each of the cup parts 133, which are respectively formed in the first case 131 and the second case 132, may have the same depth D, but is not limited thereto, and may have different depths D.

According to an embodiment of the present invention, the depth D of the cup part 133 may be 3 mm or more and 6.5 mm or less. Therefore, the cup part 133 according to an embodiment of the present invention may accommodate the electrode assembly 10 having a larger electrode capacity compared to a general small-sized battery.

After accommodating the electrode assembly 10 in the accommodation space 1331 provided in the cup part 133 of the first case 131, the battery case 13 may be folded with respect to a bridge 136 formed between the two cup parts 133 in the battery case 13 so that the two cup parts 133 face each other. Then, the cup part 133 of the second case 132 also accommodates the electrode assembly 10 from the upper side thereof. Accordingly, since the two cup parts 133 accommodate one electrode assembly 10, the electrode assembly 10 having a thicker thickness may be accommodated when compared to a case in which one cup part 133 is provided. In addition, since the first case 131 and the second case 132 are integrally connected to each other by folding the battery case 13, the number of sides 134 to be sealed when a sealing process is performed later may be reduced. Thus, a process rate may be improved, and the number of sealing processes may be reduced.

The battery case 13 may include the cup part 133, in which the accommodation space 1331 accommodating the electrode assembly 10 is provided, and a degassing part 137 formed at a side portion of the cup part 133 to discharge a gas generated in the cup part 133 through a degassing hole H. When the electrode assembly 10 is accommodated in the cup part 133 of the battery case 13, and the electrolyte is injected, and then an activation process is performed, a gas is generated inside the battery case 13, and thus, a degassing process for discharging the gas to the outside is performed. Detailed description of the degassing part 137 will be described later.

When the electrode lead 12 is connected to the electrode tab 11 of the electrode assembly 10, and the insulating part 14 is formed on a portion of the electrode lead 12, the electrode assembly 10 is accommodated in the accommodation space 1331 provided in the cup part 133 of the first case 131, and the second case 132 covers the accommodation space from the upper side. Also, the electrolyte is injected into the accommodation space, and the side 134 extending to the outside of the cup part 133 of each of the first case 131 and the second case 132 is sealed. The electrolyte may move lithium ions generated by electrochemical reaction of the electrode 101 during charging and discharging of the secondary battery 1. The electrolyte may comprise a non-aqueous organic electrolyte that is a mixture of a lithium salt and a high-purity organic solvent or a polymer using a polymer electrolyte. Furthermore, the electrolyte may include a sulfide-based, oxide-based, or polymer-based solid electrolyte, and the solid electrolyte may have flexibility that is easily deformed by external force. The pouch type secondary battery 1 may be manufactured through the above-described method.

Figure 2:
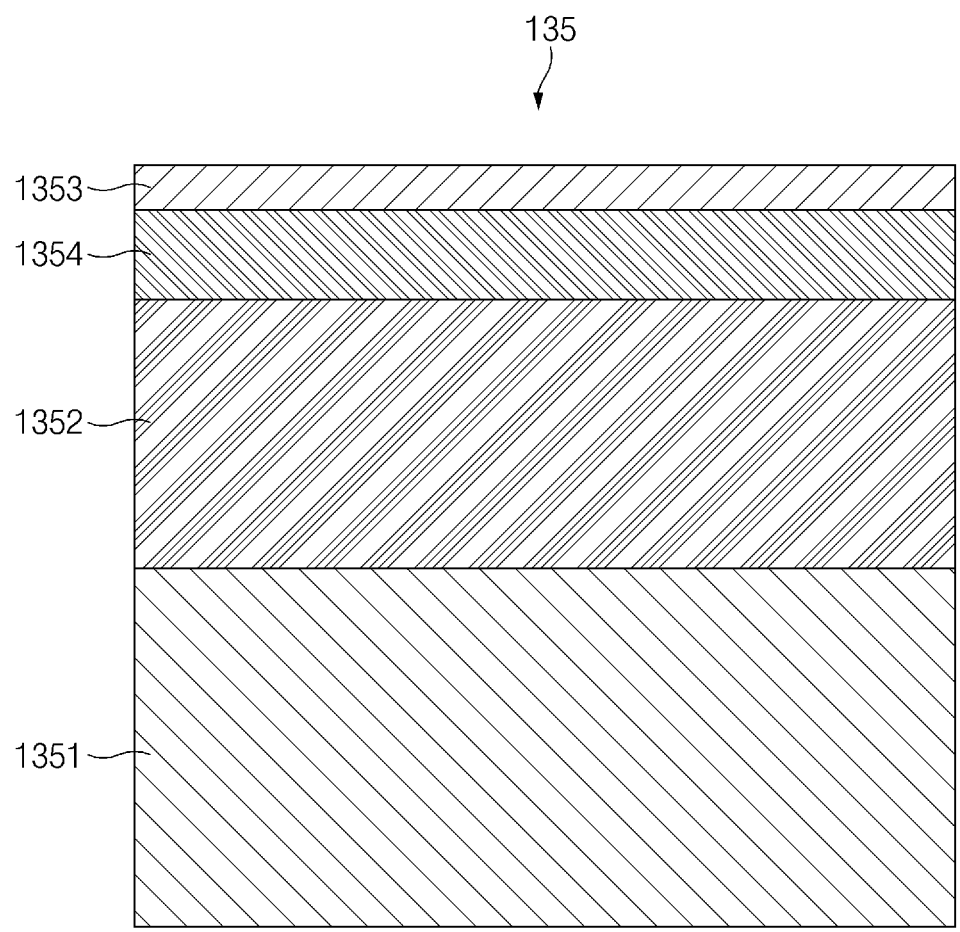
FIG. 2 is a cross-sectional view of a pouch film according to an embodiment of the present invention.

FIG. 2 is a cross-sectional view of a pouch film 135 according to an embodiment of the present invention;

The pouch that is the battery case 13 of the pouch type secondary battery 1 according to an embodiment of the present invention may be manufactured by drawing the pouch film 135. That is, the pouch film 135 is drawn by using the punch 22 or the like to form the cup part 133, thereby manufacturing the battery case 13. According to an embodiment of the present invention, as illustrated in FIG. 2, the pouch film 135 may include the sealant layer 1351, the moisture barrier layer 1352, and the surface protection layer 1353, and further include a drawing assistance layer 1354 if necessary.

The sealant layer 1351 may be made of the first polymer and be formed at the innermost layer to be in direct contact with the electrode assembly 10. Here, the innermost layer represents a layer disposed at the last when oriented in a direction opposite to the direction in which the electrode assembly 10 is disposed with respect to the moisture barrier layer 1352. The battery case 13 may be manufactured while a portion of the pouch film 135 is drawn to form the cup part 133 including the accommodation space 1331 having the pocket shape when the pouch film 135 having the stacked structure as described above is drawing-molded by using the punch 22 or the like. Also, when the electrode assembly 10 is accommodated in the accommodation space 1331, the electrolyte is injected. Thereafter, when the first case 131 and the second case 132 are in contact with each other so as to face each other, and thermal compression is applied to the side 134, the sealant layers 1351 are bonded to each other to seal the pouch. Here, since the sealant layer 1351 is in direct contact with the electrode assembly 10, the sealant layer 1351 has to have insulating properties. Also, since sealant layer 1351 is in contact with the electrolyte, the sealant layer 1351 has to have corrosion resistance. Also, since the inside of the battery case 13 is completely sealed to prevent materials from moving between the inside and outside of the battery case 13, high sealability has to be realized. That is, the side 134 in which the sealant layers 1351 are bonded to each other should have superior thermal bonding strength. In general, the first polymer forming the sealant layer 1351 may include one or more materials selected from the group consisting of polyethylene, polypropylene, polycarbonate, polyethylene terephthalate, polyvinyl chloride, acrylic polymer, polyacrylonitrile, polyimide, polyamide, cellulose, aramid, nylon, polyester, polyparaphenylene benzobisoxazole, polyarylate, teflon, and glass fiber. Particularly, a polyolefin-based resin such as polypropylene (PP) or polyethylene (PE) is used for the sealant layer 1351. Polypropylene (PP) is excellent in mechanical properties such as tensile strength, rigidity, surface hardness, abrasion resistance, and heat resistance and chemical properties such as corrosion resistance and thus is mainly used for manufacturing the sealant layer 1351. Furthermore, the sealant layer 1351 may be made of a casted polypropylene, an acid modified polypropylene, or a polypropylene-butylene-ethylene terpolymer. Here, the acid-treated polypropylene may be maleic anhydride polypropylene (MAH PP). Also, the sealant layer 1351 may have a single layer structure made of one material or a composite layer structure in which two or more materials are respectively formed as layers.

The moisture barrier layer 1352 is stacked between the surface protection layer 1353 and the sealant layer 1351 to secure mechanical strength of the pouch, block introduction and discharge of a gas or moisture outside the secondary battery 1, and prevent the electrolyte from leaking. The moisture barrier layer 1352 may be made of an aluminum alloy thin film. The aluminum alloy thin film may secure the mechanical strength having a predetermined level or more, but be light in weight. Thus, the aluminum alloy thin film may complement for electrochemical properties and secure heat dissipation due to the electrode assembly 10 and the electrolyte.

More specifically, the aluminum alloy thin film according to an embodiment of the present invention may have a grain size of 10 μm to 13 μm, preferably 10.5 μm to 12.5 μm, and more preferably 11 μm to 12 μm. When the grain size of the aluminum alloy thin film satisfies the above range, the molding depth may increase without causing the pinholes or cracks when the cup is molded.

The aluminum alloy thin film may include one or two kinds or more selected from the group consisting of iron (Fe), copper (Cu), chromium (Cr), manganese (Mn), nickel (Ni), magnesium (Mg), and zinc (Zn) in addition to aluminum.

The surface protection layer 1353 is made of the second polymer and formed at the outermost layer to protect the secondary battery 1 against external friction and collision and also electrically insulates the electrode assembly 10 from the outside. Here, the outermost layer represents a layer disposed at the last when oriented in a direction opposite to the direction in which the electrode assembly 10 is disposed with respect to the moisture barrier layer 1352. The second polymer forming the surface protection layer 1353 may include one or more materials selected from the group consisting of polyethylene, polypropylene, polycarbonate, polyethylene terephthalate, polyvinyl chloride, acrylic polymer, polyacrylonitrile, polyimide, polyamide, cellulose, aramid, nylon, polyester, polyparaphenylene benzobisoxazole, polyarylate, teflon, and glass fiber. Particularly, a polymer such as polyethylene terephthalate (PET) having abrasion resistance and heat resistance may be used mainly. Also, the surface protection layer 1353 may have a single layer structure made of one material or a composite layer structure in which two or more materials are respectively formed as layers.

Although PET is inexpensive, has excellent durability, and has excellent electrical insulation, the PET has poor adhesiveness with respect to aluminum, which is frequently used for the moisture barrier layer 1352, and also, a behavior when the PET is elongated by applying stress is different. Thus, when the surface protection layer 1353 and the moisture barrier layer 1352 are directly bonded to each other, the protection layer 1353 and the moisture barrier layer 1352 may be delaminated during the drawing molding. As a result, the moisture barrier layer 1352 is not uniformly drawn to cause the deterioration in moldability.

According to an embodiment of the present invention, the battery case 13 may be made of a third polymer and further include the drawing assistance layer 1354 that is stacked between the surface protection layer 1353 and the moisture barrier layer 1352. The drawing assistance layer 1354 stacked between the surface protection layer 1352 and the moisture barrier layer 1352 to prevent the surface protection layer 1353 and the moisture barrier layer 1352 from being delaminated when the surface protection layer 1352 and the moisture barrier layer 1352 are drawn. The third polymer forming the drawing assistance layer 1354 may include one or more materials selected from the group consisting of polyethylene, polypropylene, polycarbonate, polyethylene terephthalate, polyvinyl chloride, acrylic polymer, polyacrylonitrile, polyimide, polyamide, cellulose, aramid, nylon, polyester, polyparaphenylene benzobisoxazole, polyarylate, teflon, and glass fiber. Particularly, since a nylon resin easily adheres to polyethylene terephthalate (PET) of the surface protection layer 1352, and a behavior when being elongated is similar to that of an aluminum alloy of the moisture barrier layer 1352, it is preferable that the nylon resin is mainly used. Also, the drawing assistance layer 1354 may have a single layer structure made of one material or a composite layer structure in which two or more materials are respectively formed as layers.

The pouch film 135 according to the present invention may have a total thickness of 160 μm to 200 μm, preferably 180 μm to 200 μm. When the thickness of the pouch film 135 satisfies the above range, the molding depth may increase while minimizing the reduction of the battery accommodation space and the deterioration of the sealing durability due to the increase in thickness of the pouch.

Figure 3:
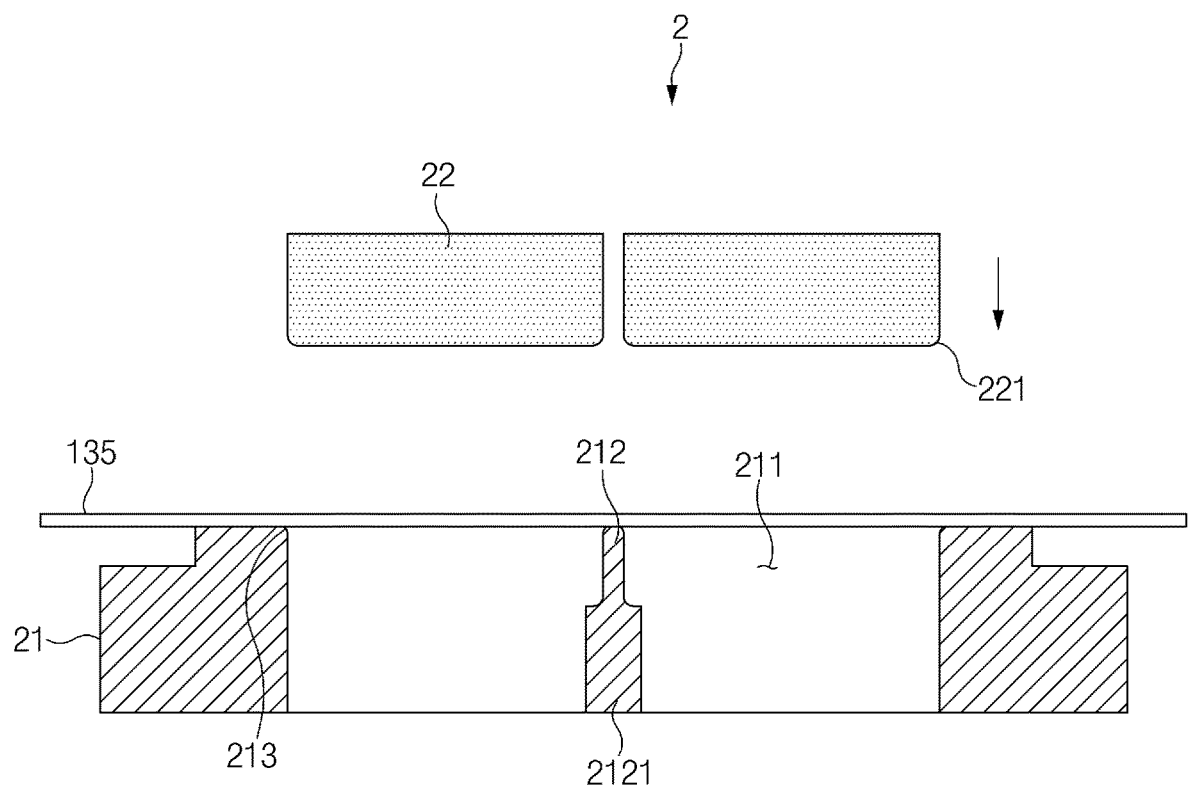
FIG. 3 is a schematic view of a molding device according to an embodiment of the present invention.

FIG. 3 is a schematic view of a molding device 2 according to an embodiment of the present invention.

The molding device 2 for molding the pouch film 135 according to an embodiment of the present invention includes a die 21 on which the pouch film 135 is seated on a top surface thereof, and a punch 22 disposed above the die 21 to descend, thereby punching the pouch film 135. In addition, the die 21 includes a molding part 211 that is recessed inward from the top surface, and the punch 22 forms the cup part 133 by inserting the pouch film 135 into the molding part 211 to drawing-mold the pouch film 135.

According to an embodiment of the present invention, when the pouch film 135 is molded using the molding device 2, as illustrated in FIG. 3, the die 21 has two molding parts 211 adjacent to each other, and a partition wall 212 is formed between the two molding parts 211. When the pouch film 135 is drawing-molded while the punch 22 is inserted into the two molding parts 211 to drawing-mold the pouch film 135, one cup part may be formed in each of a first case 131 and a second case 132 to correspond to each of the two molding parts 211, and as a result, a total of two cup parts 133 are formed. In addition, a bridge 136 may also be formed between the two cup parts 133 to correspond to the partition wall 212.

The bridge 136 may serve as a reference portion when the battery case 13 is folded later. When the manufacture of the secondary battery 1 is completed, the bridge 136 may form a folding part 139 (see FIG. 11) at one side of the secondary battery 1. Since the folding part 139 integrally connects the first case 131 and the second case 132 to each other, the number of sides 134 to be sealed may be reduced when a sealing process is performed later. Thus, a process rate may be improved, and the number of sealing processes may be reduced. Here, as a width of the folding part 139 decreases, a space 17 (see FIG. 5) between the outer wall 138 (see FIG. 5) of the cup part 133 and the electrode assembly 10 may also decrease, and thus, since the entire volume of the secondary battery 1 is reduced, the energy density relative to the volume may increase.

Since the width of the folding part 139 is proportional to a thickness t (see FIG. 5) of the bridge 136, and the bridge 136 is formed to correspond to the partition wall 212, the thickness t of the bridge 136 is proportional to the thickness of the partition wall 212. Therefore, when the pouch film 135 is molded, the thickness t of the bridge 136 may be minimized, and for this, the thickness of the partition wall 212 may be minimized. However, if the partition wall 212 is formed to have an excessively high height in a thin state, the partition wall 212 may be damaged in the drawing-molding process. Particularly, according to the related art, the die has the bottom, but in this case, when the punch 22 molds the pouch film 135, a gas existing in the space between the pouch film 135 and the molding part 211 may not be discharged. Therefore, recently, the bottom of the die may be removed so that the gas existing in the space between the pouch film 135 and the molding part 211 is easily discharged, but the height of the partition wall 212 may be excessively high. Therefore, according to an embodiment of the present invention, as illustrated in FIG. 3, a reinforcing part 2121 that has a thickness greater than that of the partition wall 212 may be formed at a lower portion of the partition wall 212. The reinforcing part 2121 may be formed to be deeper than a depth D of the cup part 133 to be formed in the battery case 13 and may be formed at a position at which the partition wall 212 is not damaged. An exact position of the reinforcing part 2121 may be experimentally determined according to the thickness of the partition wall 212, a material of the partition wall 212, a pressure of the punch 22, and the depth D of the cup part 133 to be formed.

Figure 4:
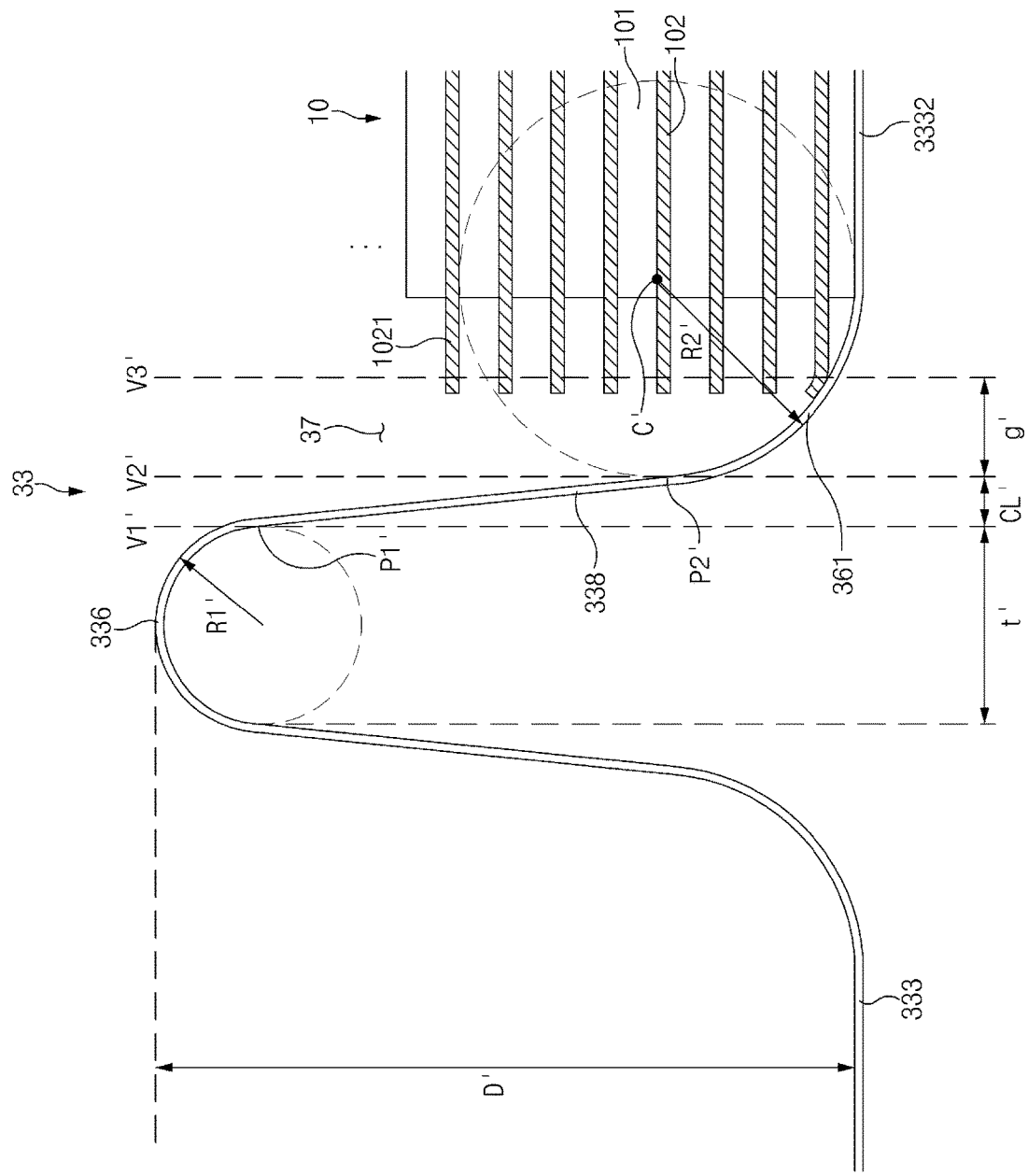
FIG. 4 is an enlarged schematic view of a cup part and a bridge of a pouch film according to a related art.

FIG. 4 is an enlarged schematic view of a cup part 333 and a bridge 336 according to a related art.

According to the related art, there is a limitation in manufacturing the battery case 33 and the secondary battery 3 as a whole in a sharp shape.

Specifically, there is a limitation in reducing the curvature radius of the edge 36 of the cup part 333 according to the related art.

The edge 36 of the cup part 333 includes a punch edge 361 formed to correspond to the edge 221 (see FIG. 3) of the punch 22 and a die edge 362 (see FIG. 8) formed to correspond to the edge 213 (see FIG. 6) of the die 21.

The punch edge 361 connects each of the plurality of outer walls 338 surrounding the periphery of the cup part 333 to the bottom part 3332. However, if rounding treatment is not performed on the edge 221 of the punch 22, the edge 221 of the punch 22 is sharped. As a result, when the pouch film is formed, stress may be concentrated to the punch edge 361 of the cup part 333 to easily cause cracks. In addition, the die edge 362 connects each of the plurality of outer walls 338 to the side 134 or the degassing part 137. If rounding treatment is not performed on the pressing edge of the die 21, the pressing edge of the die 21 is sharped. As a result, when the pouch film is formed, stress is concentrated to the die edge 362 of the cup part 333 to easily cause cracks. Here, the rounding of the die edge means forming a curved surface having a curvature, and the curved surface may have only a uniform curvature, but is not limited thereto. For example, the curved surface may have a non-uniform curvature. In the present specification, that the punch edge 161, the die edge 162, the bridge 136, etc. are rounded with a specific curvature means that the punch edge 161, the die edge 162, the bridge 136, etc. not only having only the specific curvature as a whole, but also having the specific curvature only at least a portion.

In order to solve the above problem, as illustrated in FIG. 4, the edge 221 of the punch 22 and the edge 213 of the die 21 are rounded to the rounded punch edge 361 and the rounded die edge 362 of the cup part 333. As a result, the stress concentrated at the punch edge 361 and the die edge 362 of the cup part 333 may be dispersed to some extent.

However, even if the punch edge 361 and the die edge 362 of the cup part 333 are rounded and formed, if the curvature radius R2' of the punch edge 361 and the curvature radius of the die edge 362 are formed to be small when compared to the depth D' of the cup part 333, cracks occurs in the punch edge 361 and the die edge 362 of the cup part 333. For example, in related art, if the depth D' is approximately 7 mm or more in a case in which one cup part 333 is molded, and the depth D' is approximately 6.5 mm or more in a case in which two cup parts 333 are molded, when each of the curvature radius R2' of the punch edge 361 and the curvature radius of the die edge 362 of the cup part 333 is 2 mm or less, cracks may occur in the pouch film 135.

In addition, when the two cup parts 133 are formed, the partition wall 212 has to exist in the die 21 in order to form the bridge 136. However, in the related art, if the depth D' of the cup part 333 is formed to be deep (e.g., 6.5 mm or more), there is a limitation in forming the thin thickness of the bridge 336. That is, if the partition wall 212 is also formed to have a predetermined thickness or less in order to form the bridge 336 having a predetermined thickness or less, the cracks may occur in the bridge 336 because the partition wall 212 is sharply formed.

In order to solve this problem, as illustrated in FIG. 4, a bridge 336 is formed to be rounded by rounding the partition wall 212. As a result, the stress concentrated at the bridge 336 may be dispersed to some extent. In particular, when the curvature radius R1' of the bridge 336 is constant, the curvature radius R1' corresponds to half of a thickness t' of the bridge 336. For example, when the curvature radius R1' of the bridge 336 is formed to be close to about 1 mm, the thickness t' of the bridge 336 is formed to be close to about 2 mm.

However, even if the bridge 336 is rounded, when the depth D' of the cup part 333 is formed to be deep, if the thickness t' of the bridge 336 is small, cracks occur in the bridge 336. For example, when the depth D' of the cup part 333 is formed to be approximately 6.5 mm or more, when the curvature radius R1' of the bridge 336 is 1 mm or less, that is, the thickness t' of the bridge 336 is 2 mm or less, cracks occur in the bridge 336.

Furthermore, since a degree of a clearance CL' is also quite large, there is a limitation in forming the outer wall 338 of the cup part 333 so as to similar to the vertical state. The clearance CL refers to a vertical distance between an inner wall of the molding part 211 of the die 21 and an outer wall of the punch 22. Actually, there is a fine difference in size between the molding part 211 of the die 21 and the punch 22 as much as the clearance CL. If the clearance CL is excessively small, a distance between the inner wall of the molding part 211 and the outer wall of the punch 22 is excessively small. Then, the pouch film 135 may not be inserted into the molding part 211, or the pouch film 135 may be damaged due to large friction. On the other hand, if the clearance CL is excessively large, an inclination angle of the outer wall 338 of the cup part 333 increases, and a space 37 between the outer wall 338 of the cup part 333 and the electrode assembly 10 increases. Therefore, when the pouch film 135 is molded, the clearance CL having an appropriate size has to be set.

The bridge 336 is formed to correspond to the partition wall 212 of the die 21, and the punch edge 361 is formed to correspond to the edge 221 of the punch 22. Accordingly, a clearance CL', which is a vertical distance between the inner wall of the molding part 211 of the die 21 and the outer wall of the punch 22, may indicate a vertical distance between the bridge 336 and the punch edge 361 in the battery case 33.

Specifically, as illustrated in FIG. 4, a bridge vertical line V1' and an edge vertical line V2' are virtually illustrated. The bridge vertical line V1' is a virtual vertical line passing through a boundary point P1' between the bridge 336 and the bridge 336-side outer wall 338 and being perpendicular to a bottom part 3332. Also, the edge vertical line V2' is a virtual vertical line passing through a boundary point P2' between the bridge 336-side punch edge 361 and the bridge 336-side outer wall 338 and being perpendicular to a bottom part 3332. The bridge vertical line V1' corresponds to the inner wall of the molding part 211 of the die 21, in particular, the inner wall of the partition wall 212, and the edge vertical line V2' corresponds to the outer wall of the punch 22. Accordingly, the vertical distance between the vertical bridge line V1' and the edge vertical line V2' corresponds to the clearance CL' occurring in the battery case 33.

However, in the related art, if the depth D' of the cup part 333 is formed to be deep (e.g., 6.5 mm or more), cracks easily occur in the pouch film 135 when the clearance CL is reduced to 0.5 mm or less. As described above, in the related art, if the depth D' of the cup part 333 is formed to be deep (for example, 6.5 mm or more), there is a limit to forming a smaller clearance CL', and thus the outer wall 338 of the cup part 333 has an inclination angle greater than 95° from the bottom part 3332. That is, there is a limitation in forming the outer wall 338 of the cup part 333 to be similar to the vertical state with an inclination angle of 95° or less.

Also, since there is a limitation in improving the curvature radius R2' of the edge of the cup part 333, there is also a problem in that the volume of the electrode assembly 10 accommodated in the cup part 333 is reduced. Specifically, as illustrated in FIG. 4, in the related art, since the curvature radius R2' of the punch edge 361 of the cup part 333 is large, when the electrode assembly 10 is disposed too close to the outer wall 338 of the cup part 333, there is a problem in that the electrode 101 of the electrode assembly 10 is damaged by the punch edge 361 of the cup part 333. That is, one end of the electrode 101 including a metal is disposed on the punch edge 361 of the cup part 333, and one end of the electrode 101 is deformed to correspond to the punch edge 361 of the cup part 333 to cause the damage.

In order to solve this problem, in the related art, when the electrode assembly 10 is accommodated in the cup part 333, the electrode assembly 10 is accommodated to be spaced a certain distance from the outer wall 338 of the cup part 333. First, a vertical distance g' from the edge vertical line V2' is 0.75 mm, particularly 0.5 mm, and a reference vertical line V3' perpendicular to the bottom part 3332 is virtually shown, and then, as illustrated in FIG. 4, the electrode assembly 10 is accommodated so that one end of the electrode 101 is disposed outside the reference vertical line V3'. Accordingly, since the electrode 101 is spaced apart from the outer wall 338 of the cup part 333 to some extent, it is possible to prevent the electrode 101 from being damaged. However, in this case, since the space 37 between the outer wall 338 of the cup part 333 and the electrode assembly 10 increases, a volume ratio of the electrode assembly 10 to the volume of the cup part 333 becomes small, and thus, there is a problem in that the energy density of the secondary battery 3 relative to the volume is lowered. In addition, since a volume of an unnecessary space inside the cup part 333 increases, there is also a problem in that the electrode assembly 10 moves inside the cup part 333 before sealing the side.

In addition, in the electrode assembly 10, the electrode 101 has high rigidity that is not easily deformed by external force, whereas the separator 102 has high flexibility that is easily deformed by the external force. However, when the adjacent electrodes 101 are in direct contact with each other, short circuit occurs, and thus, the separator 102 is formed to be larger than the electrode 101 in order to prevent the short circuit from occurring. Accordingly, when the electrode assembly 10 is formed, a peripheral portion 1021 in which the separator 102 protrudes outward than the electrode 101 is formed together. However, in the related art, since the electrode assembly 10 is accommodated to be spaced a certain distance from the outer wall 338 of the cup part 333, all the peripheral portions 1021 of the separator 102 are disorderly wrinkled or folded to expose the electrode 101 to the outside, thereby increasing in possibility of occurrence of the short circuit.

As described above, in the related art, when the depth D' of the cup part 333 is formed to be deep (e.g., 6.5 mm or more), there is a limitation in improving the thickness t' of the bridge 336, the curvature radius R2' of the edge 361 of the cup part 333, and the clearance CL'. In addition, since the volume ratio of the electrode assembly 10 to the volume of the cup part 333 is small, and thus, the unnecessary volume in the secondary battery 3 is also large, the energy density to volume is also reduced. Furthermore, since the outer wall 338 of the cup part 333 is not formed similar to the vertical state, and the curvature radius R2 of the edge 361 of the cup part 333 is also large, there is a limitation in manufacturing a sharp shape as a whole. As a result, there are problems in that the outer appearance of the secondary battery 3 is not elegant, and the marketability is also lowered.

Figure 6:
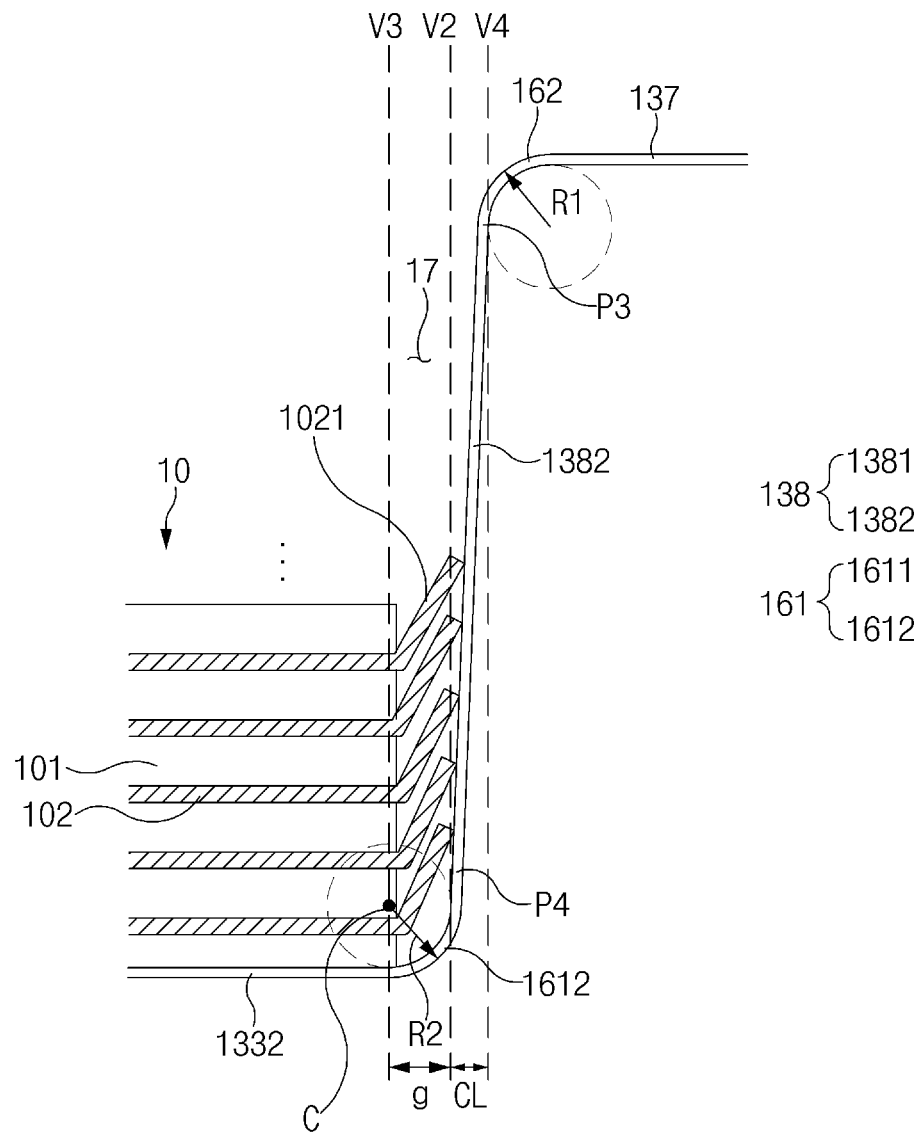
FIG. 6 is an enlarged schematic view of the cup part and a degassing part according to an embodiment of the present invention.

FIG. 5 is an enlarged schematic view of the cup part 133 and the bridge 136 according to an embodiment of the present invention, and FIG. 6 is an enlarged schematic view of the cup part 133 and the degassing part 137 according to an embodiment of the present invention.

As described above, according to an embodiment of the present invention, the depth D of the cup part 133 is molded to be 6.5 mm or less, and at the same time, the thickness t of the bridge 136 is thinner, and the curvature radius R2 of the edge 16 and the clearance CL of the cup part 133 are smaller to increase in volume of the electrode assembly 10. Accordingly, since the unnecessary volume in the secondary battery 1 is also reduced, the energy density relative to the volume may increase. In addition, since each of the pouch type battery case 13 and the pouch type secondary battery 1 is manufactured in a sharp shape on the whole, the outer appearance of the secondary battery 1 may be excellent, and the marketability may be improved.

For this, in the pouch-type battery case 13 according to an embodiment of the present invention, the cup part 133 accommodating the electrode assembly 10 formed by stacking the electrodes 101 and the separators 102 therein is formed, wherein the cup part 133 includes: a plurality of punch edges 161 connecting each of a plurality of outer walls 138 surrounding the periphery to a bottom part 1332; a plurality of die edges 162 connecting the outer wall 138 and the side 134 or the degassing part 137; and a thickness edge 163 connecting two adjacent outer walls 138 to each other.

At least one of the punch edges 161 and at least one of the die edges 162 may be rounded and formed at a curvature radius that corresponds to ¹⁄₂₀ to ⅙ of the depth D of the cup part 133. If the curvature radius R2 of each of the edges 161 and 162 is less than ¹⁄₂₀ of the depth D of the cup part 133, stress may be excessively concentrated at each of the edges 161 and 162 to cause cracks. On the other hand, if the curvature radius R2 of each of the edges 161 and 162 is greater than ⅙ of the depth D of the cup part 133, the cup part 133 may not be sharply formed, and thus, the energy density may be reduced.

Specifically, at least one of the punch edges 161 may be formed to be rounded at a curvature radius R2 of 1 mm or less, and at least one of the die edges 162 may be formed to be rounded at a curvature radius R2 of 1 mm or less.

A vertical distance between a die edge vertical line V4 passing through boundary points P1 and P3 of the die edge 162 and the die edge 162-side outer wall 138 and perpendicular to the bottom part 1332 and an edge vertical line V2 passing through boundary points P2 and P4 of the die edge 162-side punch edge 161 and die edge 162-side outer wall 138 and perpendicular to the bottom part 1332 is 0.5 mm or less, and the thickness edge is connected to the two punch edges 161 adjacent to each other to form a corner 164, wherein at least one of the corner 164 is rounded at a curvature radius R3 of 2 mm to 5 mm, wherein the curvature radius is greater than that of the thickness edge. In addition, the depth D of the cup part 133 may be 6.5 mm or less.

The cup part 133 is formed by molding the pouch film 135 having flexibility using a punch 22 or the like. The cup part 133 is surrounded by the plurality of outer walls 138 and a bottom part 1332, and a space formed by the outer wall 138 and the bottom part 1332 serves as an accommodation space 1331 to accommodate the electrode assembly 10.

The outer wall 138 of the cup part 133 surrounds the periphery of the cup part 133 to embody a shape the cup part 133. The outer wall 138 is formed in plurality around the cup part 133, is also formed at a side of the bridge 136, is also formed at a side of the degassing part 137 to be described below, and is also formed at a side of an electrode lead 12. The outer wall 138 has an upper end facing an opening of the cup part 133 and a lower end facing the bottom part 1332.

As described above, the edge 16 of the cup part 133 includes the punch edge 161 formed to correspond to the edge 221 of the punch 22 and a die edge 362 formed to correspond to the edge 213 (see FIG. 3) of the die 21. The side 134 and the degassing part 137 are formed outward from the upper end of the outer wall 138, and the die edge 162 connects the upper end of the outer wall 138 to the side 134 or degassing part 137. Also, the punch edge 161 connects the lower end of the outer wall 138 to the bottom part 1332.

Since the outer wall 138 of the cup part 133 is formed in plurality, the edges 16 of the cup part 133 are also formed in plurality as much as the number of outer walls 138. That is, if the cup part 133 is formed in a quadrangular shape, since four outer walls 138 of the cup part 133 are also formed, four punch edges 161 and four die edges 162 are also formed. Also, according to an embodiment of the present invention, the depth D of the cup part 133 is molded to be 6.5 mm or less, and at least one punch edge 161 of the cup part 133 is rounded at a curvature radius of 1 mm or less, particularly 0.7 mm or less.

Particularly, according to an embodiment of the present invention, two cup parts 133 are formed on one pouch film 135, and the bridge 136 is also formed together between the two cup parts 133. In addition, as illustrated in FIG. 5, among the plurality of punch edges 161, the bridge 136-side punch edge 1611 connecting the bridge 136-side outer wall 1381 facing the bridge 136 to the bottom part 1332 may be formed to be rounded at a curvature radius that corresponds to ¹⁄₂₀ to ⅙ of the depth D of the cup part 133. Specifically, the bridge 136-side punch edge 1611 may be formed to be rounded at a curvature radius of 1 mm or less, particularly 0.7 mm or less. In addition, as illustrated in FIG. 6, among the plurality of punch edges 161, the die edge 162-side punch edge 1612 connecting the die edge 162-side outer wall 1382 facing the die edge 162 formed on the degassing part 137 or the electrode lead 12 to the bottom part 1332 may also be rounded at a curvature radius corresponding to ¹⁄₂₀ to ⅙ of the depth D of the cup part 133. Specifically, the die edge 162-side punch edge 1612 may be formed to be rounded at a curvature radius of 1 mm or less, particularly 0.7 mm or less. Here, at the boundary points P2 and P4 of the punch edge 161 and the outer wall 138, it is preferable that a slope is continuous.

For this, the edge 221 of the punch 22 may also be rounded at a predetermined curvature radius. Here, the curvature radius of the edge 221 of the punch 22 may be a value obtained by subtracting the thickness of the pouch film 135 itself from the curvature radius R2 of the punch edge 161. For example, if the thickness of the pouch film 135 is 0.2 mm, when the curvature radius of the edge 221 of the punch 22 is 0.5 mm or less, the curvature radius R2 of the punch edge 161 is 0.7 mm or less.

According to an embodiment of the present invention, when the pouch film 135 is drawing-molded so that so that the depth D of the cup part 133 is 6.5 mm or less, cracks occurs in the punch edge 161 of the cup part 133.

The outer wall 138 has an upper end facing an opening of the cup part 133, and the side 134 and the degassing part 137 extend to the outside of the cup part 133. Here, as illustrated in FIG. 6, the cup part 133 may further include a plurality of die edges 162 connecting an upper end of the outer wall 138 to the side 134 or the degassing part 137. Also, at least one die edge 162 may also be formed to be rounded at a curvature radius that corresponds to ¹⁄₂₀ to ⅙ of the depth D of the cup part 133. Specifically, at least one die edge 162 may be formed to be rounded at a curvature radius of 1 mm or less, particularly 0.7 mm or less.

For this, the edge 213 of the die 21 may also be rounded at a predetermined curvature radius. Here, the curvature radius of the edge 213 of the die 21 may be a value obtained by subtracting the thickness of the pouch film 135 itself from the curvature radius R2 of the punch edge 161. For example, if the thickness of the pouch film 135 is 0.2 mm, when the curvature radius of the edge 213 of the die 21 is 0.5 mm or less, the curvature radius of the die edge 162 is 0.7 mm or less.

In particular, as described above, two cup parts 133 are formed on one pouch film 135, and the bridge 136 is also formed together between the two cup parts 133. That is, the pouch-type battery case 13 according to an embodiment of the present invention includes a first case 131 and a second case 132 in which the cup parts 133 accommodating the electrode assembly 10 formed by stacking the electrodes 101 and the separators 102 therein are formed, respectively; and a bridge 136 formed between the two cup parts 133.

Since the bridge 136 is also formed to correspond to the partition wall 212 of the die 21, the bridge 136 may be one of the plurality of die edges 162.

According to an embodiment of the present invention, as the moldability of the pouch film 135 is improved, the bridge 136 may have a thickness of 1/200 to 1/30 of the width of the electrode assembly 10. If the thickness t of the bridge 136 is less than 1/200 of the width of the electrode assembly 10, stress may be excessively concentrated at the bridge 136, and thus cracks may occur. If the thickness t of the bridge 136 is greater than 1/30 of the width of the electrode assembly 10, the bridge 136 may not be sharply formed, and thus the energy density may be reduced.

Specifically, the thickness t of the bridge 136 may be formed to be 2 mm or less, particularly 1.4 mm or less.

Here, the thickness t of the bridge 136 is preferably a distance between the two boundary points P1 of the bridge 136 and the bridge 136-side outer wall 1381 as illustrated in FIG. 5. Specifically, the thickness t of the bridge 136 is preferable a distance between the two vertical bridge lines V1 passing through the boundary point P1 of the bridge 136 and the bridge 136-side outer wall 1381, and the vertical bridge lines V1 is perpendicular to the bottom part 1332. Accordingly, when the bridge 136 has a constant curvature radius, the curvature radius of the bridge 136 may correspond to half of the thickness t. The, the bridge 136 may have a curvature radius of 1 mm or less, particularly 0.7 mm or less.

For this, the partition wall 212 of the molding part 211 may also be rounded at a predetermined curvature radius. Here, at the boundary point P1 of the bridge 136 and the bridge 136 side outer wall 1381, it is preferable that the slope is continuous. Here, the curvature radius of the top surface of the partition wall 212 of the molding part 211 may be a value obtained by subtracting the thickness of the pouch film 135 from the curvature radius of the bridge 136. For example, if the thickness of the pouch film 135 is 0.2 mm, when the curvature radius of the top surface of the partition all 212 is 0.5 mm or less, the curvature radius of the bridge 136 is 0.7 mm or less.

According to an embodiment of the present invention, even if the curvature radius of the edge 213 of the die 21 is reduced, and the thickness of the partition wall 212 is formed thin, the depth D of the cup part 133 is formed to be 6.5 mm or less to prevent cracks from easily occurring in the die edge 162 and the bridge 136. The bridge 136 may have a fan-shaped cross-section, and as the outer wall 138 of the cup part 133 is formed to be similar to the vertical state, the cross-section may have a shape closer to a semicircle.

Furthermore, as the moldability of the pouch film 135 is improved, the clearance CL may be reduced to 0.5 mm or less so that all the plurality of outer walls 138 are formed to be similar to the vertical state. For example, as illustrated in FIG. 5, the bridge 136-side outer wall 1381 among the plurality of outer walls 138 may be formed to be similar to the vertical state. That is, the clearance CL that is a vertical distance between the bridge vertical line V1 passing through a boundary point P1 of the bridge 136 and the bridge 136-side outer wall 1381 and perpendicular to the bottom part 1332, and the edge vertical line V2 passing through a boundary point P2 of the bridge 136-side punch edge 1611 and the bridge 136-side outer wall 1381 and perpendicular to the bottom part 1332 may be 0.5 mm or less, particularly 0.35 mm or less.

Also, as illustrated in FIG. 6, the die edge 162-side outer wall 1382 among the plurality of outer walls 138 may also be formed to be similar to the vertical state. That is, a clearance CL that is a vertical distance between the die edge vertical line V4 passing through a boundary point P3 of the die edge 162 and the die edge 162-side outer wall 1382 and perpendicular to the bottom part 1332, and the edge vertical line V2 passing through a boundary point P4 of the die-edge 162-side punch edge 1612 and the die edge 162-side outer wall 1382 and perpendicular to the bottom part 1332 may be 0.5 mm or less, particularly 0.35 mm or less.

Thus, even if the depth D of the cup part 133 is 6.5 mm or less, an inclination angle between the outer wall 138 of the cup part 133 and the bottom part 1332 may be 90° to 95°, and furthermore may be formed to be similar to the vertical state so as to have an inclination between 90° to 93°, and thus, the cracks may be prevented from occurring in the battery case 13. In addition, since the space between the outer wall 138 of the cup part 133 and the electrode assembly 10 may also decrease, energy density relative to the volume of the secondary battery 1 may increase.

Since the curvature radius R2 of the punch edge 161 of the cup part 133 is further reduced, even when the electrode assembly 10 is disposed very close to the outer wall 138 of the cup part 133, the electrode 101 of the electrode assembly 10 may be prevented from being damaged.

For this, a method of manufacturing the pouch-type secondary battery 1 according to an embodiment of the present invention includes: a process of forming an electrode assembly 10 by stacking electrodes 101 and separators 102; a process of molding a pouch film 135 to form a cup part 133, thereby manufacturing a pouch-type battery case 13; a process of accommodating the electrode assembly 10 in an accommodation space 1331 of the cup part 133; and a process of sealing a side 134 extending to the outside of the cup part 133 to manufacture the pouch-type secondary battery 1.

Particularly, in the process of accommodating the electrode assembly 10, a difference between a width CW of the cup part 133 and a width EW of the electrode assembly 10 may be 2.5 mm or less, particularly 1.7 mm or less. Here, the width EW of the electrode assembly 10 may mean a width of the electrode 101. That is, a peripheral portion 1021 protruding from the separator 102 rather than the electrode 101 may be excluded from calculation of the width EW.

In addition, the electrode assembly 10 may be accommodated so that at least one end of the electrode 101 is disposed at a vertical distance g of 0.75 mm, particularly 0.5 mm or less from the edge vertical line V2, which passes through the boundary point P2 between the punch edge 161 and the outer wall 138 and is perpendicular to the bottom part 1332.

Specifically, as illustrated in FIGS. 5 and 6, the edge vertical line V2 passing through the boundary point P2 of the punch edge 161 and the outer wall 138 and perpendicular from the bottom part 1332 is illustrated virtually. In addition, the electrode assembly 10 is accommodated so that at least one end of the electrode 101 is from the edge vertical line V2 at the vertical distance g of 0.75 mm or less, particularly 0.5 mm or less. More specifically, the vertical distance g from the edge vertical line V2 is 0.75 mm, in particular 0.5 mm, and a reference vertical line V3 perpendicular to the bottom part 1332 is illustrated virtually. Here, since the curvature radius R2 of the punch edge 161 may be particularly 0.7 mm or less, the reference vertical line V3 may pass through a curvature center C of the punch edge 161. Also, the electrode assembly 10 is accommodated so that one end of the electrode 101 is disposed between the edge vertical line V2 and the reference vertical line V3. This may be confirmed by disassembling the secondary battery 1 itself, but is not limited thereto and may be confirmed in various methods without disassembling the secondary battery 1 such as computerized tomography (CT), magnetic resonance imaging (MRI), X-Ray, etc. As a result, a ratio of the volume of the electrode assembly 10 to the volume of the cup part 133 may further increase while preventing the electrode 101 from being damaged, and thus the energy efficiency relative to the volume may also increase. In addition, since the unnecessary volume inside the cup part 133 is reduced, it is possible to prevent the electrode assembly 10 from moving inside the cup part 133.

Furthermore, since the electrode assembly 10 is accommodated to be disposed very close to the outer wall 138 of the cup part 133, the separator 102 may not be disorderly crumpled or folded. As illustrated in FIG. 5, the peripheral portion 1021 in which the separator 102 protrudes outward from the electrode 101 is folded toward the opposite direction of the bottom part 1332 with respect to one end of the electrode 101. The electrode assembly 10 is formed by stacking the electrodes 101 and the separators 102, and the plurality of electrodes 101 and the plurality of separators 102 may be formed. The battery case 13 includes a first case 131 and a second case 132. If the bridge 136 of the battery case 13 is folded to accommodate an upper portion of the electrode assembly 10 in the cup part 133, the separator 102 accommodated in the cup part 133 of the first case 131 is provided so that the peripheral portion 1021 is folded to face the second case, and the separator 102 accommodated in the cup part 133 of the second case 132 is provided so that the peripheral portion 1021 is folded to face the first case 131. Thus, the peripheral portions 1021 of the separator 102 are aligned and folded to be ordered. In addition, since the separator 102 covers the electrode 101 so as not to be exposed to the outside, it is possible to prevent the short circuit from occurring.

In more detail, in a state before the electrode assembly 10 is accommodated in the cup part 133, the width of the separator 102 may be wider than the width CW of the cup part 133. Accordingly, while the electrode assembly 10 is accommodated in the cup part 133, the peripheral portion 1021 of the separator 102 may be folded in a predetermined direction in contact with an inner circumference of the cup part 133.

A difference between the width CW of the cup part 133 and the width EW of the electrode assembly 10 may be very small, such as 2.5 mm or less, particularly 1.7 mm or less. Accordingly, a process for easily folding the peripheral portion 1021 of the separator 102 while the electrode assembly 10 is accommodated in the cup part 133 may be required.

Accordingly, the process of accommodating the electrode assembly 10 in the accommodation space 1331 of the cup part 133 may include a process of pressing the electrode assembly 10 into the cup part 133. Accordingly, when compared to the conventional method of placing the electrode assembly 10 on the cup part, the separator 102 may be folded in a certain direction while maintaining a small difference between the width CW of the cup part 133 and the width EW of the electrode assembly 10 so that the electrode assembly 10 is easily and reliably accommodated in the accommodation space of the cup part 133.

In addition, the process of accommodating the electrode assembly 10 in the accommodation space 1331 of the cup part 133 may further include a process of folding each corner (vertex) of the plurality of separators 102 in the electrode assembly 10 before the electrode assembly 10 is pressed to the inside of the cup part 133. In the above process, each corner (vertex) of the plurality of separators 102 may be folded to gather at a central portion in the stacking direction of the electrode assembly 10 using a separate sealing tool.

That is, the electrode assembly 10 may be inserted into the cup part 133 in a state in which the four corners of the separator 102 are pre-aligned. Thus, the electrode assembly 10 may be smoothly inserted into the accommodation space 1331 of the cup part 133.

As described above, according to an embodiment of the present invention, as the moldability of the pouch film 135 is improved, the thickness t of the bridge 136 is formed to be thinner, the curvature radius R2 of the edge 16 of the cup part 133 and the clearance CL may be formed to be smaller, and the volume of the electrode assembly 10 may increase. Accordingly, since the unnecessary volume in the secondary battery 1 is also reduced, the energy density relative to the volume may increase. In addition, since each of the pouch type battery case 13 and the pouch type secondary battery 1 is manufactured in a sharp shape on the whole, an outer appearance of the secondary battery 1 may be excellent, and marketability may be improved.

Figure 7:
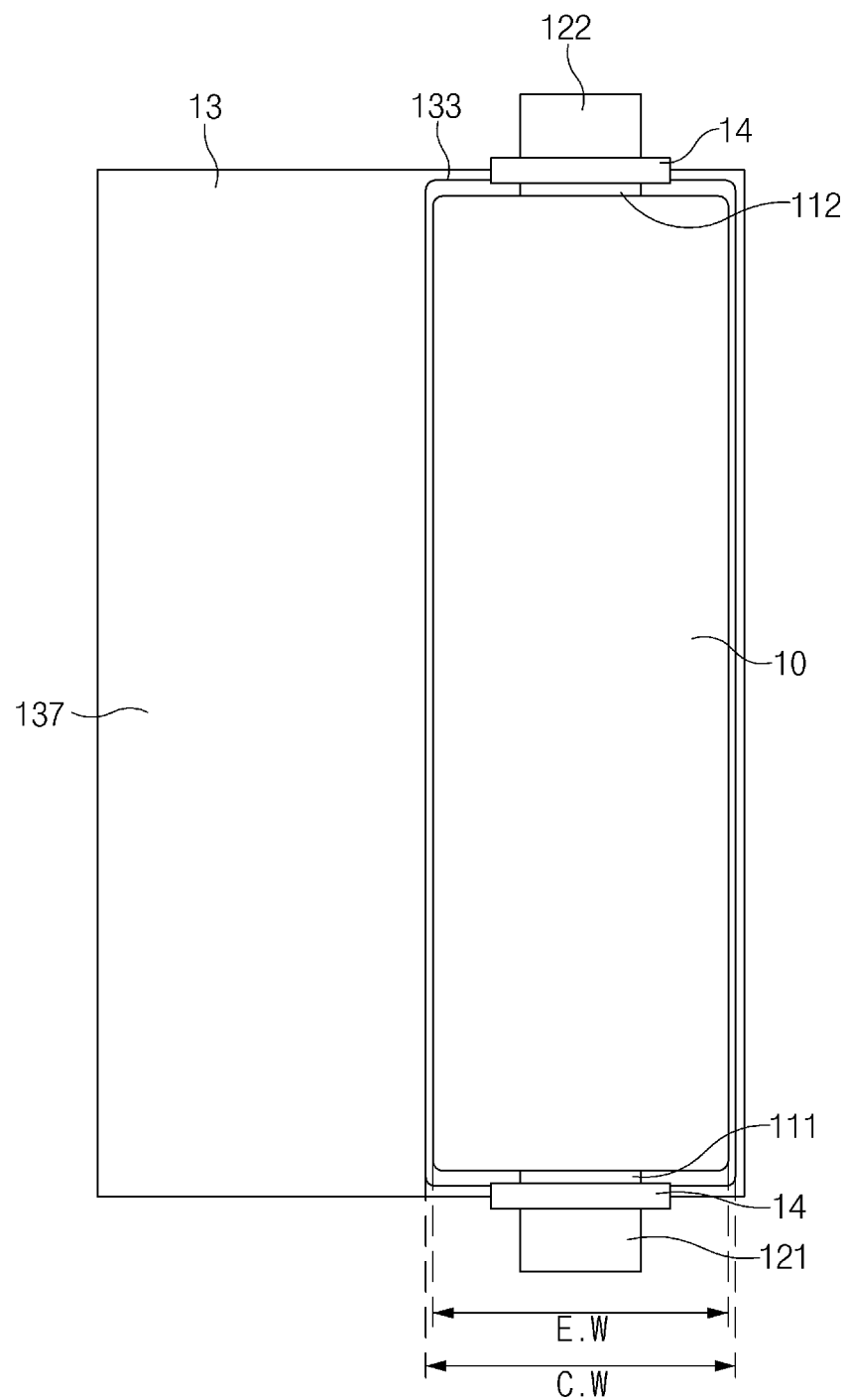
FIG. 7 is a schematic top view illustrating an electrode assembly being accommodated in the cup part according to an embodiment of the present invention.

FIG. 7 is a schematic top view illustrating a state in which the electrode assembly 10 is accommodated in the cup part 133 according to an embodiment of the present invention.

According to an embodiment of the present invention, as described above, since the curvature radius R2 of the punch edge 161 of the cup part 133 is further reduced, the electrode assembly 10 is accommodated so that one end of the electrode 101 is disposed between the edge vertical line V2 and the reference vertical lines V3. Thus, even when the electrode assembly 10 is disposed very close to the outer wall 138 of the cup part 133, it is possible to prevent the electrode 101 of the electrode assembly 10 from being damaged.

The edge vertical line V2 and the reference vertical line V3 may also be illustrated on the bridge 136-side punch edge 1611 and may also be illustrated on the die edge 162-side punch edge 1612. The vertical distance g between the edge vertical line V2 and the reference vertical line V3 may be 0.75 mm, particularly 0.5 mm.

In addition, if two cup parts 133 are formed in the battery case 13, since the bridge 136 is provided, the bridge vertical line V1 may be illustrated at a side of the cup part 133, and the die edge vertical line V4 may be illustrated at the other side of the cup part 133. This vertical distance CL between the bridge vertical line V1 and the edge vertical line V2 may be 0.5 mm or less, in particular 0.35 mm or less, and the vertical distance CL between the die edge vertical line V4 and the edge vertical line V2 may also be 0.5 mm or less, in particular 0.35 mm or less.

However, if only one cup part 133 is formed in the battery case 13, the bridge is not provided. However, since the die edge 162 is formed on each of both sides of the cup part 133, the die edge vertical line V4 may be illustrated at each of both sides of the cup part 133.

If two cup parts 133 are formed in the battery case 13, the width CW of the cup part 133 may indicate a vertical distance from the bridge vertical line V1 to the die edge vertical line V4. However, if only one cup part 133 is formed, the width CW of the cup part 133 may indicate in a vertical distance between the two die edge vertical lines V4.

Both the bridge vertical line V1 and the die edge vertical line V4 pass through a top end of an outer wall 138 of the cup part 133. Therefore, according to an embodiment of the present invention, the width CW of the cup part 133 may be a vertical distance between the upper ends of the outer walls 138 on both sides of the cup part 133. A difference between the width CW of the cup part 133 and the width EW of the electrode assembly 10 may be 2.5 mm or less, particularly 1.7 mm or less. Also, as described above, the width EW of the electrode assembly 10 may be 60 mm or more.

The width CW of the cup part 133 may be derived by measuring a vertical distance between the upper ends of the outer walls 138 on both sides of the cup part 133 in the battery case 13. Also, in the secondary battery 1, a position between the upper ends of the outer walls 138 of both sides may be grasped from the outside of the cup part 133 by using a laser displacement sensor, etc., and then, the distance between the two positions may be calculated. Here, when the laser displacement sensor moves from the side 134 toward the die edge 162 and the outer wall 138 while irradiating laser through the laser displacement sensor from the outside of the cup part 133 to detect a point at which displacement is abruptly changed, the corresponding point may be recognized as the upper end of the outer wall 138. The above describes a method of measuring the width CW of the cup part as an example, and only the case in which the method is limited to the above measurement method is not included in the scope of the present invention. The width CW of the cup part may be the width CW of the cup part in the sense of the present invention as long as it falls within the scope of the claims and the spirit of the present invention.

Figure 8:
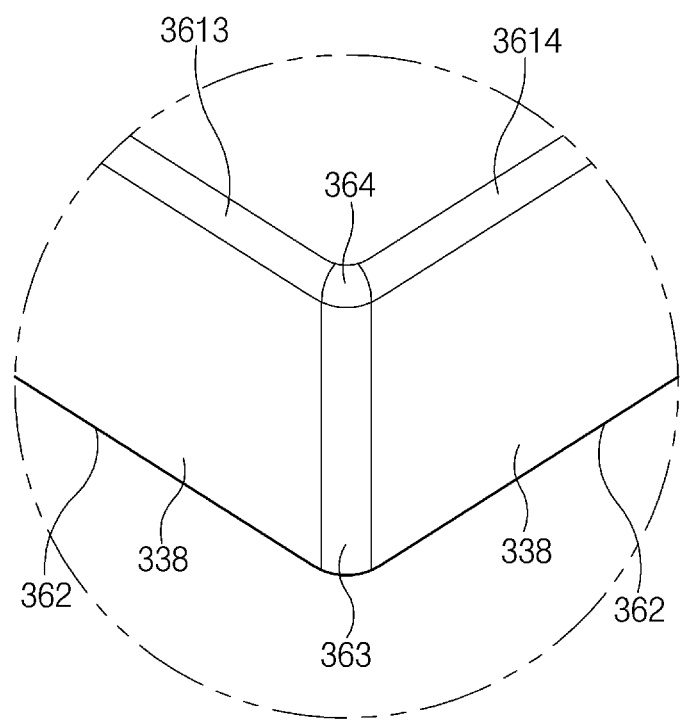
FIG. 8 is a schematic view of a corner according to the related art.
Figure 9:
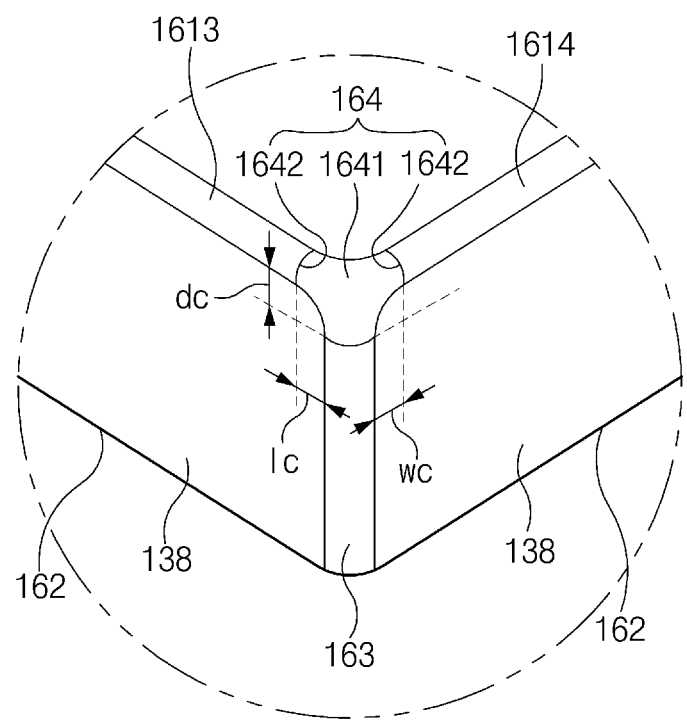
FIG. 9 is a schematic view of a corner according to an embodiment of the present invention.

FIG. 8 is a schematic view of a corner 364 according to the related art, and FIG. 9 is a schematic view of a corner 164 according to an embodiment of the present invention.

The edge 16 of the cup part 133 further includes a thickness edge 163 connecting two adjacent outer walls 138 of the cup part 133 as illustrated in FIG. 9 as well as the punch edge 161 and the die edge 162. This thickness edge 163 is formed in a thickness direction of the cup part 133, and is formed while the pouch film 135 is elongated between a corner of the die 21 and a corner of the punch 22 when the pouch film 135 is elongated. Also, at least one of the thickness edges 163 may be rounded.

The thickness edge 163 has a curvature radius, which may be the same as the curvature radius R2 of the two adjacent punch edges 161, that is, the first punch edge 1613 and the second punch edge 1614, but is not limited thereto. For example, the thickness edge may be differently formed. For example, as described above, while the depth D of the cup part 133 is molded to be 6.5 mm or less, at least one of the punch edged 161 may be rounded at a curvature radius of 1 mm or less, in particular 0.7 mm or less, and at least one of the thickness edges 163 may be rounded at 0.5 mm to 5 mm, in particular 0.5 mm to 2 mm. According to the related art, when the thickness edge 363 is formed to be rounded at a curvature radius of 5 mm or less, particularly 2 mm or less, there is a problem in that stress is also concentrated on the thickness edge 363 of the cup part 333 to cause cracks. However, according to an embodiment of the present invention, it is possible to prevent cracks from occurring in the thickness edge 163 of the cup part 133. Here, one of the first punch edge 1613 and the second punch edge 1614 may be a bridge 136-side punch edge 1611, and the other may be an electrode lead 12-side punch edge (not shown). Alternatively, one of the two punch edges may be a die edge 162-side punch edge 1612, and the other may be an electrode lead 12-side punch edge (not shown).

The thickness edge 163 is connected to two punch edges 161 adjacent to each other, that is, the first punch edge 1613 and the second punch edge 1614 as illustrated in FIG. 9 to form the corner 164. In the related art, as illustrated in FIG. 8, rounding is performed on all the plurality of edges 221 of the punch 22 at the same curvature radius, and accordingly, the corner (not shown) of the punch 22 is naturally rounded at the same curvature radius. Accordingly, when the pouch film 135 is elongated by molding the pouch film 135 with the punch 22, the corner 364 is naturally rounded at the same curvature radius as the punch edge 361.

However, when the pouch film 135 is elongated, there is a problem in that stress is concentrated to the corner 364. In particular, the corner 364 is formed by the meeting of the three edges 361, and thus, the corer 363 may be elongated more than the punch edge 361 or thickness edge 363. Thus, stress may be concentrated more to the corner 364 than the punch edge 361 or thickness edge 363. Accordingly, excessive elongation of the pouch film 135 causes a whitening phenomenon in which a specific portion is changed to white color just before cracks occur, and eventually the cracks easily occur.

Figure 12:
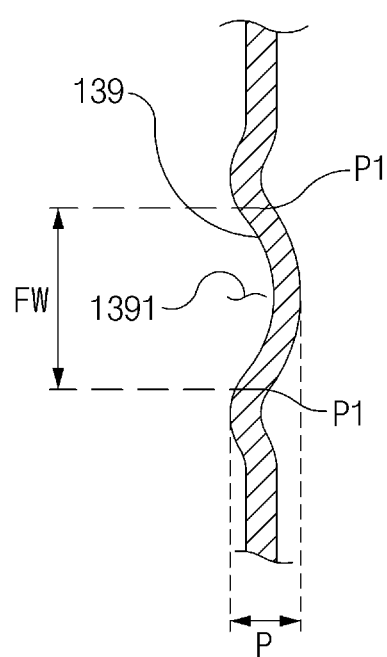
FIG. 12 is an enlarged view of a groove formed in the battery case according to an embodiment of the present invention.

Therefore, according to an embodiment of the present invention, as illustrated in FIG. 12, at least one of the corners 164 is also rounded, and the corner 164 has a curvature radius greater than or equal to the curvature radius of at least one of the punch edge 161 and the thickness edge 163.

Particularly, according to an embodiment of the present invention, the curvature radius may vary inside the corner 164. That is, a curvature radius of a central portion 1641 of the corner 164 and a curvature radius of a peripheral portion 1642 of the corner 164 may be different from each other. In particular, the curvature radius of the central portion 1641 of the corner 164 may be greater than the curvature radius of the peripheral portion 1642 of the corner 164. For example, the curvature radius of the peripheral portion 1642 of the first corner 164 may be the same as the curvature radius of at least one of the punch edge 161 and the thickness edge 163 because of being relatively adjacent to the first punch edge 132, the second punch edge 134, and the thickness edge 163. On the other hand, the curvature radius of the central portion 1641 of the first corner 164 may be greater than that of at least one of the punch edge 161 and the thickness edge 164 because of being relatively spaced apart from the first punch edge 1613, the second punch edge 1614, and the thickness edge 163. That is, a curvature radius of the corner 164 may be different from a curvature radius of at least one of the punch edge 161 and the thickness edge 163.

Thus, the curvature radius of the corner 164 may gradually increase from the peripheral portion 1642 of the corner 164 to the central portion 1641 of the corner 164. Also, since the curvature radius inside the corner 164 is not constant but varies, the central portion 1641 of the corner 164 may have an aspherical shape, but not an accurate spherical surface.

Unlike the punch edge 161, the corner 164 has to be clearly set not only the curvature radius but also a range to be formed in the cup part 133. If the range in which the corner 164 is formed in the cup part 133 is excessively narrow, the pouch film 135 is still excessively elongated to cause the whitening or the cracking. On the other hand, if the range in which the corner 164 is formed in the cup part 133 is excessively wide, a space 17 between the outer wall 138 of the cup part 133 and the electrode assembly 10 decreases, and thus, the secondary battery 1 may increase in energy density relative to a volume thereof. Therefore, according to an embodiment of the present invention, as illustrated in FIG. 12, the corner 164 may be formed within 2 mm to 3.5 mm in the longitudinal direction lc of the cup part 133 from the thickness edge 163, be formed within 2 mm to 3.5 mm in the width direction we of the cup part 133 from the thickness edge 163, and be formed with 2 mm to 3.5 mm in the thickness direction dc of the cup part 133 from the punch edge 161. In addition, the range in which the corner 164 is formed may be gradually wider as the depth of the cup part 133 increases.

Since the corner 164 of the cup part 133 is formed as described above, the stress that is more concentrated to the corner 164 may be dispersed to prevent the whitening and the cracking.

Figure 10:
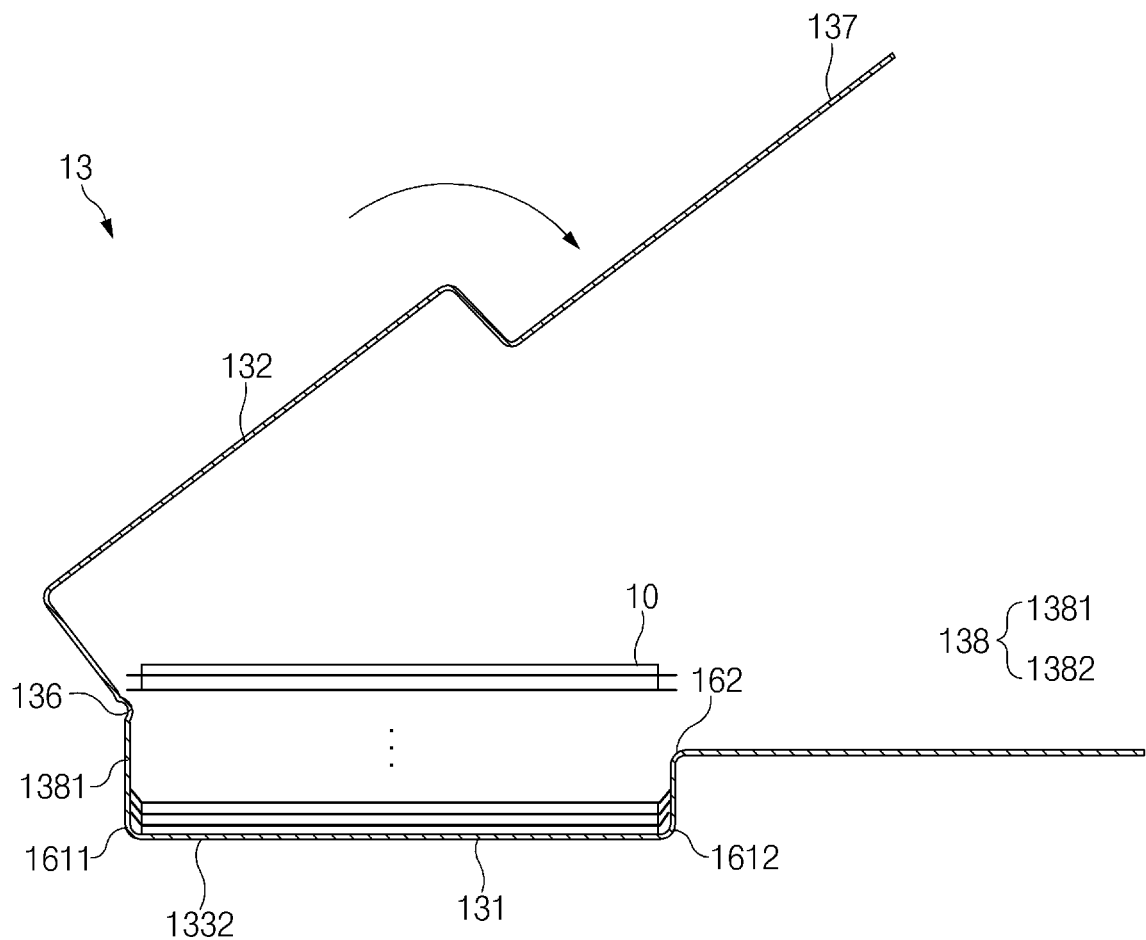
FIG. 10 is a schematic view illustrating a battery case being folded according to an embodiment of the present invention.
Figure 11:
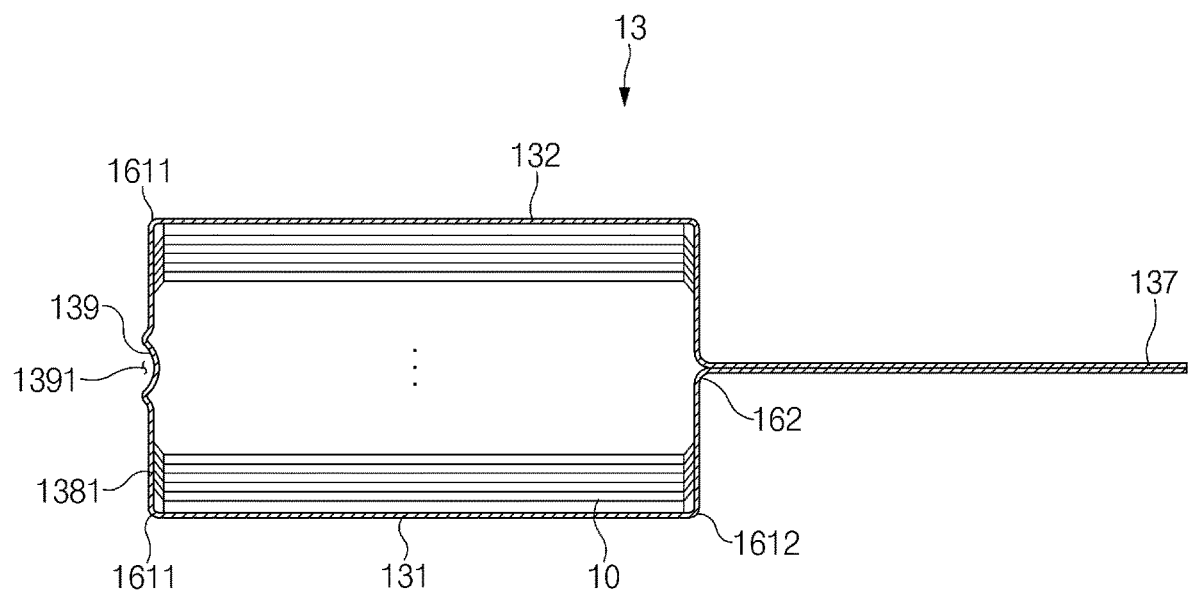
FIG. 11 is a schematic view illustrating the battery case being folded according to an embodiment of the present invention.

FIG. 10 is a schematic view illustrating a state in which the battery case 13 is folded according to an embodiment of the present invention, and FIG. 11 is a schematic view illustrating a state in which the battery case 13 is folded according to an embodiment of the present invention.

When the two cup parts 133 are formed in the pouch film 135, the cup parts 133 are respectively formed in the first case 131 and the second case 132 of the battery case 13. After accommodating the electrode assembly 10 in the accommodation space 1331 provided in the cup part 133 of the first case 131, as illustrated in FIG. 10, a bridge 136 formed between the two cup parts 133 is folded in the battery case 13 so that the two cup parts 133 face each other. As the bridge 136 is folded, a folding part 139 is formed at one side of the secondary battery 1. Then, an electrolyte may be injected, and the, the side 134 extending to the outside of the cup part 133 of the first case 131 and the second case 132 may be sealed to manufacture the pouch-type secondary battery as illustrated in FIG. 11.

The pouch-type secondary battery 1 according to an embodiment of the present invention, which is manufactured as described above, may include an electrode assembly 10 in which electrode 101 and separator 102 are stacked; and a pouch-type battery case 13 having a cup part 133 accommodating the electrode assembly 10 therein, wherein the cup part 133 includes a plurality of punch edges 161 connecting a plurality of outer walls 138 to a bottom part 1332, respectively. At least one of the punch edges 161 may be rounded at a curvature radius that corresponds to ½₀ to ⅙ of a depth D of the cup part 133. Specifically, at least one of the punch edges 161 may be formed to be rounded at a curvature radius of 1 mm or less, particularly 0.7 mm or less. A difference between a width CW of the cup part 133 and a width EW of the electrode assembly 10 may be 2.5 mm or less, particularly 1.7 mm or less. In addition, the electrode assembly 10 may be accommodated so that at least one end of the electrode 101 is disposed at a vertical distance g of 0.75 mm, particularly 0.5 mm or less from the edge vertical line V2, which passes through the boundary point P2 between the punch edge 161 and the outer wall 138 and is perpendicular to the bottom part 1332. In addition, the battery case 13 may include a first case 131 and a second case 132 in which a cup part 133 is formed on at least one thereof; and a folding part 139 integrally connecting the first case 131 to the second case 132.

When the battery case 13 is folded to manufacture the secondary battery 1, since the bridge 136 becomes the folding part 139, in the secondary battery 1, the folding part 139 integrally connects the first case 131 to the second case 132. And the bridge 136-side punch edge 1611 becomes the folding part 139-side punch edge 1611, the bridge 136-side outer wall 1381 becomes the folding part 139-side outer wall 1381.

In addition, among the plurality of punch edges 161, the folding part 139-side punch edge 1611 connecting the folding part 139-side outer wall 1381 facing the folding part 139 to the bottom part 1332 may be formed to be rounded at a curvature radius that corresponds to ½₀ to ⅙ of the depth D of the cup part 133. Specifically, the folding part 139-side punch edge 1611 may be formed to be rounded at a curvature radius of 1 mm or less, particularly 0.7 mm or less. In addition, the electrode assembly 10 may be accommodated so that at least one end of the electrode 101 is disposed between the edge vertical line V2, which passes through the boundary point P2 between the punch edge 161 and the outer wall 138 and is perpendicular to the bottom part 1332, and the reference vertical line V3, which has a vertical distance g of 0.75 mm, particularly 0.5 mm or less from the edge vertical line V2 and is perpendicular to the bottom part 1332. As described above, the reference vertical line V3 may pass through a curvature center C of the punch edge 161.

FIG. 12 is an enlarged view of a groove 1391 formed in the battery case 13 according to an embodiment of the present invention.

According to an embodiment of the present invention, when the battery case 13 is folded to manufacture the secondary battery 1 as described above, the bridge 136 may be in the form of the folding part 139. Specifically, when the battery case 13 is folded, the rounded shape of the bridge 136 may also be unfolded to some extent, but traces of the bridge 136 are left on the secondary battery 1, and the traces may become the folding part 139. Accordingly, the bridge 136 and the folding part 139 of the battery case 13 may correspond to each other.

For example, when the rounded shape of the bridge 136 is not completely unfolded, like a plane, the folding part 139 includes a groove 1391 recessed inward of the secondary battery 1 as illustrated in FIG. 12. In this case, since the folding part 139 has a curvature less than that of the bridge 136, the folding part 139 may have a larger curvature radius.

Since the bridge 136 has a curved surface, and the bridge 136-side outer wall 1381 has a planar shape, an amount of deformation is different from each other. Therefore, when the battery case 13 is folded, the bridge 136-side outer wall 1381 is deformed relatively much, but the bridge 136 is deformed relatively little only to be enough so that the rounded shape is unfolded to some extent. Then, when the battery case 13 is folded, as illustrated in FIG. 12, the increase or decrease in amount of change of the slope is switched around the boundary point P1. That is, each of the boundary points P1 becomes an inflection point. Accordingly, the folding part 139 may be formed as a curved surface between the two boundary points P1, that is, the two inflection points.

In addition, when the rounded shape of the bridge 136 is not completely unfolded, the two boundary points P1, that is, portions corresponding to the two inflection points may protrude outward to form a protrusion. That is, the protrusion may be formed as a pair of protruding portions protruding outward with the folding part 139, more specifically, the groove 1391 interposed therebetween.

Alternatively, even if the rounded shape of the bridge 136 is completely unfolded, like the plane, the boundary point P1 of the bridge 136 and the bridge 136-side outer wall 1381 is connected to the secondary battery 1 by each of two lines (not shown), and the folding part 139 is formed as the plane between the two lines.

The folding part 139 may be visually confirmed from an outer appearance of the secondary battery 1. And as described above, since a thickness t of the bridge 136 is preferably a distance between the two boundary points P1 of the bridge 136 and the bridge 136-side outer wall 1381, a width FW of the folding part 139 is a distance between the two boundary points P1. That is, if the rounded shape of the bridge 136 is not completely unfolded, the width FW of the folding part 139 is a distance between the two boundary points P1, that is, the two inflection points. Alternatively, if the rounded shape of the bridge 136 is completely unfolded, the folding part 139 is a distance between the two boundary points P1, that is, the two lines.

The width FW of the folding part 139 does not exceed a length of the bridge 136 and may be 1 mm to 3.2 mm, in particular 1 mm to 1.6 mm. As described above, the width FW of the folding part 139 may be measured directly using a ruler, but may be measured using a Lupe, or measured using a 3D camera or a laser 2D line sensor. That is, the width FW may be measured in various methods without being limited.

According to the related art, a thickness t' of the bridge 336 is formed to be thick, and a width of the folding part 339 is also formed to be large, and thus, a space 37 between the outer wall 338 of the cup part 333 and the electrode assembly 10 is also formed large. However, according to an embodiment of the present invention, since the width FW of the folding part 139 may be reduced, the space 17 between the outer wall 138 of the cup part 133 and the electrode assembly 10 may also be reduced. Accordingly, the energy density relative to the volume of the secondary battery 1 may increase.

In addition, since the moldability of the pouch film is low in the related art, the protrusion largely protrudes outward. However, according to an embodiment of the present invention, the protrusion may protrude relatively small, and flatness of the folding part 139 or the folding part 139-side outer wall 1381 may be improved.

Specifically, a distance p between the innermost portion of the groove 1391 and the outermost portion of the protrusion may be defined as flatness. In the case of the battery case according to the related art, the flatness is formed to 1 mm or more and even 1.5 mm. On the other hand, according to an embodiment of the present invention, the flatness p may be formed to be 0.8 mm or less, preferably 0.3 mm or less. Accordingly, the energy density relative to the volume of the secondary battery 1 may further increase.

Figure 13:
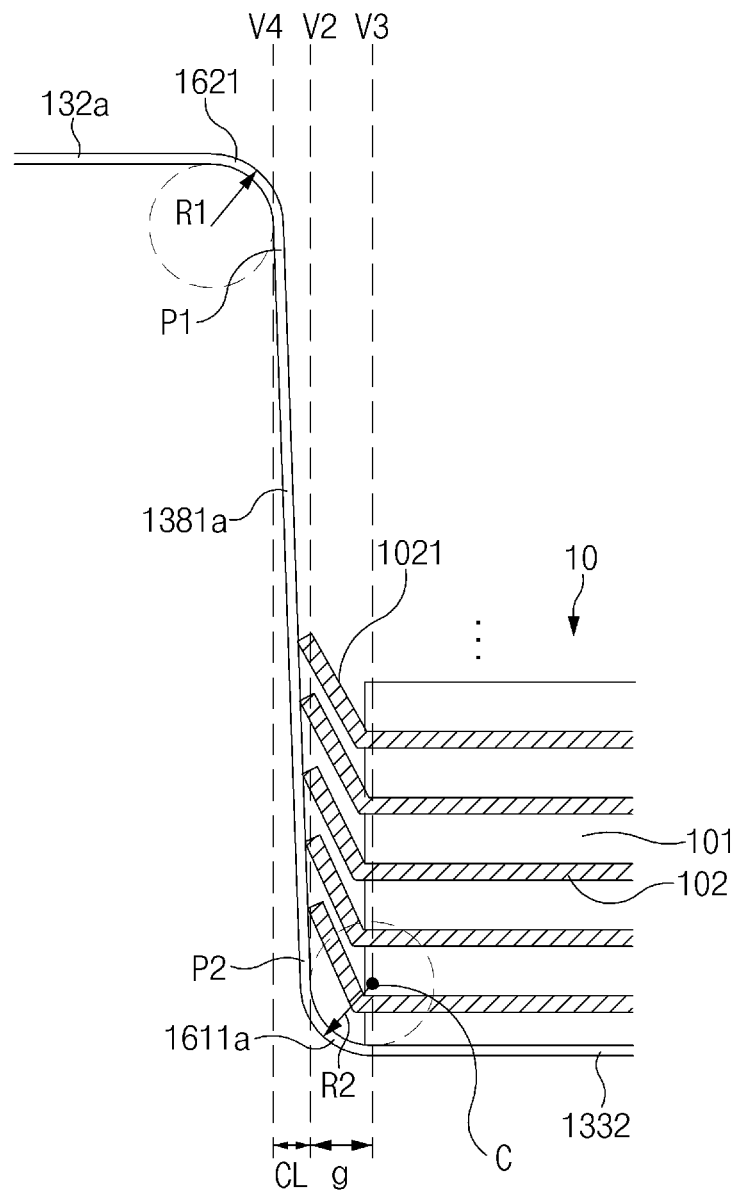
FIG. 13 is an enlarged schematic view of the cup part and a die edge according to another embodiment of the present invention.

FIG. 13 is an enlarged schematic view of the cup part 133 and the die edge 1621 according to another embodiment of the present invention.

According to an embodiment of the present invention, two molding parts 211 are formed on the die 21 so as to be adjacent to each other, and a partition wall 212 may be formed between the two molding parts 211. Accordingly, when the pouch film 135 is formed, two cup parts 133 are formed in one pouch film 135, and a bridge 136 is also formed together between the two cup parts 133. That is, one cup part 133 is formed in each of the first case 131 and the second case 132.

However, according to another embodiment of the present invention, only one molding part 211 is formed on the die 21, and there is no partition wall. Accordingly, when the pouch film 135 is formed, one cup part 133 is formed in one pouch film 135, and there is no bridge. That is, the cup part 133 is formed only in the first case 131.

According to another embodiment of the present invention, the depth D of the cup part 133 is molded to 6.5 mm or less, and at least one punch edge 161a of the cup part 133 is rounded at a curvature radius corresponding to $\frac{1}{20}$ to $\frac{1}{6}$ of the depth D of the cup part 133. Specifically, at least one of the punch edges 161a of the cup part 133 may be formed to be rounded at a curvature radius of 1 mm or less, particularly 0.7 mm or less. As a result, it is possible to prevent cracks from easily occurring in the punch edge 161a of the cup part 133.

In particular, according to another embodiment of the present invention, as illustrated in FIG. 13, among the plurality of punch edges 161a, a second case 132a-side punch edge 1611 connecting a second case 132a-side outer wall 1381a facing a second case 132a to the bottom part 1332 may be formed to be rounded at a curvature radius that corresponds to $\frac{1}{20}$ to $\frac{1}{6}$ of the depth D of the cup part 133. Specifically, the second case 132a-side punch edge 1611a may be rounded and formed with a curvature radius of 1 mm or less, particularly 0.7 mm or less.

In addition, the die edge 162-side punch edge 1612 may also be formed while being rounded with a curvature radius that is $\frac{1}{20}$ to $\frac{1}{6}$ of the depth D of the cup part 133. Specifically, die edge 162-side punch edge 1612 may be formed to be rounded at a curvature radius of 1 mm or less, particularly 0.7 mm or less. Here, at the boundary points P2 and P4 of the punch edge 161a and the outer wall 138, it is preferable that a slope is continuous.

Hereinafter, in another embodiment of the present invention, descriptions of content overlapping with one embodiment of the present invention will be omitted. However, this is for convenience of description and is not intended to limit the scope of rights.

Figure 14:
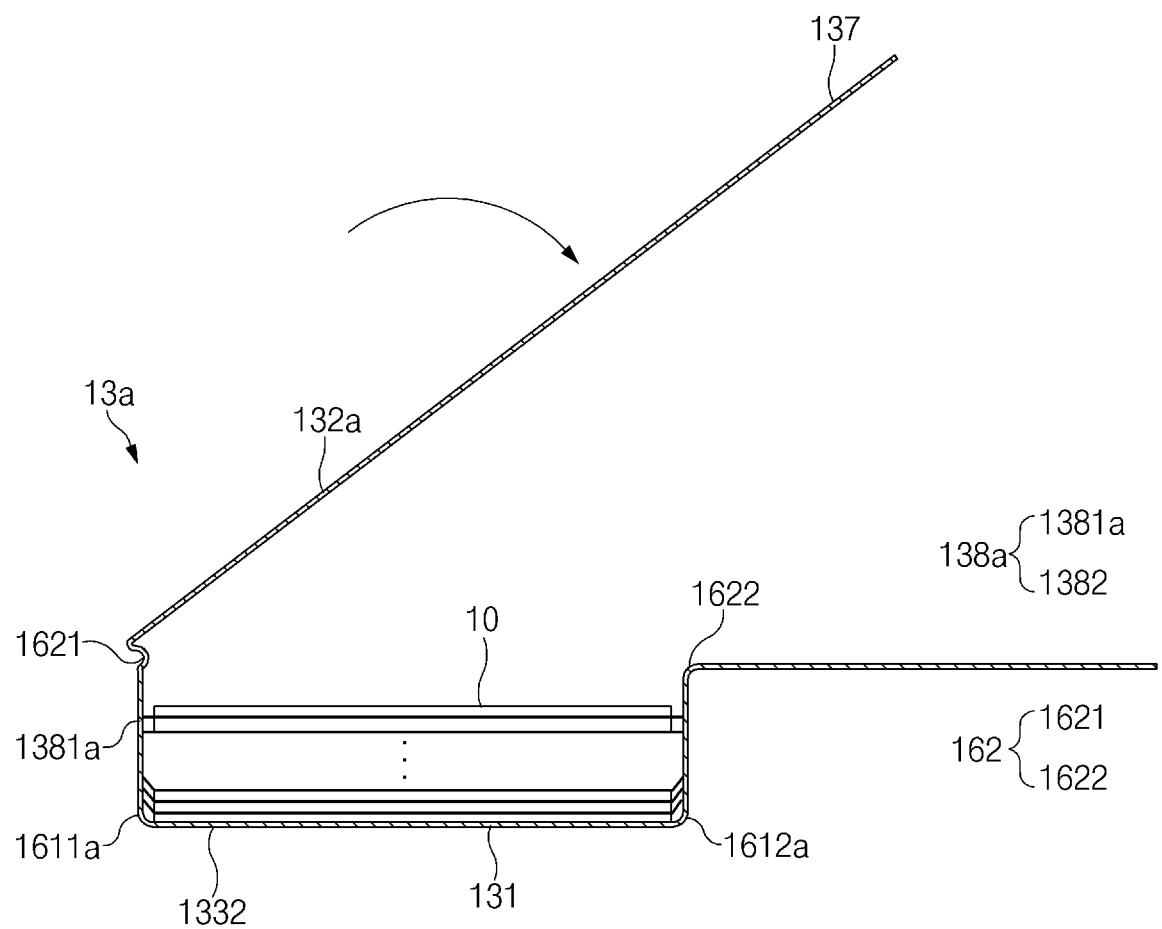
FIG. 14 is a schematic view illustrating a battery case being folded according to another embodiment of the present invention.
Figure 15:
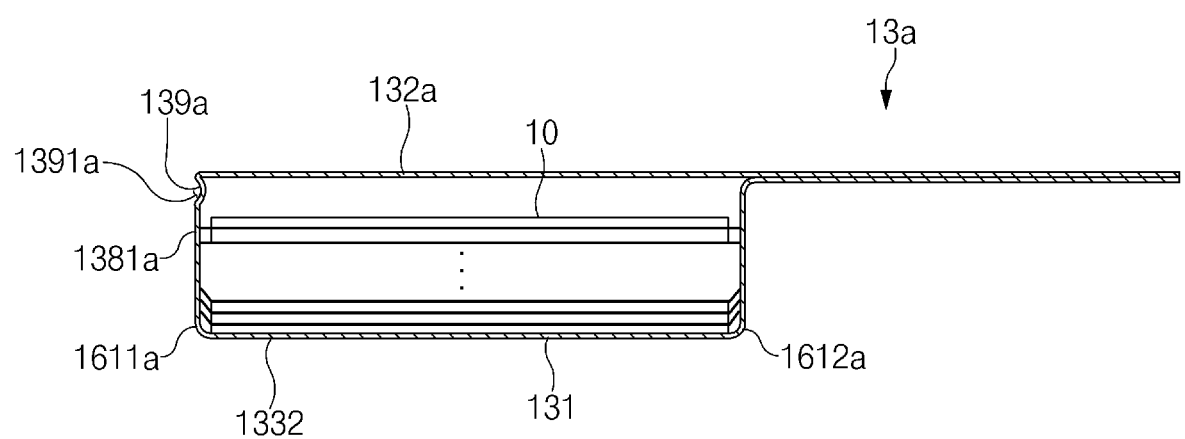
FIG. 15 is a schematic view illustrating a battery case being folded according to another embodiment of the present invention.

FIG. 14 is a schematic view illustrating a state in which a battery case 13a is folded according to another embodiment of the present invention, and FIG. 15 is a schematic view illustrating a state in which a battery case 13a is folded according to another embodiment of the present invention.

The outer wall 138 has an upper end facing an opening of the cup part 133, and a second case 132a, a side 134, and a degassing part 137 extend to the outside of the cup part 133. Here, a die edge 162 connecting an upper end of an outer wall 138 and the second case 132a, the side 134, or the degassing part 137 may be rounded at a curvature radius that corresponds to $\frac{1}{20}$ to $\frac{1}{6}$ of a depth D of a cup part 133. Specifically, the die edge 162 may be formed to be rounded at a curvature radius of 1 mm or less, particularly 0.7 mm or less.

That is, according to another embodiment of the present invention, as illustrated in FIG. 14, there is no bridge in the battery case 13a, and the die edge 1621 connects the cup part 133 of the first case 131 to the second cases 132a. For this, the edge 213 of the die 21 may be rounded at a curvature radius obtained by subtracting a thickness of the pouch film 135 from the die edge 162. For example, if the thickness of the pouch film 135 is 0.2 mm, the edge 213 of the die 21 may be rounded at a curvature radius of 0.8 mm or less, particularly 0.5 mm or less.

Furthermore, a clearance CL is reduced to 0.5 mm or less, the outer wall 138 of the cup part 133 may be formed to be similar to a vertical state. For example, as illustrated in FIG. 13, a clearance CL that is a vertical distance between a die edge vertical line V4 passing through a boundary point P1 of the die edge 1621 and the second case 132a-side outer wall 1381a and perpendicular to the bottom part 1332, and an edge vertical line V2 passing through a boundary point P2 of the second case 132a-side punch edge 1611a and the second case 132a-side outer wall 1381a and perpendicular to the bottom part 1332 may be 0.5 mm or less, particularly 0.35 mm or less.

In addition, the electrode assembly 10 is accommodated so that one end of the electrode 101 is disposed between the edge vertical line V2 and a reference vertical line V3. The reference vertical line V3 has a vertical distance of 0.75 mm, particularly 0.5 mm from the edge vertical line V2 and is perpendicular to the bottom part 1332.

Thus, according to another embodiment of the present invention, the depth D of the cup part 133 is molded to 6.5 mm or less, the outer wall 138 of the cup part 133 may be formed similar to the vertical state so that the inclination angle from the bottom part 1332 is 90° to 95°, in particular, 90° to 93°, and while the electrode 101 is prevented from being damaged, a volume ratio of the electrode assembly 10 to a volume of the cup part 133 may further increase, and thus energy efficiency relative the volume may also increase.

Figure 16:
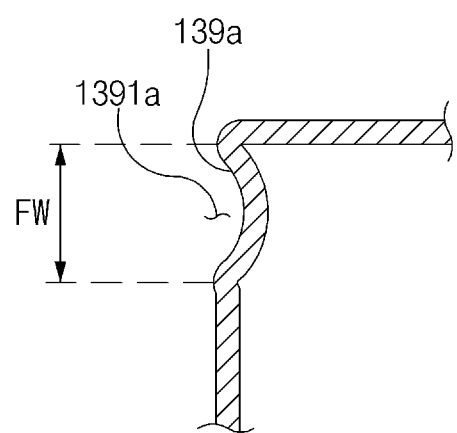
FIG. 16 is an enlarged view of a groove formed in the battery case according to another embodiment of the present invention.

FIG. 16 is an enlarged view of a groove 1391a formed in the battery case 13a according to another embodiment of the present invention.

According to another embodiment of the present invention, when a battery case 13a is folded to manufacture a secondary battery 1a, a second case 132a-side die edge 1621 becomes a folding part 139a. Specifically, when the battery case 13 is folded, the rounded shape of the die edge 1621 may also be unfolded, but traces of the die edge 1621 are left on the secondary battery 1, and the traces may become a folding part 139a. Accordingly, the second case 132a-side die edge 1621 of the battery case 13a and the folding part 139a correspond to each other.

Figure 19:
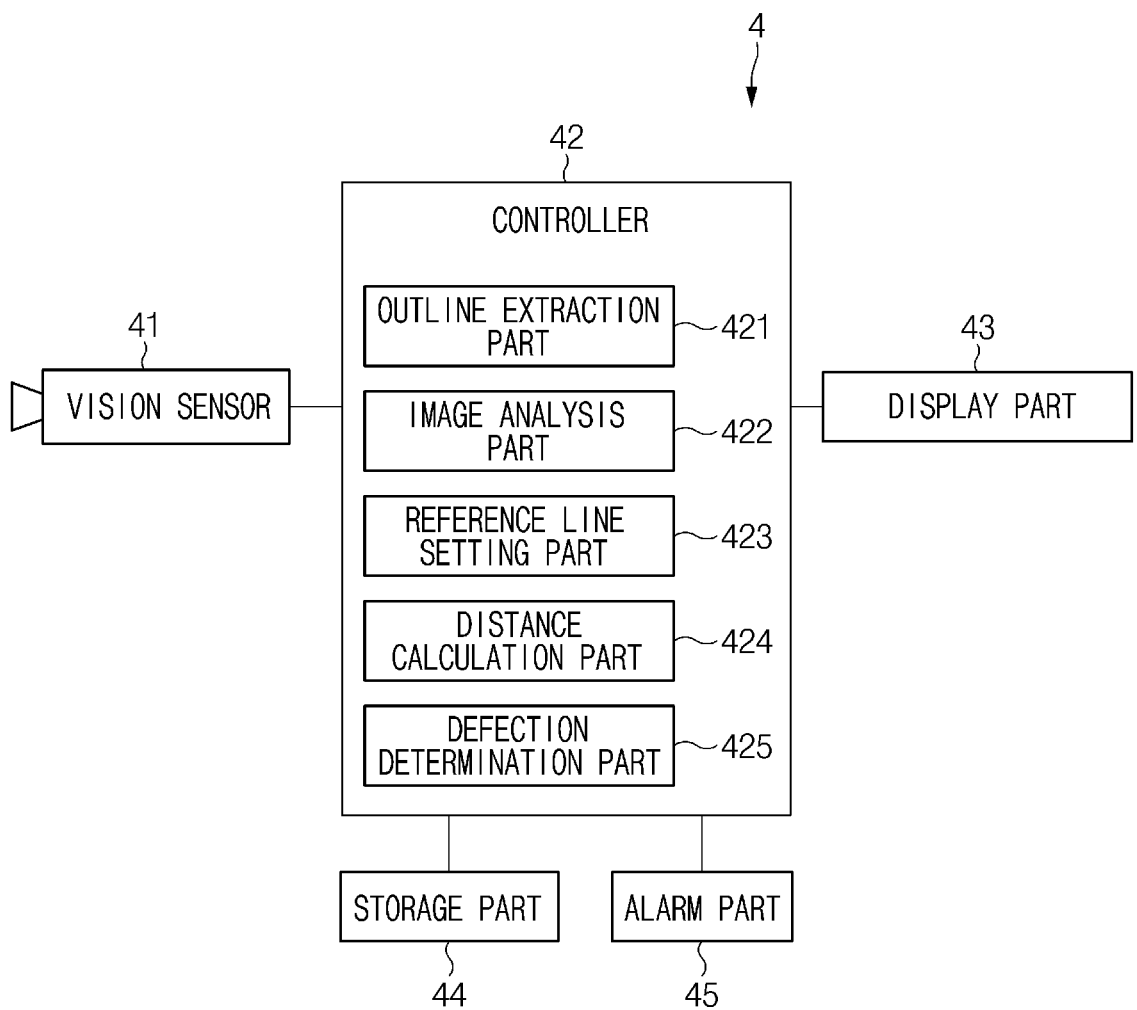
FIG. 19 is a block diagram of an inspection device according to an embodiment of the present invention.

For example, when the rounded shape of the die edge 1621 is not completely unfolded, like a plane, the folding part 139a includes a groove 1391a recessed inward of the secondary battery 1a as illustrated in FIG. 19. In this case, since the folding part 139a has a curvature less than that of the die edge 1621, the folding part 139a may have a larger curvature radius.

Since the die edge 1621 has a curved surface, and the die edge 1621-side outer wall 1381a has a planar shape, an amount of deformation is different from each other. Therefore, when the battery case 13 is folded, the die edge 1621-side outer wall 1381a is deformed relatively much, but the die edge 1621 is deformed relatively little only to be enough so that the rounded shape is unfolded to some extent. Then, when the battery case 13 is folded, as illustrated in FIG. 19, the increase or decrease in amount of change of the slope is switched around the boundary point P1. That is, each of the boundary points P1 becomes an inflection point. Accordingly, the folding part 139a may be formed as a curved surface between the two boundary points P1, that is, the two inflection points.

Alternatively, even if the rounded shape of the die edge 1621 is completely unfolded, a boundary point P1 of the die edge 1621 and the second case 132a-side outer wall 1381 and a boundary point of the die edge 1621 and the second case 132a form two lines (not shown) in the secondary battery 1a, respectively, and the folding part 139a is formed as a plane between the two lines.

The width FW of the folding part 139 does not exceed a length of the die edge 1621 and may be 1 mm to 3.2 mm, in particular 1 mm to 1.6 mm.

Figure 17:
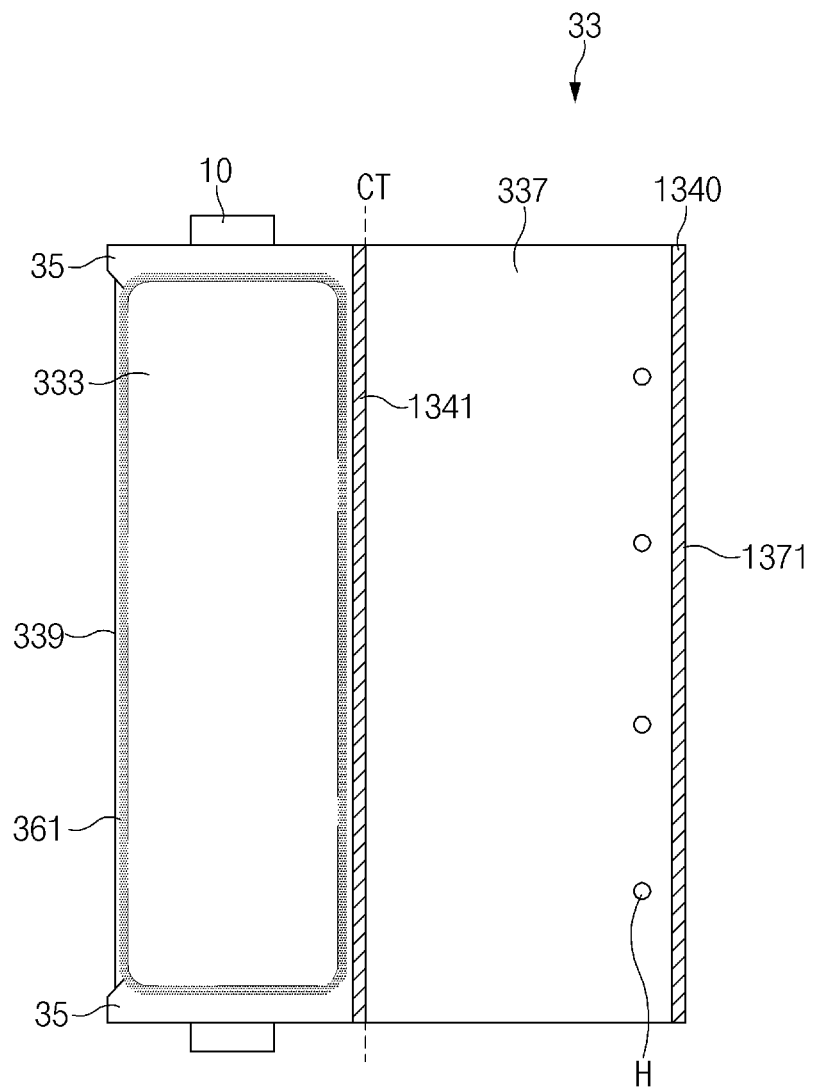
FIG. 17 is a schematic top view illustrating a battery case prior to cutting a degassing part according to the related art.

FIG. 17 is a schematic top view illustrating a state before a degassing part 337 of a battery case 33 is cut according to the related art.

The bridge 136 of the battery case 13 is folded to form a folding part 139 at one side of the secondary battery 1, and the folding part 139 integrally connects the first case 131 to the second case 132. However, the battery case 13 is formed by drawing the pouch film 135 and, in this case, not only the cup part 133 is limitedly elongated, but also peripheral sides 134 of the cup part 133 are also finely elongated as a whole. Accordingly, when the bridge 136 is folded, the finely elongated portions of the sides 134 are accumulated and thus appear visually while protruding outward from both ends of the folding part 139. This is called a bat ear 35 or 15.

A size of the bat ear 35 varies according to a thickness t' of the bridge 336, a clearance CL', a curvature radius R2' of the punch edge 361 of the cup part 333, a depth D' of the cup part 333. That is, the thicker the thickness t' of the bridge 336, the greater the clearance CL', the greater the curvature radius R2' of the punch edge 361 of the cup part 333, the larger the size of the bat ear 35 increases. However, in the related art, there is a limitation in improving the thickness t' of the bridge 336, the curvature radius R2' of the edge 361 of the cup part 333, and the clearance CL'. Therefore, as illustrated in FIG. 17, the size of the bat ear 35 is formed to be quite large, and there was also a limit to reducing the size of the bat ear 35.

When the size of the bat ear 35 is formed to be large, an unnecessary volume of the secondary battery 3 further increases, and thus an error occurs in a design value and an actual value of the shape and size of the secondary battery 3. Therefore, when assembling the secondary batteries 3 to the battery module 5 (see FIG. 24), it is not easy to assemble, and there is a problem in that the size of the secondary battery 3 has to be designed small from the beginning in consideration of the bat ear 35. Also, since the volume of the secondary battery 3 increases, there is also a problem in that energy density to the volume decreases.

As described above, the pouch-type battery case 13 according to an embodiment of the present invention may include the cup part 133, in which the accommodation space 1331 accommodating the electrode assembly 10 is provided, and a degassing part 137 formed at one side of the cup part 133 to discharge a gas generated in the cup part 133 through a degassing hole H.

In addition, in a process of sealing the side 134, a formation process and a degassing process may be performed. Specifically, after the electrode assembly 10 is accommodated in the cup part 133, in the battery case 13, a corner 1371 included in the degassing part 137 is opened, and the remaining side 134 is sealed. When an edge of the battery case 13 is opened to form an opening, an electrolyte is injected into the battery case 13 through the opening.

After injecting the electrolyte into the battery case 13, the degassing part 137 is first sealed to form a temporary sealing part 1340. Since the sealing part 1341 is formed by secondary sealing of the degassing part 137 later, it is preferable that the temporary sealing part 1340 be formed at a position close to the edge 1371 in the degassing part 137.

After that, a formation process may be performed. The formation process (activation process) is a process of finalizing charging so that the secondary battery 1 is capable of supplying electric power. Since the formation process is performed after the temporary sealing part 1340 is formed, and the battery case 13 is completely sealed, the manufacture of the secondary battery may be completed within a predetermined process time by quickly discharging the gas at a high filling rate.

When the formation process is completed, a gas is generated in the battery case 13. Accordingly, the degassing hole H is punched in the degassing part 137 of the battery case 13. Through the degassing holes H, the gas is discharged from the inside of the battery case 13 to the outside. Here, the injected electrolyte may leak through the degassing hole H while the gas is easily discharged. In order to prevent this, it is preferable that the degassing hole H is punched at a position close to the temporary sealing part 1340. When the degassing hole H is punched, the degassing process of discharging the gas to the outside of the battery case 13 is performed.

When the degassing hole H is punched, the inside of the battery case 13 is opened again, and the electrolyte inside may leak to the outside. Accordingly, the sealing portion 1341 is formed by secondarily sealing a boundary between the cup part 133 and the degassing part 137. Here, the sealing part 1341 is formed between the cup part 133 and the degassing hole H, and is preferably formed in a position close to the cup part 133.

As described above, while performing the formation process and the degassing process, the degassing hole H has to be punched, and the primary sealing and the secondary sealing have to be performed. Furthermore, when mass-producing the secondary batteries 1, it is necessary to collectively manage the specifications and quality of the secondary batteries 1. For this, the battery case 13 or the secondary battery 1 may be inspected using an inspection device 4 (see FIG. 19) including a vision sensor 41.

According to the related art, there is a limitation in manufacturing the battery case 33 and the secondary battery 3 as a whole in a sharp shape. Accordingly, when the battery case 33 is photographed with the vision sensor, errors in the size and position of each component are large.

Specifically, when the manufacture of the secondary battery 1 is completed later, the battery module 5 (see FIG. 24) may be manufactured by connecting the electrode leads 12 of the plurality of secondary batteries 1 to each other. For this, all the positions of the electrode leads 12 formed in the plurality of secondary batteries 1 have to be constant. However, in the related art, since the electrode 101 is spaced apart from an outer wall 338 of the cup part 333 to some extent, the electrode assembly 10 may move inside the cup part 333 before sealing the side 134. Therefore, when the secondary batteries 3 are mass-produced, even though a volume of the cup part 333 and a volume of the electrode assembly 10 are all constant, the position of the electrode assembly 10 is slightly different, and thus the position of the electrode lead 12 is also slightly different. Therefore, it is necessary to accurately measure the position of the electrode lead 12 using the inspection device 4.

In addition, in order to punch the degassing hole H at the correct position and size, and perform the primary sealing and the secondary sealing at the correct position and size, the position of the degassing part 137 have be accurately measured. In addition, in order to efficiently manage the overall quality of the plurality of secondary batteries 1, the positions of the various components of the battery case 13 or the secondary battery 1 such as the side 134, the folding part 139, and the insulation part 14 protruding from the battery case 13, and furthermore, a width between the cup parts 133 have to be accurately measured.

In order to measure the positions of the components, it is necessary to set a specific reference line and measure a vertical distance from the reference line to the component to be measured. For example, when the electrode assembly 10 moves often inside the cup part 333, in general, in a left and right direction based on the bar illustrated in FIG. 17, that is, in a direction toward the folding part 339 and the degassing part 337. Therefore, in order to measure the position of the electrode lead 12, the position of the left or right edge of the electrode lead 12 has been measured, and in order to measure the vertical distance to the left or right edge, a reference parallel to the left or right edge has been established.

Figure 20:
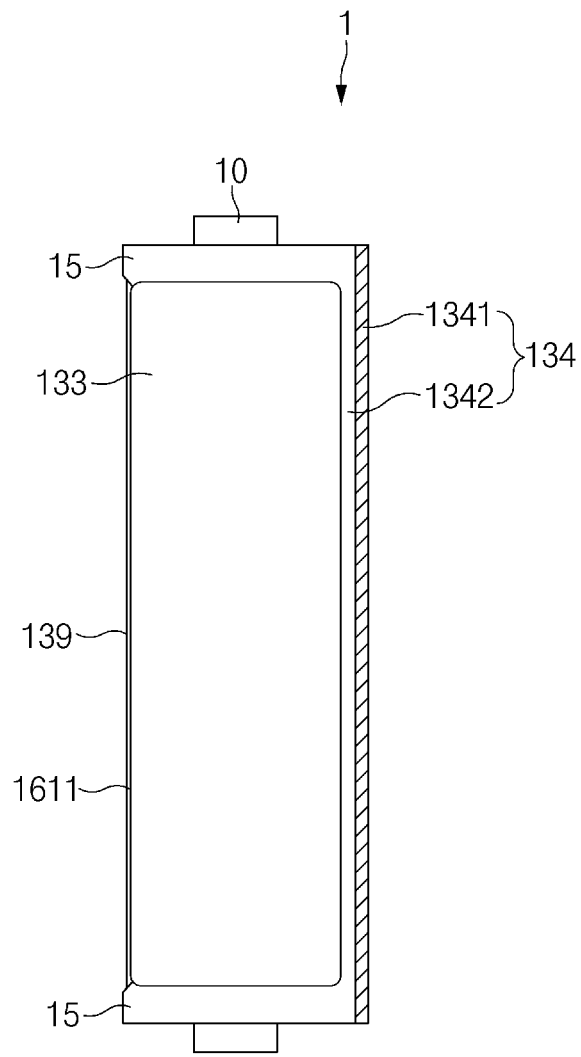
FIG. 20 is a schematic view illustrating the degassing part of the battery case being cut to manufacture a secondary battery according to an embodiment of the present invention.

However, in the related art, the outer wall 338 of the cup part 333 is not formed similar to a vertical state, and a curvature radius R2' of the punch edge 361 of the cup part 333 is also large. Thus, when the battery case 33 is photographed with the vision sensor 41, the punch edge 361 of the cup part 333 does not appear clearly in the image as illustrated in FIG. 20. Therefore, it is not possible to measure the positions of the components based on the punch edge 361 of the cup part 333, and the bat ear 35 close to the punch edge 361 is set as a reference, or the user manually set the punch edge 361 of the cup part 333 as a reference.

However, since the bat ear 35 is formed by folding the bridge 136 in a state in which the peripheral side 134 of the cup part 133 is also slightly elongated as a whole, the bat ear 35 for each of the plurality of secondary batteries 1 is slightly different in size. Then, even when the positions of the components are measured with the vision sensor, since the size of the bat ear 35 as a reference is different, a deviation of the positions of the components between the secondary batteries 3 increases, making quality control difficult.

In particular, even when the position of the electrode lead 12 is measured by photographing the battery case 33 with a vision sensor, the position of the electrode lead 12 is slightly different, and thus, when connecting the electrode leads 12 to manufacture the battery module 5, there is a problem in that the connection is not easy. In addition, in order to manufacture the battery module 5, when a plurality of secondary batteries 1 are sequentially stacked or aligned in a line, the position of the cup part 333 is not correct, and thus there is also a problem in that the alignment of the plurality of secondary batteries 1 is reduced.

In the case of manufacturing the battery module 5 by accommodating the secondary batteries 3 in a separate housing 51 (see FIG. 24), when the deviation of the measured values is large, a design tolerance when designing the housing 51 is set unnecessarily large, and thus there is also a problem in that the energy density compared to the volume of the battery module 5 is also lowered.

Figure 18:
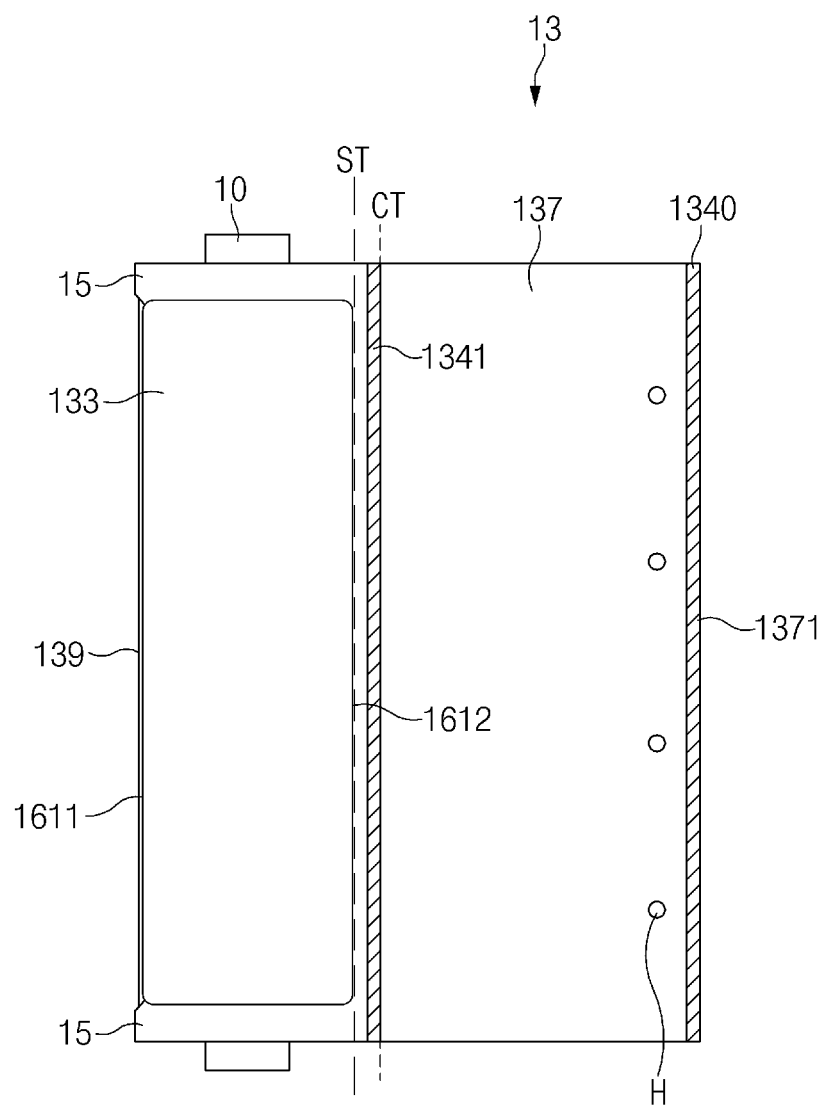
FIG. 18 is a schematic top view illustrating a battery case prior to cutting a degassing part according to an embodiment of the present invention.

FIG. 18 is a schematic top view illustrating a state before a degassing part 137 of a battery case 13 is cut according to an embodiment of the present invention, and FIG. 19 is a block diagram of an inspection device 4 according to an embodiment of the present invention.

According to an embodiment of the present invention, as illustrated in FIG. 18, as the moldability of the pouch film 135 is improved, the thickness t of the bridge 136 is formed to be thinner, the curvature radius R2 of the edge 1611 of the cup part 133 and the clearance CL may be formed to be smaller, and the size of the bat ear 15 may be more reduced. Accordingly, the secondary batteries 1 may be easily assembled into the battery module 5, and an unnecessary volume of the secondary battery 1 is reduced, and thus the energy density relative to the volume may increase.

In addition, according to an embodiment of the present invention, as illustrated in FIG. 18, Since the punch edge 1611 of the cup part 133 appears clearly in the image taken of the battery case 13, the inspection device 4 may automatically set the punch edge 161 of the cup part 133 as the reference line ST, the distance to various components of the battery case 13 or the secondary battery 1 can be accurately measured based on the punch edge 161 of the cup part 133, and furthermore, even the width CW between the cup parts 133 may be accurately measured. Accordingly, the positions of the components of the battery case 13 or the secondary battery 1 may be accurately measured to reduce an error in a measurement value and reduce a deviation between the secondary batteries 1.

For this, the inspection device 4 of the battery case 13 or the secondary battery 1 according to an embodiment of the present invention includes: a vision sensor 41 capturing a battery case 13 to acquires an image of the battery case 13 or the secondary battery 1; an outline extraction part 421 extracting outlines of the components of the battery case 13 or the secondary battery 1 from the image; an image analysis part 422 analyzing the image to detect the outline corresponding to a punch edge 161 of a cup part 133 in which an accommodating space 1331 accommodating the electrode assembly 10 in the battery case 13 is provided; a reference line setting part 423 setting the outline corresponding to the punch edge 161 as a reference line ST; and a distance calculation part 424 calculating a distance from the reference line ST to the components.

In addition, an inspection method of the battery case 13 or the secondary battery 1 according to an embodiment of the present invention includes: a process of capturing a battery case 13 to acquires an image of the battery case 13 or the secondary battery 1; a process of extracting outlines of the components of the battery case 13 or the secondary battery 1 from the image through an outline extraction part 421; a process of analyzing the image to detect the outline corresponding to a punch edge 161 of a cup part 133 in which an accommodating space 1331 accommodating the electrode assembly 10 in the battery case 13 is provided; a process of setting the outline corresponding to the punch edge 161 as a reference line ST; and a process of calculating a distance from the reference line ST to the components.

Specifically, the inspection device 4 includes a vision sensor 41 and a controller 42 as illustrated in FIG. 19. Also, the above-described components may be connected to each other to communicate with each other via a bus (not shown). All components provided in the controller 42 may be connected to the bus through at least one interface or adapter or may be directly connected to the bus. In addition, the bus may be connected to other sub systems in addition to the above-described components. The bus includes a memory bus, a memory controller, a peripheral bus, and a local bus.

The vision sensor 41 acquires an image by capturing a specific area to receive an image signal for the specific area. For this, in general, the vision sensor 41 includes an imaging device such as a charge coupled device (CCD) or a complementary metal-oxide semiconductor (CMOS) image sensor. In particular, in the vision sensor 41 according to an embodiment of the present invention, after the bridge 136 of the battery case 13 is folded, the battery case 13 is captured to acquire an image of each of components of the battery case 13 or the secondary battery 1. Here, the components include the above-described cup part 133, a degassing part 137, an electrode lead 12, a bat ear 15, a side 134, a folding part 139, and an insulation part 14. Then, the degassing part 137 is cut later to complete manufacture of the secondary battery 1. Therefore, if the vision sensor 41 captures the battery case 13 before cutting the degassing part 137, images of the battery case 13 and the electrode lead 12 may be acquired, and if the battery case 13 is captured after the degassing part 137 is cut, the image of the secondary battery 1 may be acquired.

The controller 42 receives an image signal acquired by the vision sensor 41 to recognize positions of each component of the battery case 13 or the secondary battery 1 from the image signal. The controller 42 includes the outline extraction part 421, the image analysis part 422, the reference line setting part 423, and the distance calculation part 424. It is preferable to use a central processing unit (CPU), a micro control unit (MCU), or a digital signal processor (DSP) as the controller 42, but is not limited thereto. For example, various logical operation processors may be used.

The outline extraction part 421 extracts the outlines of each component of the battery case 13 or the secondary battery 1 from the image received from the vision sensor 41. Here, the outline extraction part 421 may extract the outlines of all the components appearing in the image, but is not limited thereto, and a region of interest (ROI) may be set in a portion of the image, and it is also possible to extract only the outlines of the components appearing within the ROI. In order to extract the outline, information about pixels of the image is first extracted, and for this purpose, a gradient formula generally used may be used. The outline of the battery case 13 and the electrode lead 12 is revealed through the extracted pixel information.

According to one embodiment of the present invention, a curvature radius R2 and a clearance CL of the punch edge 161 of the cup part 133 may be formed smaller, and since an outer wall 138 of the cup part 133 is formed similar to a vertical state, the gradient of the pixel information corresponding to the punch edge 161 of the cup part 133 in the image is large. Therefore, since a boundary between the outline and the background is clear, the outline corresponding to the punch edge 161 of the cup part 133 may be clearly extracted.

The image analysis part 422 analyzes the image and detects an outline corresponding to the punch edge 161 of the cup part 133 in the battery case 13. For this, the image analysis part 422 matches pre-stored reference outline information of the punch edge 161 of the cup part 133 with the extracted outline information to detect the outline corresponding to the punch edge 161 of the cup part 133. In this case, the image analysis part 422 may match two pieces of information using a template matching technique.

The reference line setting part 423 may set the outline corresponding to the punch edge 161 as the reference line ST. Since the cup part 133 includes a plurality of punch edges 161, a plurality of outlines corresponding to the punch edges 161 are also extracted. Here, in order to accurately measure the positions of the respective components of the battery case 13 or the secondary battery 1, the reference line setting part 423 may preferably set the outline corresponding to the punch edge 161 closest to the component to be measured as the reference line ST among the plurality of punch edges 161. In addition, as described above, since the positions of the components have to measure a vertical distance from the reference line ST, the reference line setting part 423 may set the outline corresponding to the punch edge 161 parallel to an edge of the component to be measured among the plurality of punch edges 161 as the reference line ST.

For example, in order to punch a degassing hole H (see FIG. 17 and FIG. 18) and perform primary sealing and secondary sealing, the inspection device 4 may need to measure the position of the degassing part 137. In this case, the reference line setting part 423 may set the outline corresponding to a die edge 162-side punch edge 1612 that is close to the degassing part 137 and is parallel to the edge 1371 included in the degassing part 137 among the plurality of punch edges 161 as the reference line ST.

For example, in order to inspect whether the positions of the electrode leads 12 are all constant, the inspection device 4 may have to measure positions of the electrode leads 12. In this case, the reference line setting part 423 may set an electrode lead 12-side outline corresponding to a folding part 139-side punch edge 1611 that is close to the electrode lead 12 and is parallel to left and right edges of the electrode lead 12 among the plurality of punch edges 161 as the reference line ST.

Furthermore, in order to measure a width between the cup parts 133, the reference line setting part 423 may set one outline of outlines of two punch edges 161 corresponding to a boundary of the width of the cup part 133 among the plurality of punch edges 161 as the reference line ST.

That is, as long as the reference line setting part 423 accurately measures the positions of the respective components of the battery case 13 or the secondary battery 1, the reference line setting part 423 may set various outlines as the reference line ST without limitation.

The distance calculation part 424 calculates a distance from the reference line ST to the respective components of the battery case 13 or the secondary battery 1 in the image. For example, if the outline corresponding to the die edge 162-side punch edge 1612 is set as the reference line ST, the distance calculation part 424 may calculate a distance from the reference line ST to the edge included in the degassing part 137. Alternatively, if the outline corresponding to the folding part 139-side punch edge 1611 is set as the reference line ST, the distance calculation part 424 may calculate a distance from the reference line ST to one edge of the electrode lead 12, and also calculate a distance to the outline corresponding to the die-edge 162-side punch edge 1612.

The distance calculation part 424 may use information about a relationship between the number of pixels in the image and an actual distance stored in advance. That is, in the image, the distance calculation part 424 may count a distance from the reference line ST to each of the components into the number of pixels, and then calculate an actual distance corresponding to the counted number of pixels by using information on the relationship between the number of pixels in the image stored in advance and the actual distance.

The inspection device 4 may further include a storage part 44 The storage part 44 stores a program for processing and controlling operations of the inspection device 4 and various data or received signals generated during execution of each program. In particular, the reference information about the battery case 13 may be stored so that the image analysis part 422 detects the outline corresponding to the punch edge 1611 of the cup part 133. Here, the reference information about the battery case 13 includes reference outline information about the punch edge 1611 of the cup part 133 and reference information on the distance to the components of the battery case 13 or the secondary battery 1. This may be directly stored in the storage part 44 by the user, or the inspection device 4 may generate and store the reference information through repeated learning. In addition, the storage part 44 may store information on the relationship between the number of pixels and the actual distance in the image so that the distance calculation part 424 calculates the actual distance from the reference line ST to each component. Furthermore, it is also possible to store inspection result information of the battery case 13 to be inspected. This storage part 44 may be embedded in the inspection device 4, but may be provided as a separate storage server. The storage part 44 includes a non-volatile memory device and a volatile memory device. The non-volatile memory device may be a NAND flash memory that is small in volume and light and resistant to an external impact, and the volatile memory device may be a DDR SDRAM.

The controller 42 may further include a defection determination part 425 for determining whether the battery case 13 to be inspected is defective. The defection determination part 425 may compare the reference information about the battery case 13 stored in the storage part 44 to the inspection result information of the battery case 13 to be inspected. Also, if the inspection result information is included within an error range of the reference information, it is determined that the battery case 13 is normal. However, if the inspection result information is out of the error range of the reference information, it is determined that the battery case 13 is defective.

The inspection device 4 may further include a display part 43 for receiving and displaying an image signal. The display part 43 receives a signal of the image and displays the image to the user. Furthermore, when the outline extraction part 421 extracts the outline of the battery case 13, the outline may be displayed on the image so that the user checks the outline through the display part 43. The display part 43 may use various methods such as a liquid crystal display (LCD), an organic liquid crystal display (OLED), a cathode ray tube (CRT), and a plasma display panel (PDP). In addition, the display part 43 is connected to the bus through a video interface, and data transmission between the display part 43 and the bus may be controlled by a graphic controller.

The inspection device 4 may further include an alarm part 45 that generates an alarm when the defection determination part 425 determines that the battery case 13 is defective. When generating an alarm, it is preferable to generate an audible or visual alarm such as lighting of a lamp or a warning sound so that the user intuitively know.

Each of the components of the vision sensor 41, the controller 42, the storage part 44, and display part 43, which are described so far, may be implemented with software such as tasks, classes, subroutines, processes, objects, execution threads, and programs, which are performed in a predetermined region in the memory, or hardware such as a field-programmable gate array (FPGA) or an application-specific integrated circuit (ASIC) and may also be implemented with a combination of the software and the hardware. The components may be included in a computer-readable storage medium, or portions of the components may be dispersed and distributed in a plurality of computers.

In addition, each block may represent a portion of a module, a segment, or a code that includes one or more executable instructions for executing a specified logical functions. Also, in some alternative implementations, it is also possible that the functions mentioned in the blocks occur out of sequence. For example, it is possible that the two blocks shown in succession are actually executed at the same time in fact and also that the blocks are sometimes executed in the reverse order according to the corresponding function.

When the inspection device 4 according to an embodiment of the present invention is used, since the punch edge 1611 of the cup part 133 is clearly displayed, the inspection device 4 may automatically set the punch edge 161 of the cup part 133 as the reference line ST and accurately measure the distance to each component of the battery case 13 based on the punch edge 1611 of the cup part 133. For example, the size and position of the degassing part 137 may be measured, and even after the manufacture of the secondary battery 1 is completed, the size and positions of the cup part 133, the electrode lead 12, the bat ear 15, and the side 134, the folding part 139, and the insulating part 14 may be accurately identified. Thus, it is possible to easily determine whether the secondary battery 1 is defective, and even if the secondary battery 1 is mass-produced, its specifications and quality may be efficiently and collectively managed.

In particular, since the position of the electrode lead 12 is accurately measured, when connecting the electrode leads 12 to manufacture the battery module 5, the components may be easily connected to each other. In addition, the position of the cup part 333 is accurately measured, and thus, when sequentially stacking or aligning the plurality of secondary batteries 1 in a line to manufacture the battery module 5, the alignment of the plurality of secondary batteries 1 may be improved.

FIG. 20 is a schematic view illustrating a state in which the degassing part of the battery case 13 is cut to completely manufacture a secondary battery 1 according to an embodiment of the present invention.

After secondary sealing of the battery case 13 to form the sealing part 1341, the degassing part 137 is cut by setting a cutting line CT at the outside of the sealing part 1341. As a result, as illustrated in FIG. 20, a length of the degassing part 137 may be shortened, and a volume of the secondary battery 1 may be reduced. Through the above process, the manufacture of the pouch-type secondary battery 1 is completed.

In the side 134 remaining after cutting the degassing part 137, the electrode lead 12 is not formed to protrude among the plurality of sides 134. However, if the side 134 is left as it is after sealing, the overall volume of the secondary battery 1 increases. Accordingly, to reduce energy density relative to the volume, it is desirable to fold the side 134.

The side 134 may include a sealing part 1341 and a non-sealing part 1342 as illustrated in FIG. 20. The sealing part 1341 is a sealed area that is disposed relatively outside, and the non-sealing part 1342 is a non-sealed area that is disposed relatively inside.

Specifically, when the sealing part 1341 is formed by the secondary sealing of the battery case 13, the sealing part 1341 is not directly connected from the cup part 133, but may be formed to be spaced apart to a certain extent. When sealing the side 134, heat and pressure have been applied to the side 134 using a separate sealing tool (not shown). However, if the side 134 is sealed while the sealing tool is in close contact with the cup part 133, a sealant layer 1351 disposed inside the side 134 is partially melted to leak toward the electrode assembly 10, thereby contaminating the electrode assembly 10. In addition, the heat of the sealing tool may be transferred to the electrode assembly 10 to damage the electrode assembly 10. Therefore, it is preferable to seal the side 134 in a state in which the sealing tool is spaced apart from the cup part 133 to some extent. Then, a portion sealed by the sealing tool becomes a sealing portion 1341, and a portion that is not sealed because the sealing tool is spaced apart from the cup part 133 becomes a non-sealing portion 1342.

Figure 21:
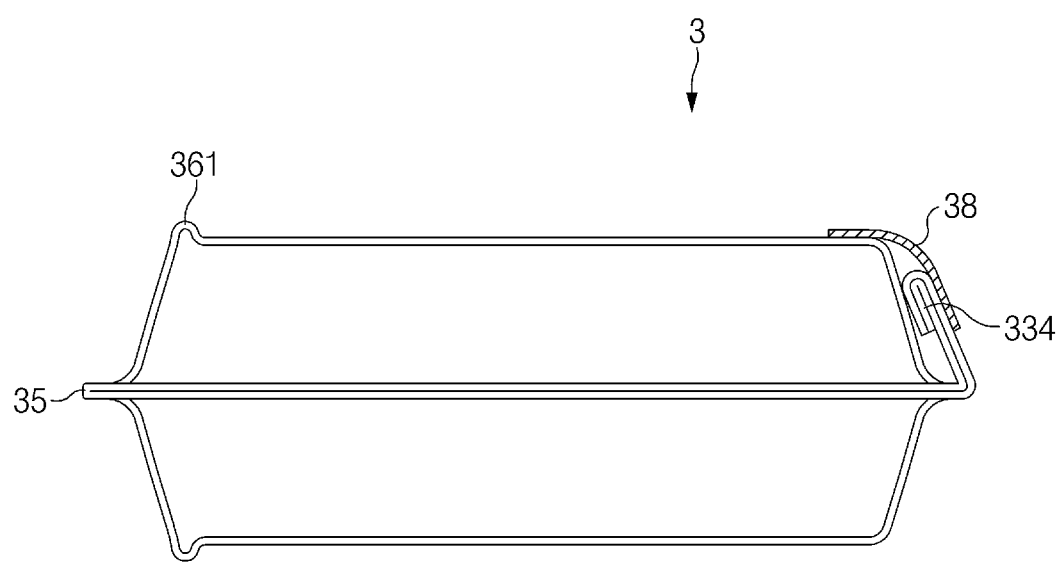
FIG. 21 is a schematic side view illustrating a side being folded according to the related art.
Figure 22:
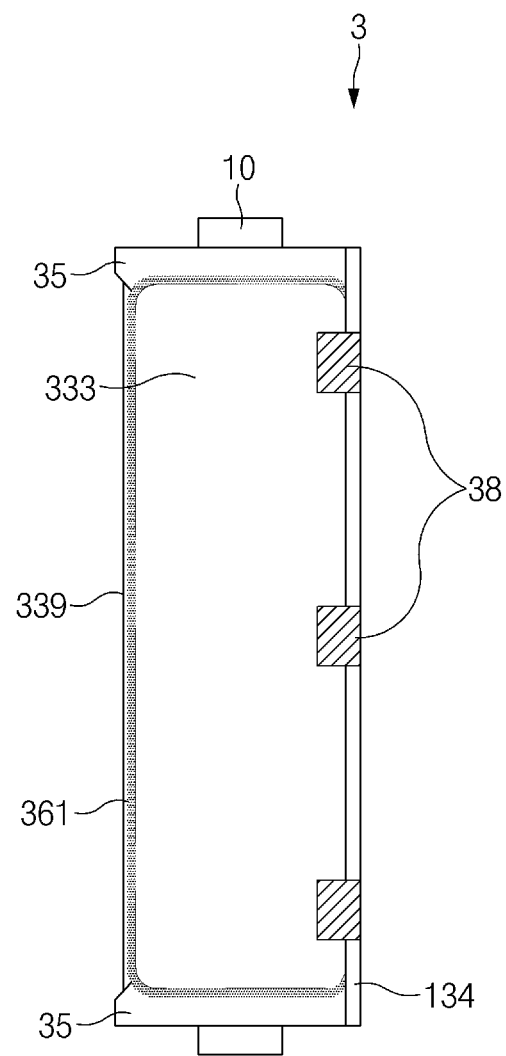
FIG. 22 is a schematic top view illustrating a state in which the side 334 is folded according to the related art.

FIG. 21 is a schematic side view illustrating a state in which the side 334 is folded according to the related art, and FIG. 22 is a schematic top view illustrating a state in which the side 334 is folded according to the related art.

In the related art, when the side 334 is folded, there is a problem in that the side 334 is not fixed and is unfolded again at a predetermined angle. Specifically, as described above, the pouch film 135 is formed by stacking a sealant layer 1351, a moisture barrier layer 1352, an elongation assistance layer 1354, and a surface protection layer 1353. Among them, since the sealant layer 1351 includes a first polymer, particularly polypropylene (PP), flexibility and elasticity are good. Therefore, when the side 334 is folded, restoring force to return to the original state is large. On the other hand, since the moisture barrier layer 1352 is made of a metal, in particular, an aluminum alloy, after the side 334 is folded, a limit of elastic deformation is exceeded, and thus the retention force to maintain the folded state is large.

However, in the pouch film according to the related art, the moisture barrier layer had a thickness of about 30 to 50 µm, and the sealant layer has a thickness of about 60 to 100 µm. That is, the thickness of the moisture barrier layer is formed to be considerably thinner than the thickness of the sealant layer. Therefore, the restoring force is greater than the retention force, and thus, the side 334 is not fixed and unfolded again at a predetermined angle. Then, there is a problem in that an unnecessary volume of the secondary battery 3 increases due to the side 334.

To solve this, as illustrated in FIGS. 21 and 22, a tape 38 is separately attached to the side 334. In particular, the tape 38 is attached together to the side 334 and the outer surface of the bottom 3332 of the cup part 333 to fixing the side 334 to the cup part 333, thereby preventing the side from being unfolded again. However, in this case, as illustrated in FIG. 21, there is a problem in that the overall thickness of the secondary battery 3 increases due to the thickness of the tape 38 itself. In addition, after a process of folding the side 334, an additional process of attaching the tape 38 is required, and this process takes a lot of time to increase in number of processes and deteriorate manufacturing yield of the secondary battery 3.

When the degassing process is performed, as a gas is discharged from the inside of the battery case 13 to the outside, an internal pressure of the cup part 133 is reduced. In the related art, the electrode assembly 10 is disposed to be spaced apart from the outer wall 338 of the cup part 333 to some extent. Accordingly, in order to reduce the volume of the space 37 between the outer wall 338 of the cup part 333 and the electrode assembly 10 while the internal pressure of the cup part 333 is reduced, the outer wall 338 of the cup part 333 or the bottom part 3332 may be deformed. In particular, as illustrated in FIG. 21, as the folding part-side outer wall 338 of the secondary battery 3 is recessed inward, an edge high phenomenon, in which the folding part 339-side punch edge 361 of the cup part 333 protrudes outward to increase in height, may occur. Due to this edge high phenomenon, an unnecessary thickness of the secondary battery 3 increases, and thus, there is a problem in that the energy density relative to volume is lowered. In addition, since the folding part 339-side outer wall 338 of the cup part 333 is deformed, the outer appearance of the secondary battery 3 is not elegant, and thus there is a problem in that marketability is also reduced. Furthermore, there is a problem in that the size of the bat ear 15 further increases, and the shape is prominent due to the edge high phenomenon.

Figure 23:
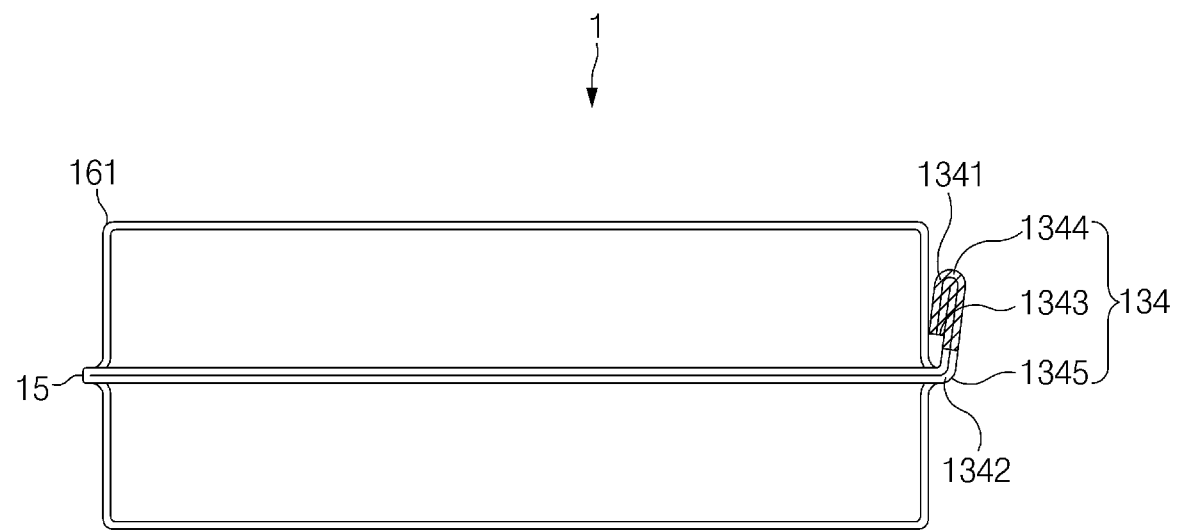
FIG. 23 is a schematic side view illustrating the side being folded according to an embodiment of the present invention.

FIG. 23 is a schematic side view illustrating a state in which the side 134 is folded according to an embodiment of the present invention.

According to an embodiment of the present invention, in the pouch film 135, since the moisture barrier layer 1352 has a thickness of 50 to 70 µm, and the sealant layer 1351 has a thickness of 70 to 100 µm, the thickness of the moisture barrier layer 1352 becomes thicker than in the prior art. Accordingly, since the retention force further increases when the side 134 is folded, it is possible to prevent the side 134 from being unfolded again without the need for a separate tape 38 to be attached thereto.

To this end, the secondary battery 1 according to an embodiment of the present invention includes an electrode assembly 10 formed by stacking electrodes 101 and separators 102; and a pouch-type battery case 13 having a cup part 133 for accommodating the electrode assembly 10 therein. The pouch-type battery case 13 includes a side 134 extending outward from the cup part 133, and the side 134 includes a sealing part 1344 sealed by being disposed relatively outside and a non-seal part 1345 that is disposed relatively inside and is not sealed. Thus, the side 134 does not adhere to the cup part 133 and is folded at the non-sealing part 1345.

That is, as illustrated in FIG. 23, after the side 134 is folded toward the cup part 133 in the secondary battery 1, the side 134 does not adhere to the cup part 133 while maintaining the folded state and thus is not unfolded. In this case, the side 134 may be folded at an angle of 85° to in particular, an angle of 88° to 92°. In addition, the side 134 may be folded at a position adjacent to the cup part 133 so that the side 134 is in contact with the outer wall 138 of the cup part 133. In particular, as described above, the side 134 may include the sealing part 1341 disposed relatively outside and thus sealed and the non-sealing part 1342 disposed relatively inside so as not to be sealed. Also, when the side 134 is folded, it is preferable that the non-sealing part 1342 relatively closer to the cup part 133 is folded. Thus, the unnecessary volume of the secondary battery 1 may be further reduced. However, even in this case, the side 134 and the cup part 133 do not adhere to each other, and the retention force of the side 134 increases to maintain the folded state.

When the two cup parts 133 are formed on the pouch film 135, a depth D of the cup part 133 may be shallower than when one cup part 133 is formed. This is because, as described above, not only the cup part 133 is intensively elongated, but also the peripheral sides 134 of the cup part 133 are finely elongated as a whole. However, if the width of the side 134 is longer than the depth D of the cup part 133, when the side 134 is folded only once, the outer end 1343 of the side 134 may further protrude outward than the bottom part 1332 of the cup part 133.

Accordingly, if the two cup parts 133 are formed on the pouch film 135, a double side folding (DSF) method of folding the side 134 twice as illustrated in FIG. 23 may be used. Specifically, the side 134 may include a first folding part 1344 and a second folding part 1345. The first folding part 1344 is a portion folded at a position relatively closer to the outer end 1343, and the second folding part 1345 is a portion folded at a position relatively closer to the cup part 133. Accordingly, after the side 134 is first folded based on the first folding part 1344, the side 134 may be secondarily folded based on the second folding part 1345. In this case, the first folding part 1344 may be disposed on the sealing part 1341 at the side 134, and the second folding part 1345 may be disposed on the non-sealing part 1342 at the side 134. In addition, the side 134 may be folded at an angle of 170° to 180°, in particular, an angle of 180° in the first folding part 1344. In addition, the second folding part 1345 may be folded at an angle of 85° to 95°, particularly, 88° to 92°. Thus, it is possible to prevent the outer end 1343 of the side 134 from protruding further outward than the bottom part 1332 of the cup part 133.

According to an embodiment of the present invention, since the electrode assembly 10 may be disposed very close to the outer wall 138 of the cup part 133, the unnecessary volume of the cup part 133 is reduced. Therefore, even if the internal pressure of the cup part 133 is reduced by performing the degassing process, it is possible to prevent the outer wall 138 or the bottom part 1332 of the cup part 133 from being deformed. That is, as illustrated in FIG. 23, it is possible to prevent the edge high phenomenon from occurring, and thus, the energy density relative to volume may not decrease.

Figure 24:
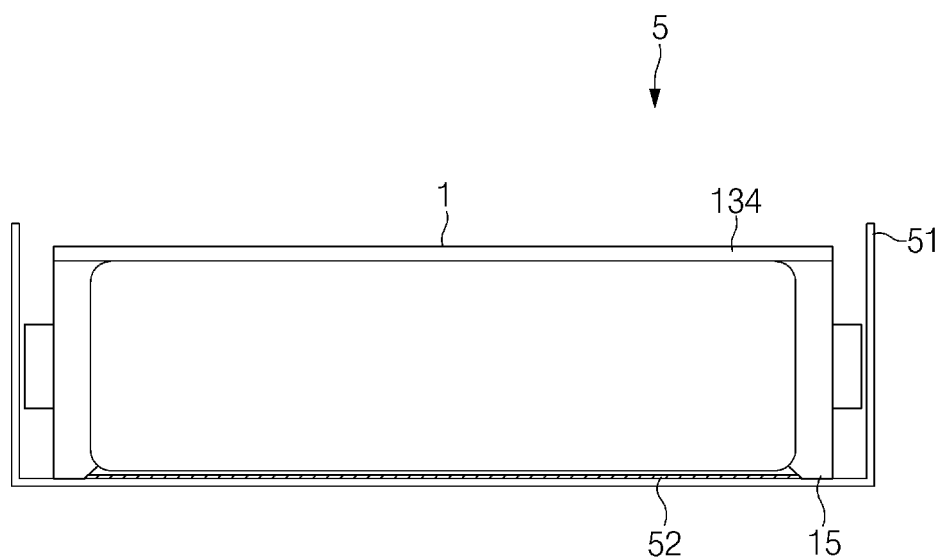
FIG. 24 is a schematic view of a battery module according to an embodiment of the present invention.

FIG. 24 is a schematic view of a battery module 5 according to an embodiment of the present invention.

Since medium and large-sized electronic devices such as automobiles need to have a large output, many secondary batteries 1 are required. In order to easily move and install these secondary batteries 1, the battery module 5 may be manufactured. When a plurality of secondary batteries 1 are installed in the battery module 5, electricity may be stably supplied to the outside.

In order to produce electricity in an electrode assembly 10 of the secondary battery 1, a chemical reaction occurs between an electrode 101 and an electrolyte, and heat is generated in this process. However, when an ambient temperature excessively increases due to heat, there is a problem that a malfunction occurs in a circuit of the electric device in which the secondary battery 1 is installed, or the lifespan of the electric device is shortened. Accordingly, the battery module 5 includes a cooling system for cooling the secondary battery 1. The cooling system are largely classified into a water cooling type that cools the secondary battery using cooling water and an air cooling type that cools the secondary battery using air. Among them, the water cooling type cooling system has cooling efficiency higher than the air cooling type cooling system and thus is more widely used.

The cooling system includes a cooling plate that directly cools the secondary battery 1, and a separate flow path is formed inside the cooling plate so that cooling water flows. Also, as the passage increases in thickness and length, a surface area may increase to improve the cooling efficiency.

In order to manufacture the battery module 5, first, a plurality of secondary batteries 1 are manufactured, and then the secondary batteries 1 are connected to each other and accommodated in the housing 51. In this case, the secondary batteries 1 may be aligned in a line and stacked. As illustrated in FIG. 24, when the secondary battery 1 is accommodated in the housing 51, a long side of the secondary battery 1 may face downward, and a cooling plate (not shown) may be formed on a bottom surface of the housing 51. Therefore, cooling efficiency may increase by cooling the cooling plate from the long side of the secondary battery 1.

A folding part 139 formed by folding the bridge 136 is formed at one side of the secondary battery 1, and a side 134, which is an area remaining after the degassing part 137 is cut, is formed on the other side. However, if the cooling plate cools from the side on which the side 134 is formed among the plurality of surfaces of the secondary battery 1, a distance between the cooling plate and the electrode assembly 10 increases by the side 134 to deteriorate cooling efficiency. Accordingly, it is preferable to cool the cooling plate from the side on which the folding part 139 is formed among the long side surfaces of the secondary battery 1. To this end, when the secondary battery 1 is accommodated in the housing 51, the folding part 139 may be accommodated in a direction toward the cooling plate, that is, downward.

Figure 25:
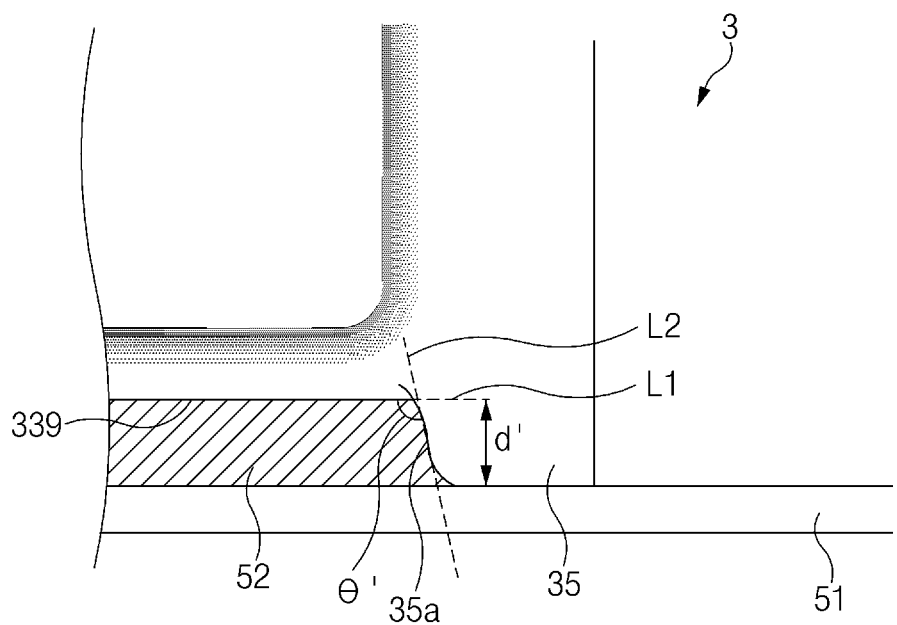
FIG. 25 is an enlarged front view illustrating a secondary battery being accommodated in a housing of a battery module according to the related art.
Figure 26:
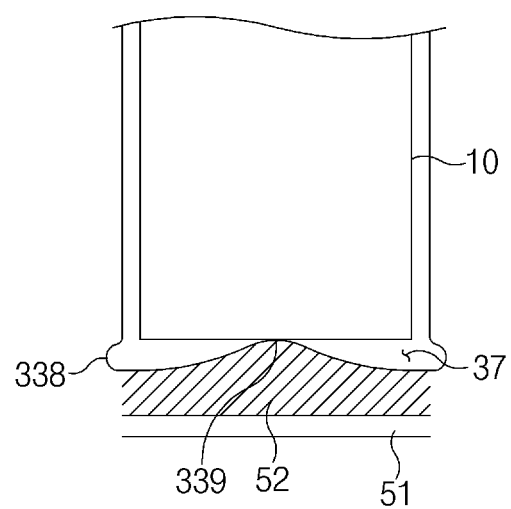
FIG. 26 is an enlarged side view illustrating the secondary battery being accommodated in the housing of the battery module according to the related art.

FIG. 25 is an enlarged front view illustrating a state in which a secondary battery 3 is accommodated in the housing 51 of the battery module 5 according to the related art, and FIG. 26 is an enlarged side view illustrating a state in which the secondary battery 3 is accommodated in the housing 51 of the battery module 5 according to the related art.

As described above, there is a limit in reducing a size of the bat ear 35 in the related art.

In addition, in the related art, an angle θ' formed between the folding part 339 and the inner edge 35*a* of the bat ear 35 is formed to be less than 151 degrees.

Here, the angle θ may mean an angle formed by a virtual first line L1 corresponding to the folding part 339 and a virtual second line L2 corresponding to the inner edge 35*a* of the bat ear 35. In particular, the first line L1 and the second line L2 may be determined through image analysis. For example, the first line L1 and the second line L2 may be extracted by connecting a plurality of edge points identified within a region of interest (ROI) in the vision device. Accordingly, even when the folding part 339 or the inner edge 35*a* of the bat ear 35 is partially bent or curved, the first line L1 and the second line L2 may be clearly defined. Since the image analysis is a well-known technique, a detailed description thereof will be omitted.

Therefore, as illustrated in FIG. 25, when the secondary battery 3 is accommodated in the housing 51, the housing 51 and the folding part 339 are spaced a large gap d' (e.g., greater than 1.5 mm) from each other by the bat ear 35. Therefore, the gap d' may interfere with cooling of the cooling plate, and thus cooling efficiency may be reduced. To solve this problem, a heat transfer material 52 is injected into the space between the cooling plate and the folding part 339 of the secondary battery 1, and thus the cooling plate cools the folding part 139 through the heat transfer material 52.

However, if the size of the bat ear 15 is large, the cost increases because a large amount of the heat transfer material 52 has to be injected, and since the gap d' between the cooling plate and the folding part 139 is large, the cooling efficiency is still low.

In addition, when the degassing process is performed through the degassing hole H, as illustrated in FIG. 26 while the internal pressure of the battery case 33 is reduced, the folding part 339 of the battery case 33 is in close contact with the electrode assembly 10. However, there is a limit in reducing the clearance CL' in the related art, and the width of the folding part 339 is also formed large. Accordingly, the space 37 between the outer wall 338 of the cup part 333 and the electrode assembly 10 is formed to be large, and there is a problem in that the energy density relative to the volume of the secondary battery 3 is reduced. Furthermore, since the distance the electrode assembly 10 is separated from the thermal grease 52 also increases, there is a problem in that cooling efficiency is further lowered.

Figure 27:
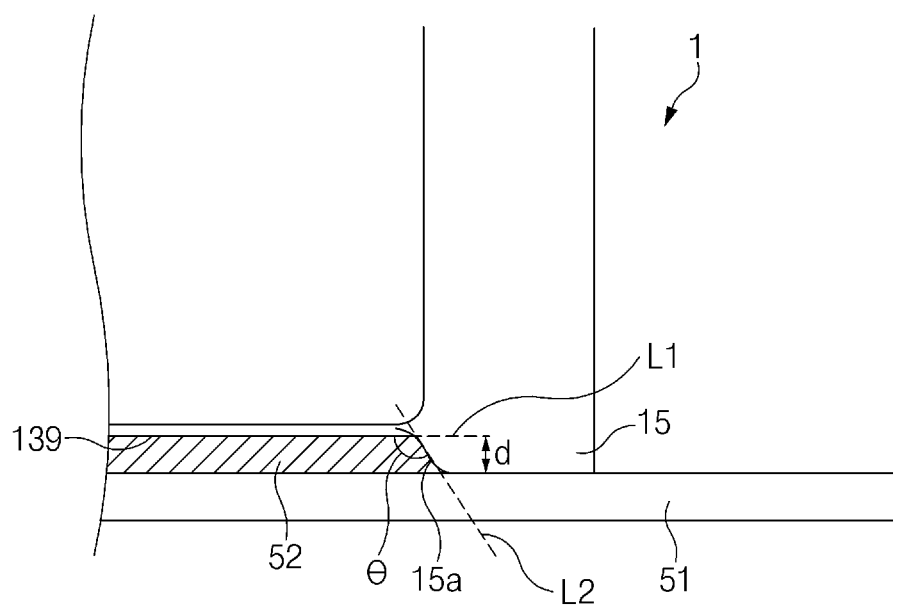
FIG. 27 is an enlarged front view illustrating a secondary battery being accommodated in the housing of a battery module according to an embodiment of the present invention.
Figure 28:
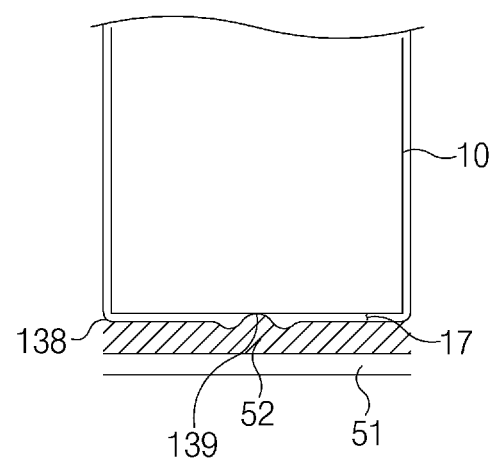
FIG. 28 is an enlarged side view illustrating the secondary battery being accommodated in the housing of the battery module according to an embodiment of the present invention.

FIG. 27 is an enlarged front view illustrating a state in which a secondary battery 1 is accommodated in a housing 51 of a battery module according to an embodiment of the present invention, and FIG. 28 is an enlarged side view illustrating a state in which the secondary battery 1 is accommodated in the housing 51 of the battery module according to an embodiment of the present invention.

The pouch-type secondary battery 1 according to an embodiment of the present invention includes: an electrode assembly 10 in which electrodes 101 and separators 102 are stacked; and a pouch-type battery case 13 having a cup part 133 accommodating the electrode assembly 10 therein, wherein the battery case 13 includes: a first case 131 and a second case 132, in which a cup part 133 is formed in at least one of the first and second cases; a folding part 139 for integrally connecting the first case 131 to the second case 132; and a bat ear 15 protruding outward from a portion of both ends of the folding part 139, wherein the bat ear 15 has a length d of 1.5 mm or less.

In addition, an angle θ between the folding part 139 and the inner edge 15*a* of the bat ear 15 may be formed to be greater than 151 degrees. Also, the angle θ may be 180 degrees or less. Also, when the angle θ is 180 degrees, it may mean a state in which the bat ear 15 does not exist.

Here, the angle θ' may mean an angle formed by a virtual first line L1 corresponding to the folding part 139 and a virtual second line L2 corresponding to the inner edge 15*a* of the bat ear 15. Description of the first line L1 and the second line L2 will be derived from the above description.

A battery module 5 according to an embodiment of the present invention includes: a pouch-type secondary battery in which an electrode assembly 10, in which electrodes 101 and separators 102 are stacked, is accommodated in a cup part 133 formed in a pouch-type battery case 13; and a housing 51 in which the secondary battery 1 is accommodated therein, wherein the battery case 13 includes: a first case 131 and a second case 132, in which a cup part 133 is formed in of the first and second cases; a folding part 139 for integrally connecting the first case 131 to the second case 132; and a bat ear 15 protruding outward from a portion of both ends of the folding part 139, wherein the bat ear 15 has a length d of 1.5 mm or less.

As described above, the bat ear 15 is formed to protrude outward from a portion of both ends of the folding part 139 by folding the bridge 136. According to an embodiment of the present invention, a length of such a bat ear 15 may be 1.5 mm or less, in particular 1 mm or less. The length of the bat ear 15 may be a length measured from the folding part 139-side outer wall 1381 to the outermost end of the bat ear 15. In this case, as described above, the folding part 139-side outer wall 1381 may have an inclination angle of 90° to 95° from the bottom part 1332 due to the clearance CL. When considering this, as an example of measuring the bat ear, the length of the bat ear 15 may be a length measured from the outermost protruding portion of the folding part 139-side outer wall 1381 to the outermost end of the bat ear 15.

The length of the bat ear 15 may be measured in direct contact with the secondary battery 1 using a ruler or vernier calipers, or may be measured in a non-contact manner using a laser displacement sensor or a vision sensor.

As described above, a method for measuring the length of the bat ear is described as an example, and only the case in which the method is limited to the above measurement method is not included in the scope of the present invention. The length of the bat ear may be the length of the bat ear within the meaning of the present invention as long as it falls within the scope of the claims and the spirit of the present invention.

According to an embodiment of the present invention, the depth D of the cup part 133 is molded to 6.5 mm or less, the thickness t of the bridge 136 is formed to be thinner, and the curvature radius R2 of the edge 1611 of the cup part 133 and the clearance CL may be formed to be smaller.

Accordingly, the length d of the bat ear 15 may also be further reduced to 1.5 mm or less, particularly to 1 mm or less. Therefore, as illustrated in FIG. 27, an interval d between the housing 51 and the folding part 139 may be narrowed to 1.5 mm or less. As a result, the thickness of the thermal grease 52 inside the housing 51 may be 1.5 mm or less, and thus an injection amount of thermal grease 52 may be further reduced to reduce costs and improve cooling efficiency.

In addition, as illustrated in FIG. 28, the clearance CL may be made smaller, and the width FW of the folding part 139 may be made smaller. Accordingly, the space 17 between the outer wall 138 of the cup part 133 and the electrode assembly 10 is reduced, and thus, the energy density relative to the volume of the secondary battery 1 may increase. In addition, since the distance between the electrode assembly 10 and the thermal grease 52 is also reduced, cooling efficiency may further increase.

Those with ordinary skill in the technical field of the present invention pertains will be understood that the present invention can be carried out in other specific forms without changing the technical idea or essential features. Therefore, the above-disclosed embodiments are to be considered illustrative and not restrictive. Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

DESCRIPTION OF THE SYMBOLS

1: Secondary battery
2: Molding device
3: Secondary battery according to related art
4: inspection device
5: Electrode module
10: Electrode assembly
11: Electrode tab
12: Electrode lead
13: Battery case
14: Insulation part
15: Bat ear
16: Edge
17: Space
22: Die
33: Punch
33: Battery case according to related art
35: Bat ear according to related art
36: Edge according to related art
37: Space according to related art
38: Tape according to related art
41: Vision sensor
42: Controller
43: Display part
44: Storage part
45: Alarm part
51: Housing
52: Thermal grease
101: Electrode
102: Separator
111: Positive electrode tab
112: Negative electrode tab
121: Positive electrode lead
122: Negative electrode lead
131: First case
132: Second case
133: Cup part
134: Side
135: Pouch film
136: Bridge
137: Degassing part
138: Outer wall
139: Folding part
161: Punch edge
162: Die edge
163: Thickness edge
164: Corner
211: Molding part
212: Partition wall
213: Edge of die
221: Edge of punch
333: Cup part according to related art
334: Side according to related art
336: Bridge according to related art
337: Degassing part according to related art
338: Outer wall according to related art
339: Folding part according to related art
361: Punch edge according to related art
362: Die edge according to related art
421: Outline extraction part
422: Image analysis part
423: Reference line setting part
424: Distance calculation part
425: Defection determination part
1021: Peripheral portion
1331: Accommodation space
1332: Bottom part
1333: Outer wall
1340: Temporary sealing part
1341: Sealing part
1342: Non-sealing part
1343: Outer end
1344: First folding part
1345: Second folding part
1351: Sealant layer
1352: Moisture barrier layer
1353: Surface protection layer
1354: Elongation assistance layer
1371: Edge
1381: Bridge-side outer wall
1382: Degassing part-side outer wall
1391: Groove
1611: Bridge-side punch edge
1612: Degassing part-side punch edge
1613: First punch edge
1614: Second punch edge

The invention claimed is:

1. A pouch-type battery case comprising a cup part configured to accommodate an electrode assembly of stacked electrodes and separators, the cup part comprising:
a plurality of outer walls forming a periphery of the cup part, and
a plurality of die edges connecting the plurality of outer walls to a side or degassing part,
wherein at least one of the die edges is rounded to define a curvature radius that corresponds to 1/20 to 1/6 of a depth of the cup part, wherein at least one of the die edges is rounded to define a curvature radius of 1 mm or less.

2. The pouch-type battery case of claim 1, wherein the cup part further comprises:
a plurality of punch edges which connect the outer walls to a bottom part, at least one punch edge being rounded to define a curvature radius of 1 mm or less; and
a thickness edge configured to connect two outer walls adjacent to each other.

3. The pouch-type battery case of claim 2, wherein a vertical distance between a die edge vertical line passing a boundary point of the die edge and the die edge-side outer wall is perpendicular to the bottom part, and an edge vertical line passing a boundary point of the die edge-side punch edge and the die edge-side outer wall and is perpendicular to the bottom part is 0.5 mm or less.

4. The pouch-type battery case of claim 2, wherein the thickness edge is connected to two punch edges adjacent to each other to form a corner, and at least one of the corner is rounded to define a curvature radius of 2 mm to 5 mm, wherein the curvature radius is greater than that of the thickness edge.

5. The pouch-type battery case of claim 4, wherein the corner has a variable curvature radius.

6. The pouch-type battery case of claim 5, wherein a curvature radius of a central portion of the corner is greater than a peripheral portion of the corner.

7. The pouch-type battery case of claim 2, wherein at least one of the punch edges has a curvature radius of 0.7 mm or less.

8. The pouch-type battery case of claim 2, wherein the punch edge has a curvature radius that corresponds to 1/20 to 1/6 of a depth of the cup part.

9. The pouch-type battery case of claim 1, further comprising:
a first case and a second case in which first and second cup parts are formed, respectively; and
a bridge formed between the first and second cup parts, wherein the bridge has a thickness of 2 mm or less.

10. The pouch-type battery case of claim 9, wherein the bridge has a thickness of 1.4 mm or less.

11. The pouch-type battery case of claim 9, wherein the bridge has a thickness that corresponds to 1/200 to 1/30 of a width of the electrode assembly.

12. The pouch-type battery case of claim 9, wherein the bridge is rounded to define a curvature radius of 1 mm or less.

13. The pouch-type battery case of claim 12, wherein the bridge is rounded to define a curvature radius of 0.7 mm or less.

14. The pouch-type battery case of claim 9, wherein the bridge has a thickness corresponding to a distance between two bridge vertical lines passing through a boundary point of the bridge and a bridge-side outer wall, respectively, the two bridge vertical lines being perpendicular to a bottom part.

15. The pouch-type battery case of claim 1, wherein an outer wall is inclined at an inclination angle of 90° to 95° from a bottom part.

16. A pouch-type secondary battery comprising:
an electrode assembly of stacked electrodes and separators;
a pouch-type battery case comprising a cup part configured to accommodate the electrode assembly therein, wherein the pouch-type battery case comprises:
a first case and a second case, of which at least one comprises the cup part; and
a folding part configured to fold and connect the first case to the second case,
wherein the cup part comprises a plurality of die edges connecting a plurality of outer walls forming a periphery of the cup part to a side or degassing part,
wherein at least one of the die edges is rounded to define a curvature radius that corresponds to 1/20 to 1/6 of a depth of the cup part, wherein at least one of the die edges is rounded to define a curvature radius of 1 mm or less.

17. The pouch-type secondary battery of claim 16, wherein the electrode assembly has an area of 15,000 mm² to 100,000 mm².

18. The pouch-type secondary battery of claim 16, wherein the folding part has a width of 1 mm to 3.2 mm.

19. The pouch-type secondary battery of claim 16, wherein the folding part comprises a groove that is recessed inward.

20. The pouch-type secondary battery of claim 19, wherein the battery case comprises a pair of protrusions protruding outward with the groove located therebetween, and
a distance between an innermost portion of the groove and an outermost portion of the protrusion being 0.8 mm or less.

21. The pouch-type secondary battery of claim 16, wherein a difference in a width of the cup part and a width of the electrode assembly is 2.5 mm or less.

22. The pouch-type secondary battery of claim 21, wherein a difference in a width of the cup part and the electrode assembly is 1.7 mm or less.

23. The pouch-type secondary battery of claim 21, wherein the width of the cup part is a distance between both ends of both outer walls of the cup part.

24. The pouch-type secondary battery of claim 16, wherein the cup part further comprises:
a plurality of punch edges which connect a plurality of outer walls configured to surround a periphery of the cup part to a bottom part of the cup part, at least one of the plurality of punch edges being rounded to define a curvature radius of 1 mm or less; and
a thickness edge configured to connect the two outer walls adjacent to each other.

25. The pouch-type secondary battery of claim 24, wherein a vertical distance between a die edge vertical line extending between a boundary point of the die edge and a die edge-side outer wall is perpendicular to the bottom part, and an edge vertical line extending between a boundary point of the die edge-side punch edge and the die edge-side outer wall is perpendicular to the bottom part, the edge vertical line being 0.5 mm or less.

26. The pouch-type secondary battery of claim 25, wherein one end of at least one of the electrodes in the electrode assembly is disposed such that a vertical distance from the edge vertical line is 0.75 mm or less.

27. The pouch-type secondary battery of claim 26, wherein, one end of at least one of the electrodes in the electrode assembly is disposed so that a vertical distance from the edge vertical line is 0.5 mm or less.

28. The pouch-type secondary battery of claim 24, wherein, a peripheral portion of the separator protruding outward from the electrode is folded in an opposite direction of the bottom part with respect to one end of the electrode.

29. The pouch-type secondary battery of claim 28, wherein each of the electrode and the separator of the electrode assembly is provided in plurality, the peripheral portion is folded toward the second case in the separator accommodated in the cup part of the first case, and
the peripheral portion is folded toward the first case in the separator accommodated in the cup part of the second case.

30. The pouch-type secondary battery of claim 29, wherein the peripheral portion of at least one separator is aligned with the peripheral portion of an adjacent separator and folded.

31. The pouch-type secondary battery of claim 24, wherein at least one of the punch edges has a curvature radius of 0.7 mm or less.

32. The pouch-type secondary battery of claim 24, wherein the punch edge has a curvature radius that corresponds to 1/20 to 1/6 of a depth of the cup part.

33. The pouch-type secondary battery of claim 24, wherein at least one of the die edges has a curvature radius of 0.7 mm or less.

34. The pouch-type secondary battery of claim 24, wherein an outer wall is inclined at an inclination angle of 90° to 95° from the bottom part.

35. The pouch-type secondary battery of claim 24, wherein the thickness edge is connected to two punch edges adjacent to each other to form a corner, and
- at least one of the corner is rounded to define a curvature radius of 2 mm to 5 mm, wherein the curvature radius is greater than that of the thickness edge.

36. The pouch-type secondary battery of claim 35, wherein the corner has a variable curvature radius.

37. The pouch-type secondary battery of claim 36, wherein a curvature radius of a central portion of the corner is greater than a curvature radius of a peripheral portion of the corner.

38. The pouch-type secondary battery of claim 16, further comprising a bat ear protruding outward by a length of 1.5 mm from a portion of both ends of the folding part.

39. The pouch-type secondary battery of claim 38, wherein an angle between the folding part and an inner edge of the bat ear is greater than 151 degree.

\* \* \* \* \*